US009240203B2

(12) United States Patent
Miller et al.

(10) Patent No.: US 9,240,203 B2
(45) Date of Patent: *Jan. 19, 2016

(54) CO-LOCATED GIMBAL-BASED DUAL STAGE ACTUATION DISK DRIVE SUSPENSIONS WITH DAMPERS

(71) Applicant: Hutchinson Technology Incorporated, Hutchinson, MN (US)

(72) Inventors: Mark A. Miller, Darwin, MN (US); Jacob D. Bjorstrom, Hutchinson, MN (US); Nole D. German, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,582

(22) Filed: Aug. 25, 2014

(65) Prior Publication Data

US 2014/0362476 A1 Dec. 11, 2014

Related U.S. Application Data

(63) Continuation of application No. 14/050,660, filed on Oct. 10, 2013, now Pat. No. 8,896,968.

(60) Provisional application No. 61/711,988, filed on Oct. 10, 2012.

(51) Int. Cl.
*G11B 5/48* (2006.01)

(52) U.S. Cl.
CPC .............. *G11B 5/4833* (2013.01); *G11B 5/483* (2015.09); *G11B 5/4826* (2013.01)

(58) Field of Classification Search
CPC .. G11B 5/5552; G11B 5/4826; G11B 5/4873; G11B 5/4833; G11B 5/4853; G11B 5/596

USPC ............. 360/245, 245.1, 245.2, 245.3, 245.4, 360/294.3, 294.4

See application file for complete search history.

(56) References Cited

U.S. PATENT DOCUMENTS

| 3,320,556 A | 5/1967 | Schneider |
| 4,299,130 A | 11/1981 | Koneval |

(Continued)

FOREIGN PATENT DOCUMENTS

| EP | 0591954 B1 | 4/1994 |
| EP | 0834867 B1 | 5/2007 |

(Continued)

OTHER PUBLICATIONS

International Search Report and Written Opinion issued in PCT/US2013/059702, dated Mar. 28, 2014, 9 pages.

(Continued)

*Primary Examiner* — Brian Miller
(74) *Attorney, Agent, or Firm* — Faegre Baker Daniels LLP

(57) ABSTRACT

Various embodiments concern a gimbaled flexure having a dual stage actuation structure comprising flexure which comprises a gimbal. The gimbal comprises at least one spring arm and a tongue connected to the at least one spring arm. The dual stage actuation structure further comprises a motor mounted on the gimbal, the motor comprising a top side and a bottom side opposite the top side, the bottom side of the motor facing the flexure. The dual stage actuation structure further comprises a damper located between the motor and the flexure, the damper contacting the tongue and the bottom side of the motor. The damper comprises one or both of elastic and viscoelastic material. Various other features of a dual stage actuation structure are provided.

20 Claims, 50 Drawing Sheets

(56) References Cited

U.S. PATENT DOCUMENTS

| | | |
|---|---|---|
| 4,418,239 A | 11/1983 | Larson et al. |
| 4,422,906 A | 12/1983 | Kobayashi |
| 4,659,438 A | 4/1987 | Kuhn et al. |
| 5,140,288 A | 8/1992 | Grunwell |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen et al. |
| 5,631,786 A | 5/1997 | Erpelding |
| 5,636,089 A | 6/1997 | Jurgenson et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,712,749 A | 1/1998 | Gustafson |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,862,010 A | 1/1999 | Simmons et al. |
| 5,862,015 A | 1/1999 | Evans et al. |
| 5,889,137 A | 3/1999 | Hutchings et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,929,390 A | 7/1999 | Naito et al. |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,215,629 B1 | 4/2001 | Kant et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansky |
| 6,639,761 B1 | 10/2003 | Boutaghou et al. |
| 6,647,621 B1 | 11/2003 | Roen et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,724,580 B2 | 4/2004 | Irie et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,796,018 B1 | 9/2004 | Thornton |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |

(56) References Cited

U.S. PATENT DOCUMENTS

| | | |
|---|---|---|
| 7,079,357 B1 | 7/2006 | Kulangara et al. |
| 7,082,670 B2 | 8/2006 | Boismier et al. |
| 7,092,215 B2 | 8/2006 | Someya et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,283,331 B2 | 10/2007 | Oh et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Gao Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,710,687 B1 | 5/2010 | Carlson et al. |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,813,083 B2 | 10/2010 | Guo et al. |
| 7,821,742 B1 | 10/2010 | Mei |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,151,440 B2 | 4/2012 | Tsutsumi et al. |
| 8,154,827 B2 | 4/2012 | Contreras et al. |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,289,656 B1 | 10/2012 | Huber |
| 8,295,012 B1 | 10/2012 | Tian et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,405,933 B2 | 3/2013 | Soga |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 8,681,456 B1 | 3/2014 | Miller et al. |
| 8,717,712 B1 | 5/2014 | Bennin et al. |
| 8,792,214 B1 | 7/2014 | Bjorstrom et al. |
| 8,891,206 B2 | 11/2014 | Miller |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0176209 A1 | 11/2002 | Schulz et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1 | 2/2004 | Shimizu et al. |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |

(56) References Cited

U.S. PATENT DOCUMENTS

| | | |
|---|---|---|
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0190263 A1 | 7/2009 | Miura et al. |
| 2009/0244786 A1 | 10/2009 | Hatch |
| 2009/0294740 A1 | 12/2009 | Kurtz et al. |
| 2010/0007993 A1 | 1/2010 | Contreras et al. |
| 2010/0067151 A1 | 3/2010 | Okawara et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1 | 3/2011 | Fujimoto et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0113547 A1 | 5/2012 | Sugimoto |
| 2012/0279757 A1 | 11/2012 | Ishii et al. |
| 2012/0281316 A1 | 11/2012 | Fujimoto et al. |
| 2013/0020112 A1 | 1/2013 | Ohsawa |
| 2013/0021698 A1 | 1/2013 | Greminger et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0265674 A1 | 10/2013 | Fanslau |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0098440 A1 | 4/2014 | Miller et al. |
| 2014/0168821 A1 | 6/2014 | Miller |
| 2014/0362475 A1 | 12/2014 | Bjorstrom et al. |
| 2015/0016235 A1 | 1/2015 | Bennin et al. |
| 2015/0055254 A1 | 2/2015 | Bjorstrom et al. |
| 2015/0055256 A1 | 2/2015 | Miller |
| 2015/0062758 A1 | 3/2015 | Miller et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| WO | WO9820485 A1 | 5/1998 |
| WO | WO2014190001 A1 | 11/2014 |
| WO | 2015027034 A2 | 2/2015 |

OTHER PUBLICATIONS

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N. R. et al., "A Multilayer Thick-film PZT Actuator for MEMs Applications", Sensors and Actuators A: Physical, vol. 132, No. 1, Nov. 8, 2006, pp. 311-316.

International Search Report and Written Opinion issued in PCT/US13/75320, mailed May 20, 2014, 10 pages.

International Search Report and Written Opinion issued in PCT/US2013/031484, mailed May 30, 2013, 13 pages.

International Search Report and Written Opinion issued in PCT/US2013/052885, mailed Feb. 7, 2014, 13 pages.

International Search Report and Written Opinion issued in PCT/US2013/064314, dated Apr. 18, 2014, 10 pages.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Pozar, David M. Microwave Engineering, 4th Edition, copyright 2012 by John Wiley & Sons, Inc., pp. 422-426.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

U.S. Appl. No. 13/365,443 to Miller, Mark A., entitled Elongated Trace Tethers for Disk Drive Head Suspension Flexures, filed Feb. 3, 2012.

U.S. Appl. No. 13/690,883 to Tobias, Kyle T. et al., entitled Microstructure Patterned Surfaces for Integrated Lead Head Suspensions, filed Nov. 30, 2012.

(56) References Cited

OTHER PUBLICATIONS

U.S. Appl. No. 13/827,622 to Bjorstrom, Jacob D. et al., entitled Mid-Loadbeam Dual Stage Actuated (DSA) Disk Drive Head Suspension, filed Mar. 14, 2013.

U.S. Appl. No. 14/056,481 entitled Two-Motor Co-Located Gimbal-Based Dual Stage Actuation Disk Drive Suspensions With Motor Stiffeners, filed Oct. 17, 2013.

U.S. Appl. No. 14/103,955 to Bjorstrom, Jacob D. et al., entitled Electrical Contacts to Motors in Dual Stage Actuated Suspensions, filed Dec. 12, 2013.

U.S. Appl. No. 14/141,617 to Bennin, Jeffry S. et al., entitled Disk Drive Suspension Assembly Having a Partially Flangeless Load Point Dimple, filed Dec. 27, 2013, 53 pages.

U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.

U.S. Appl. No. 14/216,288 to Miller, Mark A. et al., entitled Co-Located Gimbal-Based Dual Stage Actuation Disk Drive Suspension, filed Mar. 17, 2014, 84 pages.

U.S. Appl. No. 61/396,239 entitled Low Resistance Ground Joints for Dual Stage Actuation Disk Drive Suspensions, filed May 24, 2010, 16 pages.

U.S. Appl. No. 13/955,204 to Bjorstrom, Jacob D. et al., entitled Damped Dual Stage Actuation Disk Drive Suspensions, filed Jul. 31, 2013.

U.S. Appl. No. 13/955,204, to Bjorstrom, Jacob D. et al., Non-Final Office Action issued on Mar. 24, 2014, 7 pages.

U.S. Appl. No. 13/955,204, to Bjorstrom, Jacob D. et al., Non-Final Office Action issued on Oct. 29, 2013, 9 pages.

U.S. Appl. No. 13/955,204, to Bjorstrom, Jacob D. et al., Notice of Allowance issued on Jan. 7, 2014, 6 pages.

U.S. Appl. No. 13/955,204, to Bjorstrom, Jacob D. et al., Notice of Allowance issued on May 6, 2014, 5 pages.

U.S. Appl. No. 13/955,204, to Bjorstrom, Jacob D. et al., Response filed Apr. 18, 2014 to Non-Final Office Action issued on Mar. 24, 2014, 9 pages.

U.S. Appl. No. 13/955,204, to Bjorstrom, Jacob D. et al., Response filed Nov. 19, 2013 to Non-Final Office Action issued on Oct. 29, 2013, 11 pages.

U.S. Appl. No. 13/972,137 to Bjorstrom, Jacob D. et al., entitled Co-Located Gimbal-Based Dual Stage Actuation Disk Drive Suspensions With Offset Motors, filed Aug. 21, 2013.

U.S. Appl. No. 13/972,137, to Bjorstrom, Jacob D. et al., Non-Final Office Action issued Nov. 5, 2013.

U.S. Appl. No. 13/972,137, to Bjorstrom, Jacob D. et al., Notice of Allowance issued on Jan. 17, 2014, 5 pages.

U.S. Appl. No. 13/972,137, to Bjorstrom, Jacob D. et al., Response filed Dec. 2, 2013 to Non-Final Office Action issued Nov. 5, 2013, 12 pages.

U.S. Appl. No. 14/026,427 to Miller, Mark A., entitled Co-Located Gimbal-Based Dual Stage Actuation Disk Drive Suspensions, filed Sep. 13, 2013.

U.S. Appl. No. 14/044,238 to Miller, Mark A., entitled Co-Located Gimbal-Based Dual Stage Actuation Disk Drive Suspensions With Motor Stifeners, filed Oct. 2, 2013.

U.S. Appl. No. 14/044,238 to Miller, Mark A., Non-Final Office Action issued on Feb. 6, 2014, 9 pages.

U.S. Appl. No. 14/044,238, to Miller, Mark A., Response filed Apr. 22, 2014 to Non-Final Office Action issued on Feb. 6, 2014, 11 pages.

U.S. Appl. No. 14/050,660 to Miller, Mark A. et al., entitled Co-Located Gimbal-Based Dual Stage Actuation Disk Drive Suspensions With Dampers, filed Oct. 10, 2013.

U.S. Appl. No. 14/050,660, to Miller, Mark A. et al., Non-Final Office Action issued on Mar. 31, 2014, 9 pages.

U.S. Appl. No. 14/146,760 to Roen, Michael E. entitled Balanced Multi-Trace Transmission in a Hard Disk Drive Flexure, filed Jan. 3, 2014, 32 pages.

U.S. Appl. No. 14/215,663 to Bjorstrom, Jacob D., entitled Co-Located Gimbal-Based Dual Stage Actuation Disk Drive Suspensions With Offset Motors, filed Mar. 17, 2014.

U.S. Appl. No. 14/270,070 to Bennin, Jeffry S. et al., entitled Disk Drive Suspension Assembly Having a Partially Flangeless Load Point Dimple, filed May 5, 2014.

U.S. Appl. No. 14/335,967 to Bjorstrom, Jacob D. et al., entitled Electrical Contacts to Motors in Dual Stage Actuated Suspensions, filed Jul. 21, 2014.

U.S. Appl. No. 14/467,543 to Bjorstrom, Jacob D. et al., entitled Damped Dual Stage Actuation Disk Drive Suspensions, filed Aug. 25, 2014.

Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.

"Calculating VLSI Wiring Capacitance", Jun. 1990, IBM Technical Disclosure Bulletin, vol. 33, Issue No. 1A, 2 pages.

International Preliminary Report on Patentability issued in PCT/US2013/052885, completed Mar. 3, 2015, 10 pages.

International Search Report and Written Opinion issued in PCT/US2013/052885, mailed Feb. 7, 2014, 16 pages.

International Search Report and Written Opinion issued in PCT/US2014/046714, mailed Jul. 15, 2014, 26 pages.

International Search Report and Written Opinion issued in PCT/US2014/052042, mailed Mar. 13, 2015, 10 pages.

U.S. Appl. No. 13/972,137, filed Aug. 21, 2013.

U.S. Appl. No. 14/026,427, filed Sep. 13, 2013.

U.S. Appl. No. 14/050,660, filed Oct. 10, 2013.

U.S. Appl. No. 14/216,288, filed Sep. 14, 2012.

U.S. Appl. No. 14/467,582, filed Oct. 10, 2012.

International Preliminary Report on Patentability issued in PCT/US2013/059702, mailed Mar. 17, 2015, 6 pages.

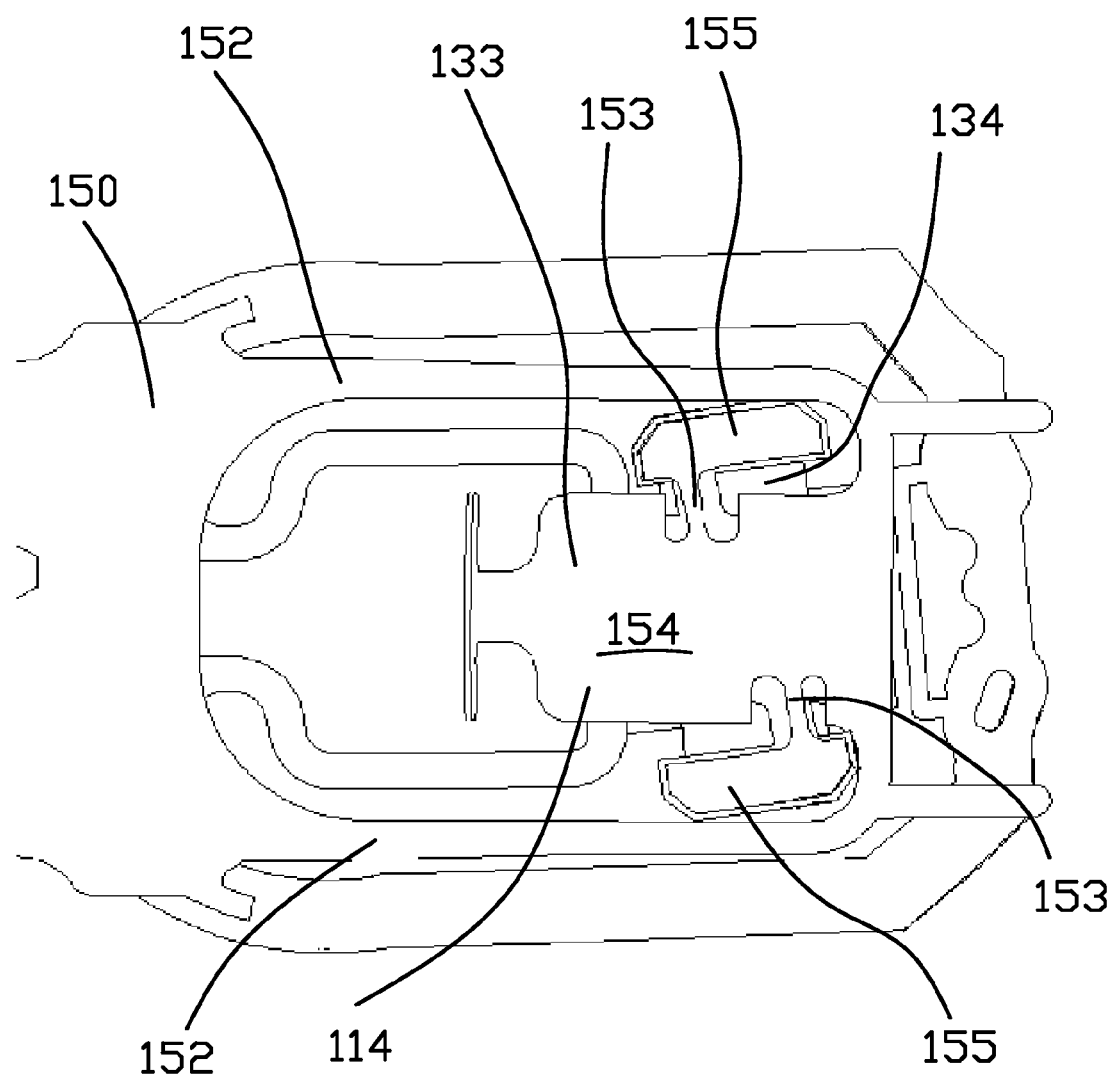
FIG 16A1

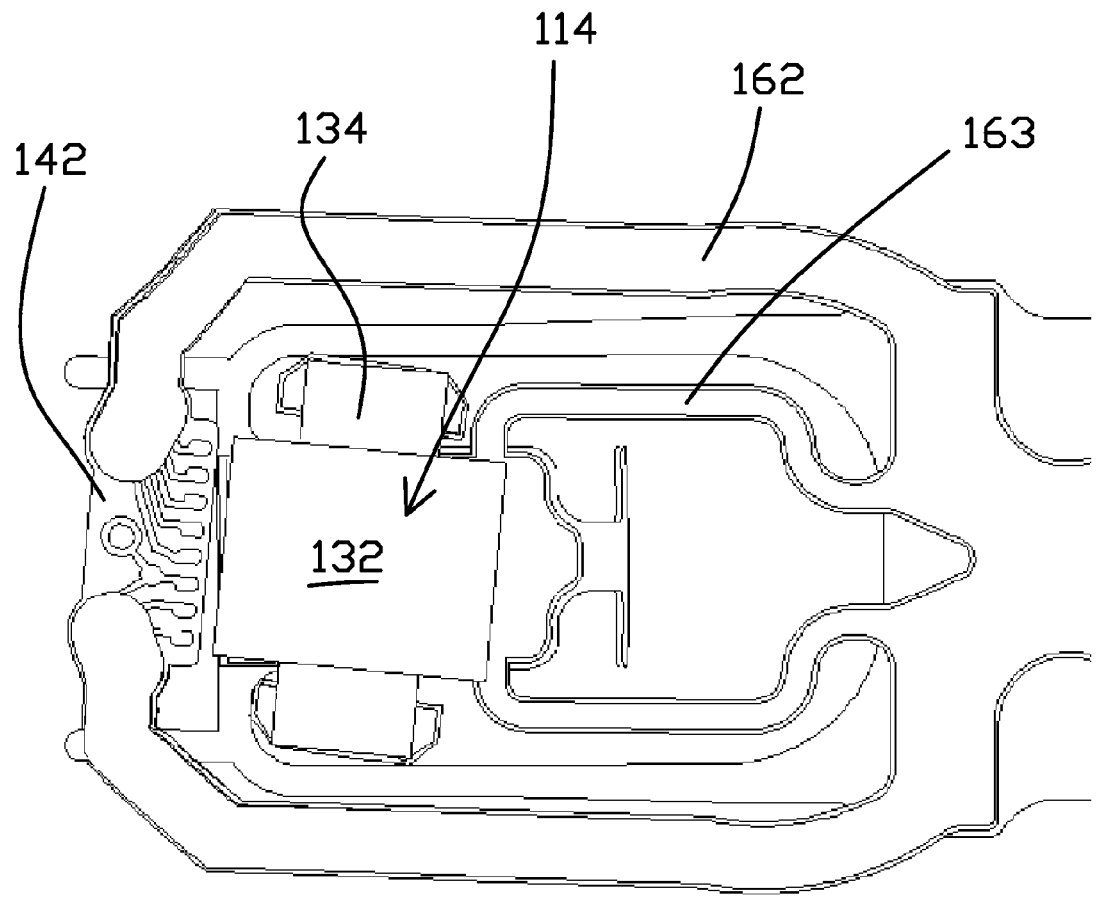
FIG 16A2

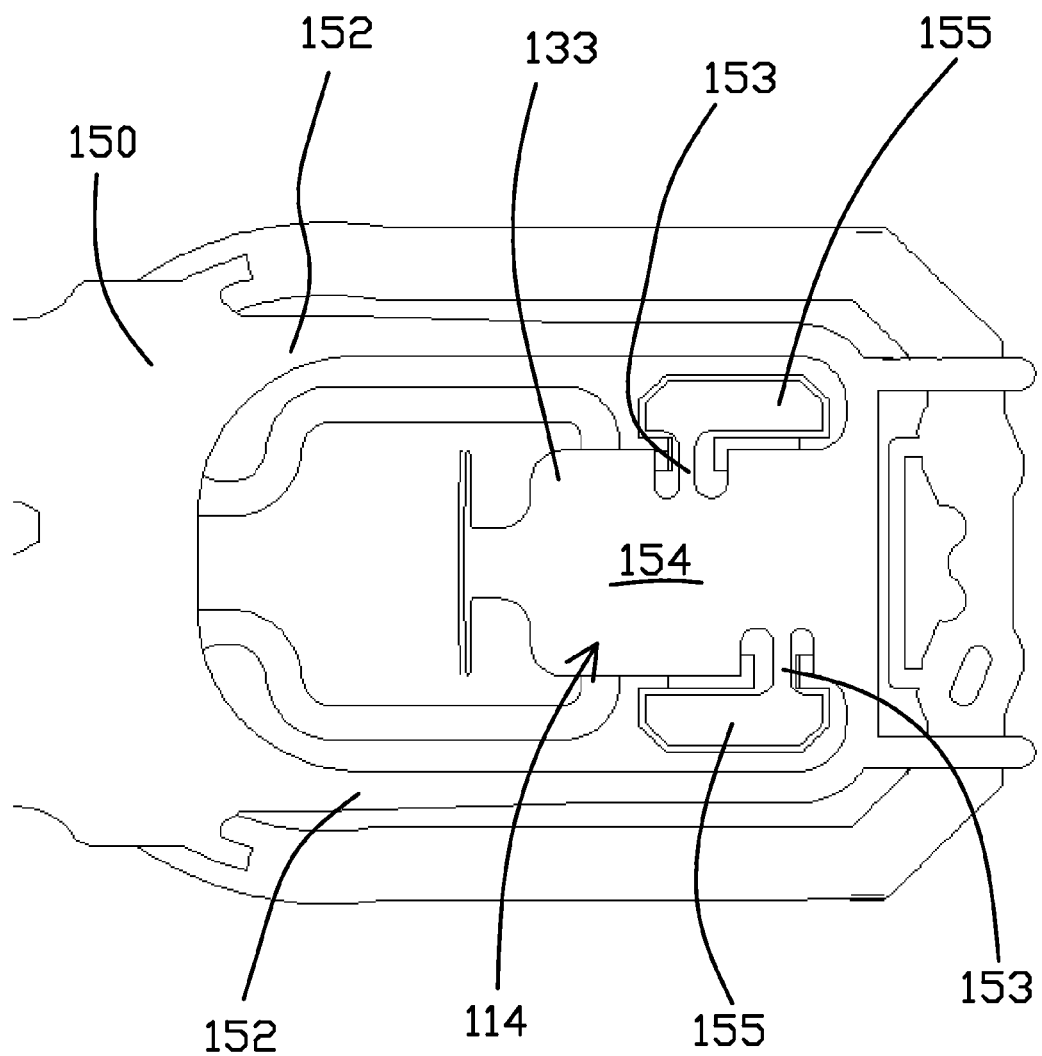
FIG 16B1

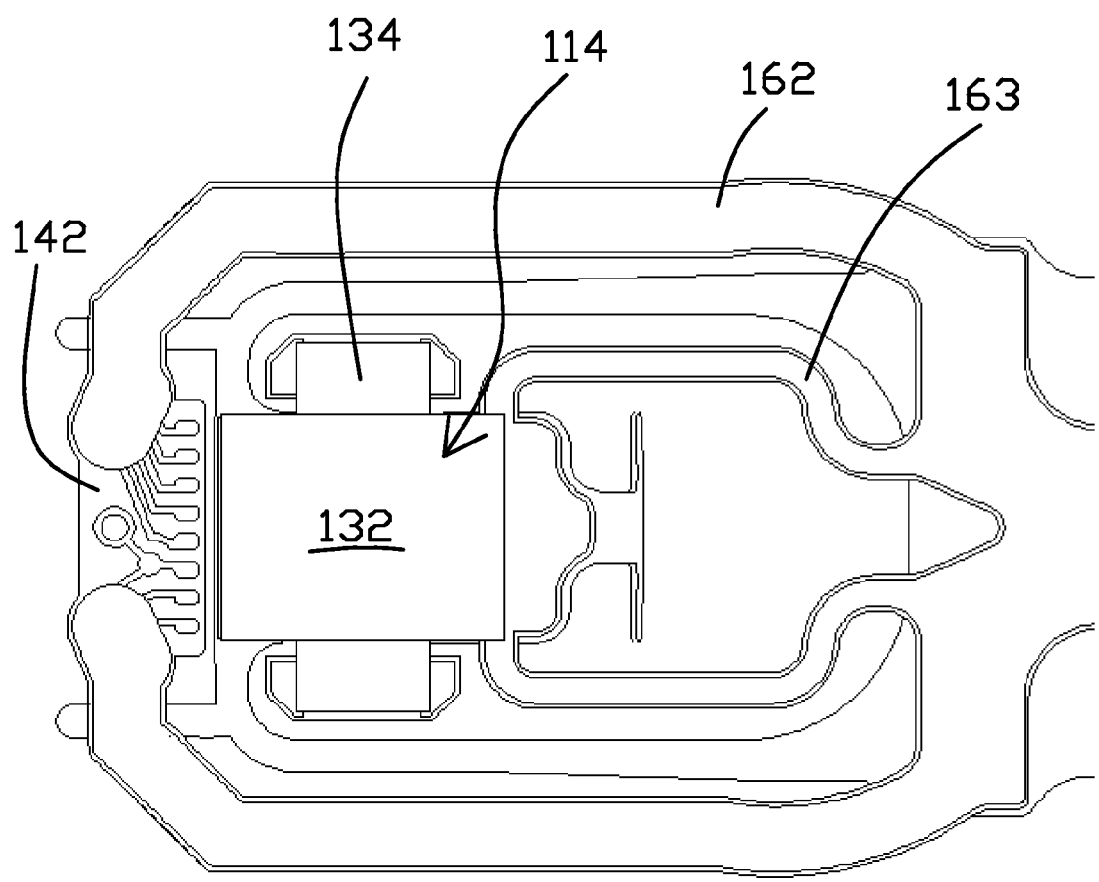
FIG 16B2

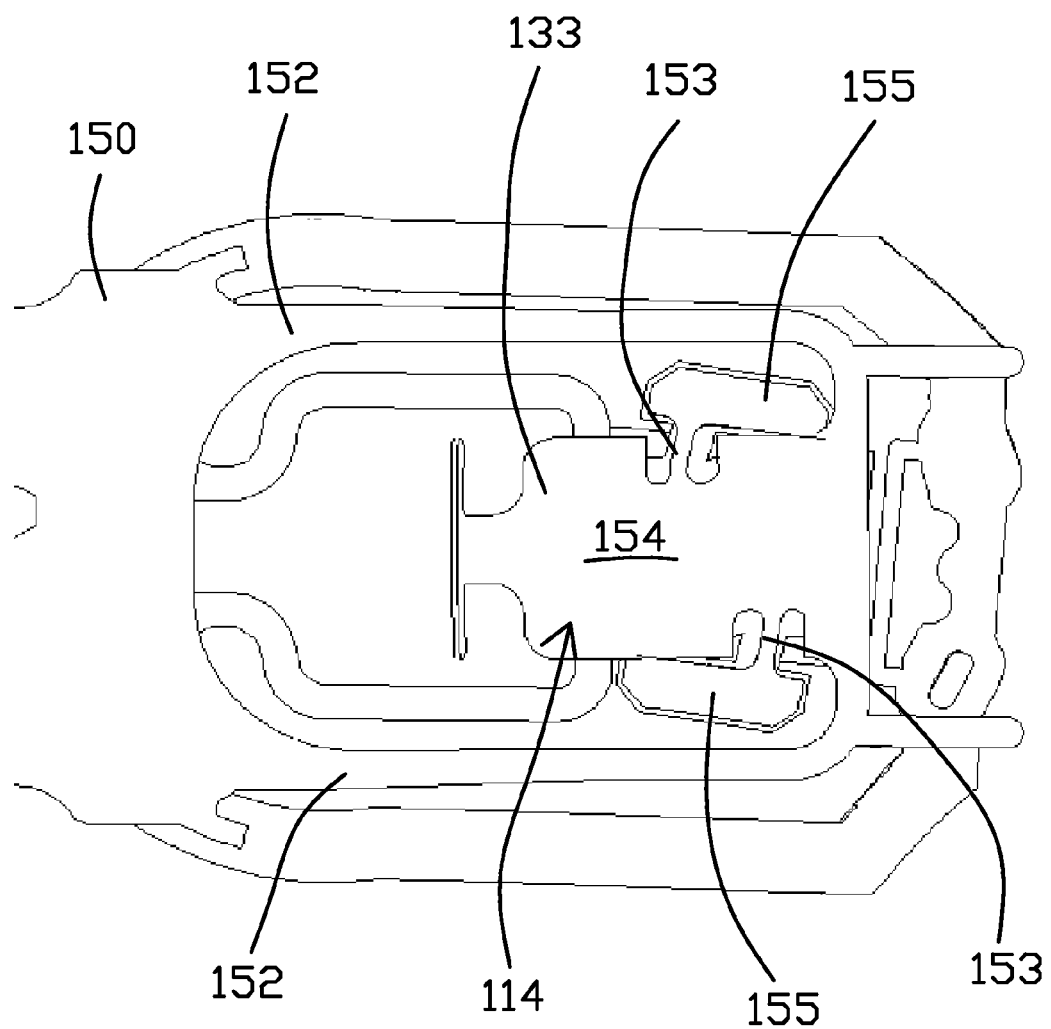
FIG 16C1

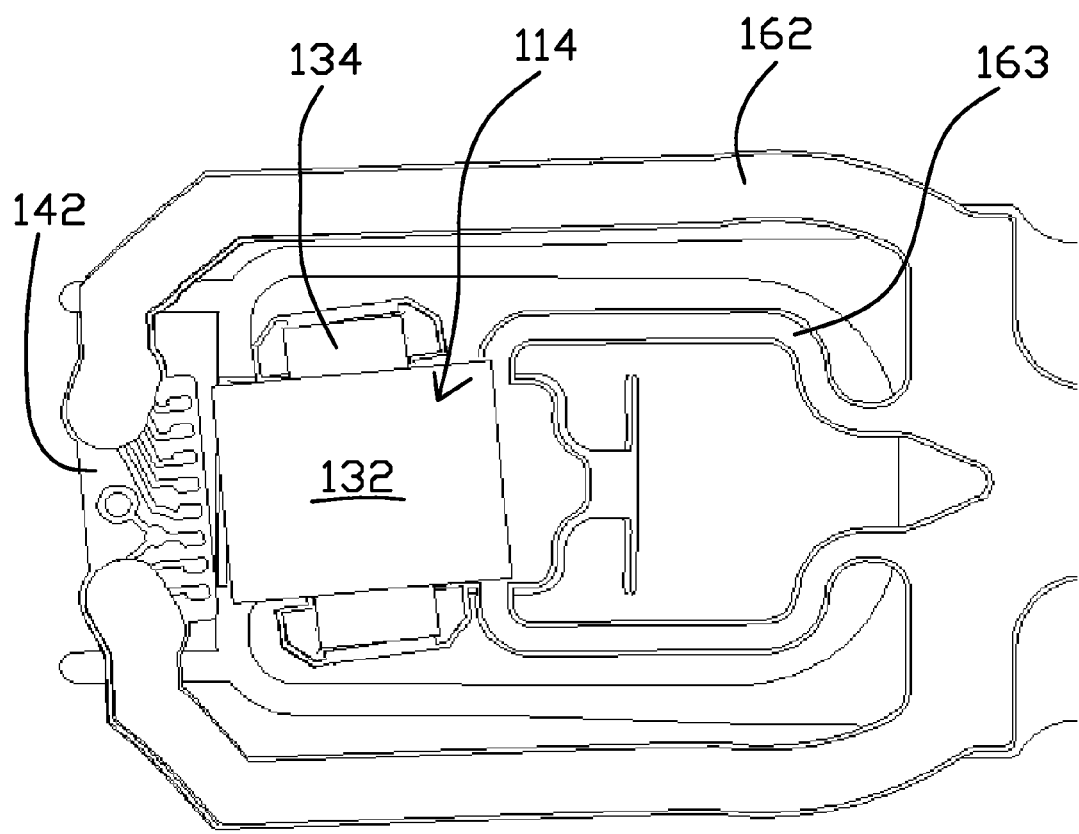
FIG 16C2

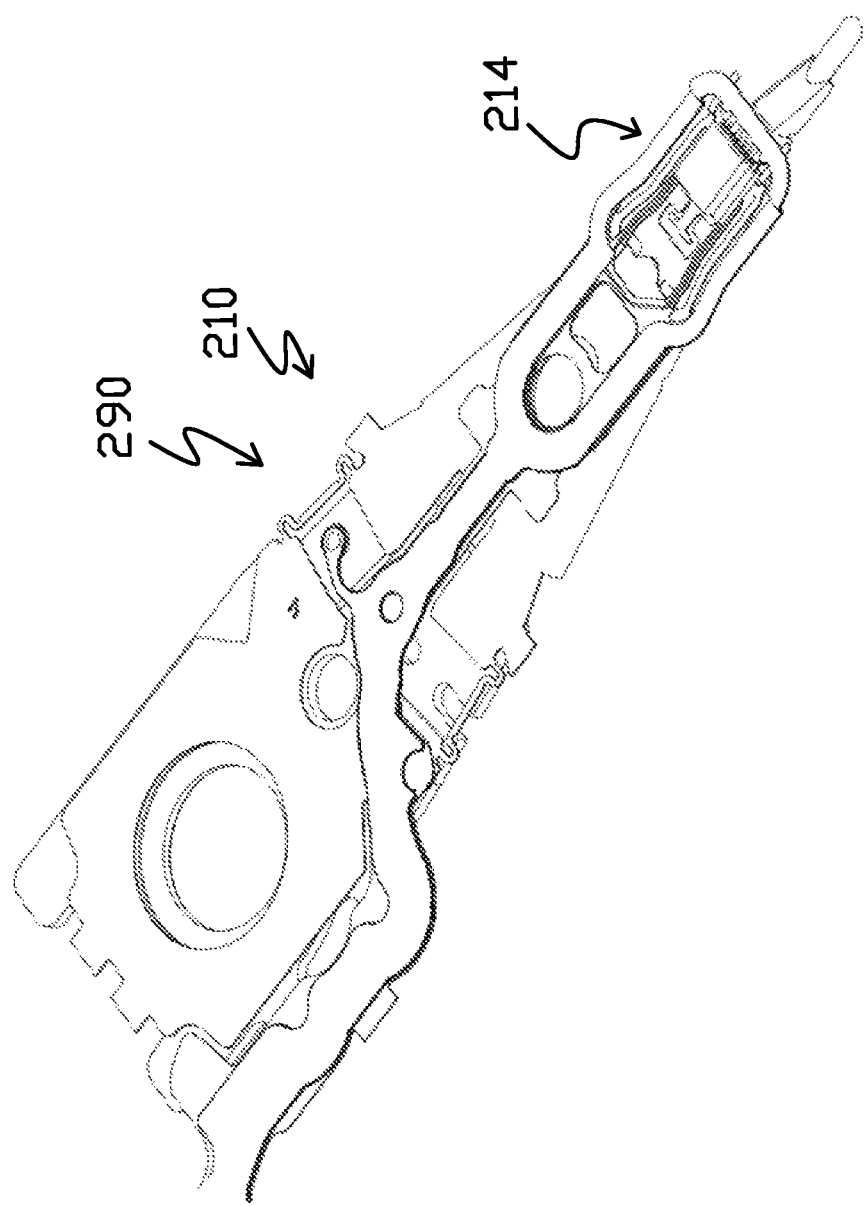

CO-LOCATED GIMBAL-BASED DUAL STAGE ACTUATION DISK DRIVE SUSPENSIONS WITH DAMPERS

CROSS-REFERENCE TO RELATED APPLICATIONS

This application is a Continuation of U.S. patent application Ser. No. 14/050,660 Filed On Oct. 10, 2013, entitled Co-Located Gimbal-Based Dual Stage Actuation Disk Drive Suspensions With Dampers, which claims the benefit of U.S. Provisional Application Ser. No. 61/711,988, filed on Oct. 10, 2012 and entitled Co-Located Gimbal-Based Dual Stage Actuation Disk Drive Suspensions With Visco-Elastic Dampers, which applications are hereby incorporated herein by reference in their entireties for all purposes.

TECHNICAL FIELD

The present disclosure relates to disk drives and suspensions for disk drives. In particular, the invention concerns dual stage actuation (DSA) suspensions.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Patent Publication No. 2010/0067151, the Shum U.S. Patent Publication No. 2012/0002329, the Fuchino U.S. Patent Publication No. 2011/0242708 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. Co-located gimbal-based DSA suspensions are disclosed in co-pending U.S. Provisional Application No. 61/700,972. All of the above-identified patents and patent applications are incorporated herein by reference in their entirety and for all purposes.

There remains a continuing need for improved DSA suspensions. DSA suspensions with enhanced performance capabilities are desired. The suspensions should be capable of being efficiently manufactured.

SUMMARY

Various embodiments concern a gimbaled flexure having a dual stage actuation structure comprising flexure comprising a gimbal. The gimbal comprises at least one spring arm and a tongue connected to the at least one spring arm. The dual stage actuation structure further comprises a motor mounted on the gimbal, the motor comprising a top side and a bottom side opposite the top side, the bottom side of the motor facing the flexure. The dual stage actuation structure further comprises a damper located between the motor and the flexure, the damper contacting the tongue and the bottom side of the motor. The damper comprises one or both of elastic and viscoelastic material.

In some of the above embodiments, the damper reduces out-of-plane motion of the tongue during high frequency resonance modes. The contact between the damper and each of the tongue and the bottom side of the motor can maintain a generally parallel planar relationship between the tongue and the motor during activation of the motor.

In some of the above embodiments, the damper is adhered to both of the flexure and the bottom side of the motor. The damper can be located on a stainless steel layer of the flexure.

Some of the above embodiments further comprise a conductive island on the tongue and a void in the damper and a stainless steel layer of the flexure. The void can be a moat that surrounds the conductive island. The moat can minimize wicking of one or both of adhesive and solder from the conductive island.

In some of the above embodiments, the motor comprises two contacts on the bottom side of the motor and the two contacts electrically connect with two traces of the flexure, respectively. An impingement element can be mounted on the top side of the motor. The impingement element can be located and configured to engage with a loadbeam dimple.

Some of the above embodiments comprise further comprise a head slide attached to the tongue. Electrical activation of the motor can move the head slider amount a tracking axis. The head slider can comprise a channel. The motor can extend through the channel and the motor can be free from fixed contact with the head slider.

In some of the above embodiments, the gimbal further comprises a pair of struts, the at least one spring arm comprises a pair of spring arms, the tongue is located between the pair of spring arms and is connected to the pair of spring arms by the pair of struts, the motor is mounted on the pair of spring arms, the tongue comprises a head slider mounting, and electrical activation of the motor bends the pair of struts to move the head slider mounting about a tracking axis.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

Figure 9:
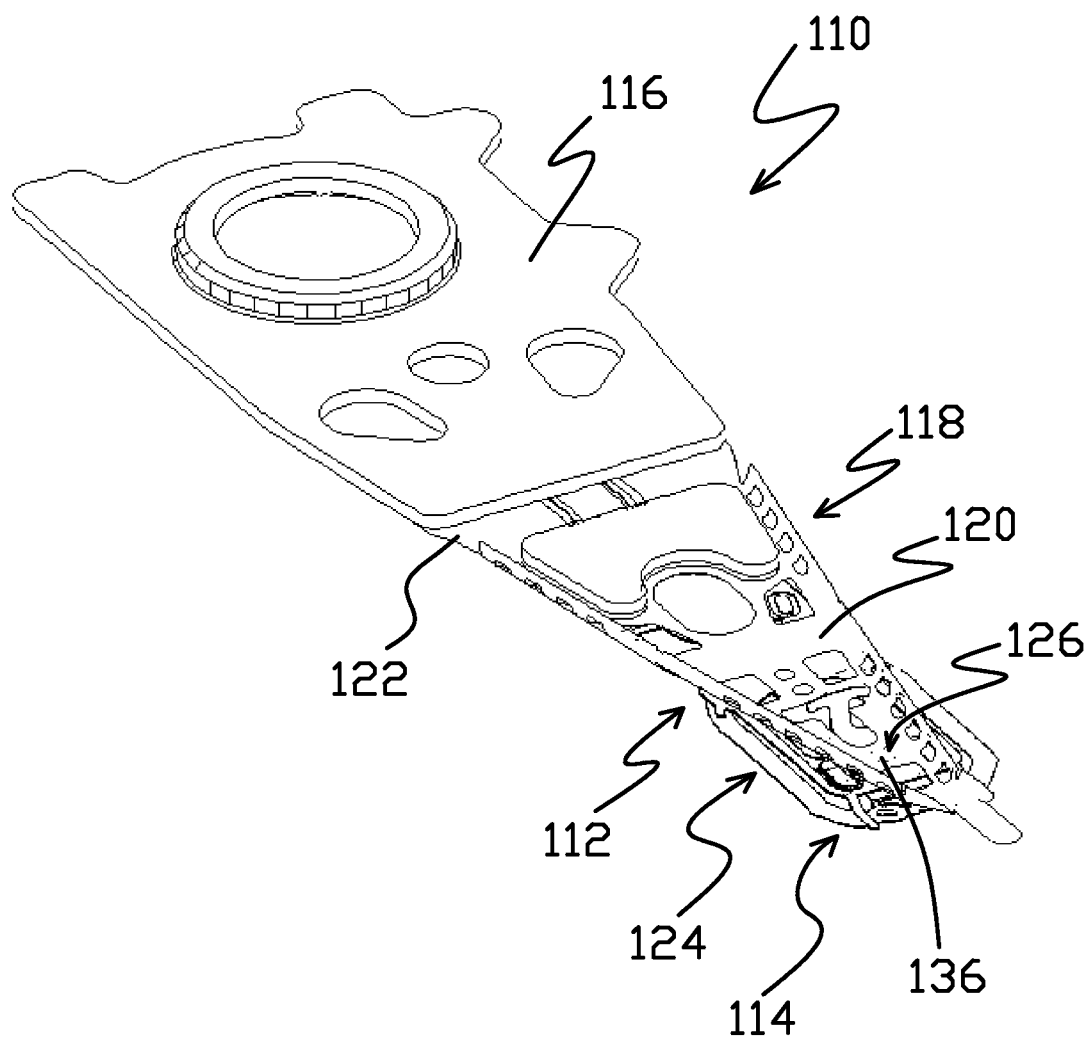
FIG. 9 is an isometric view of the loadbeam side of a suspension having a flexure with a dual stage actuation (DSA) structure.

FIGS. $16A_1$, $16B_1$, and $16C_1$ are plan views of the stainless steel side of the flexure shown in FIG. 9.

FIGS. $16A_2$, $16B_2$, and $16C_2$ are plan views of the trace side of the flexure shown in FIGS. $16A_1$, $16B_1$, and $16C_1$, respectively.

FIG. 17 is an isometric view of a tri-stage actuated suspension.

Figure 18A:
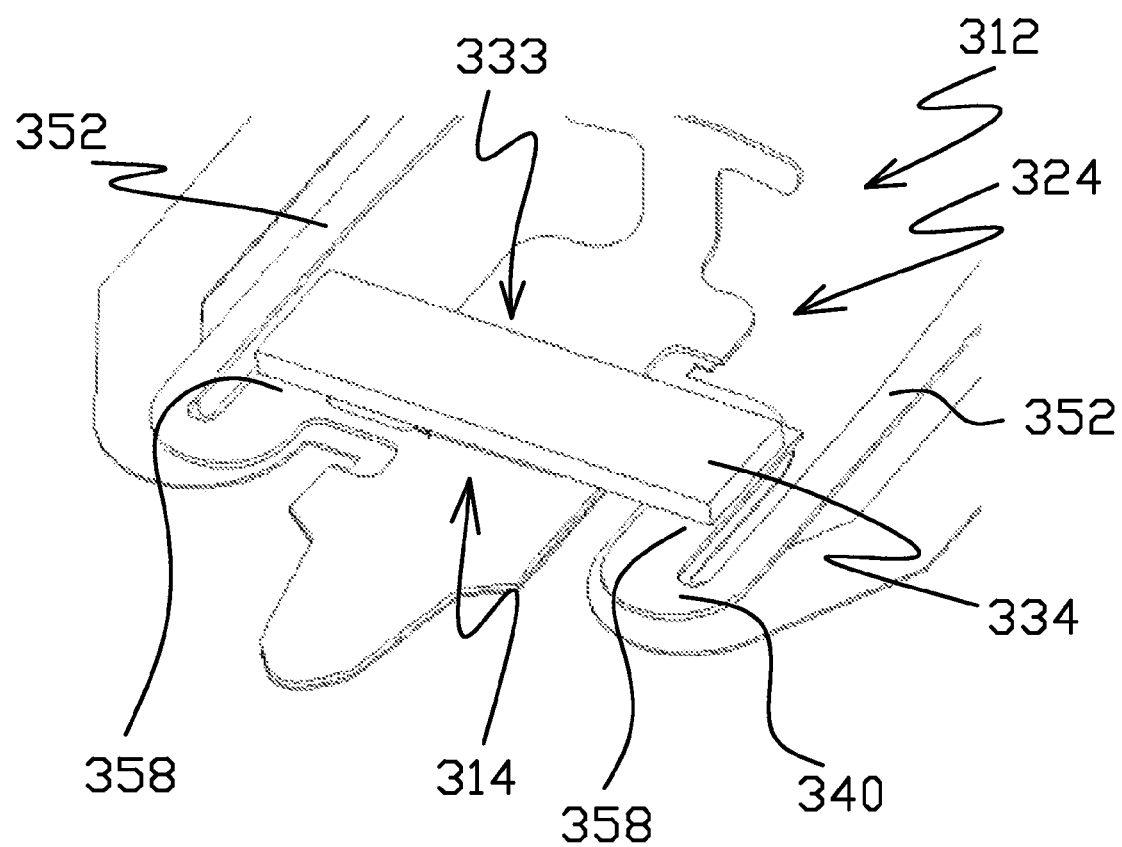

FIG. 18A is an isometric view of the stainless steel side of the distal end of a flexure having a DSA structure in accordance with another embodiment of the invention.

Figure 18B:
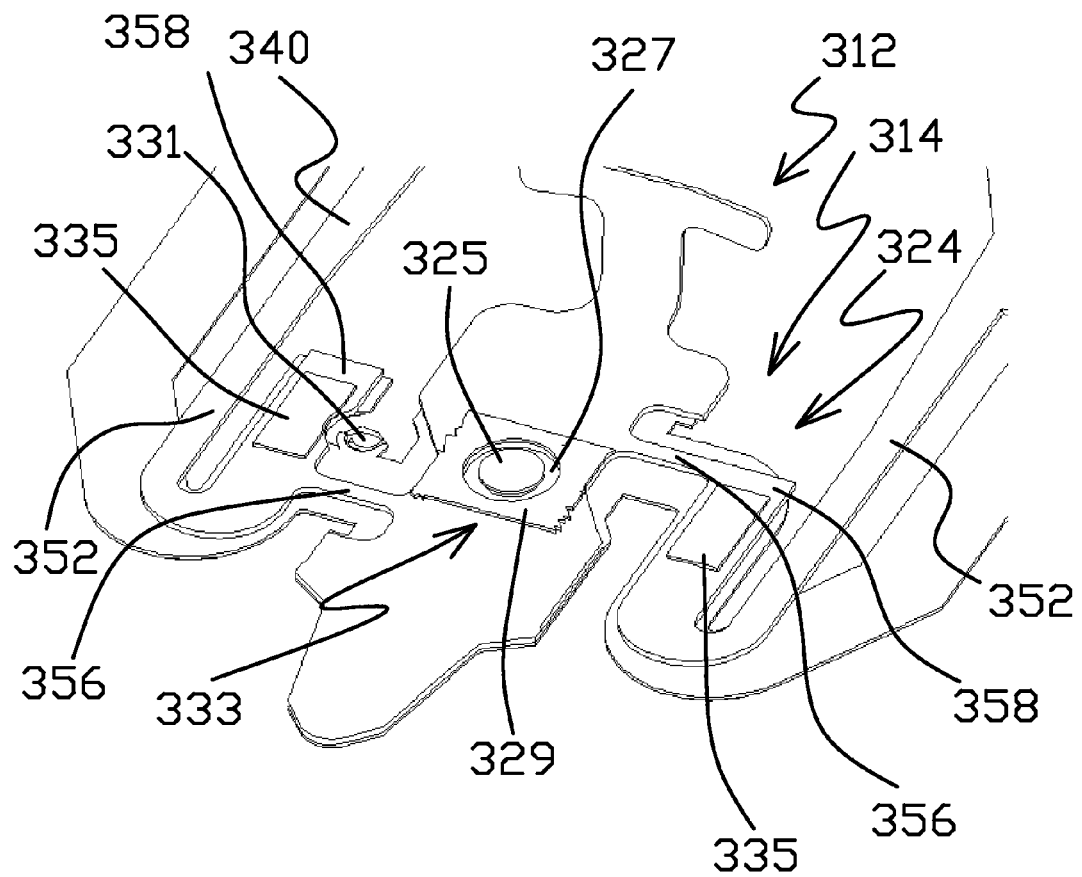

FIG. 18B shows the view of FIG. 18A but with the motor removed.

Figure 18C:
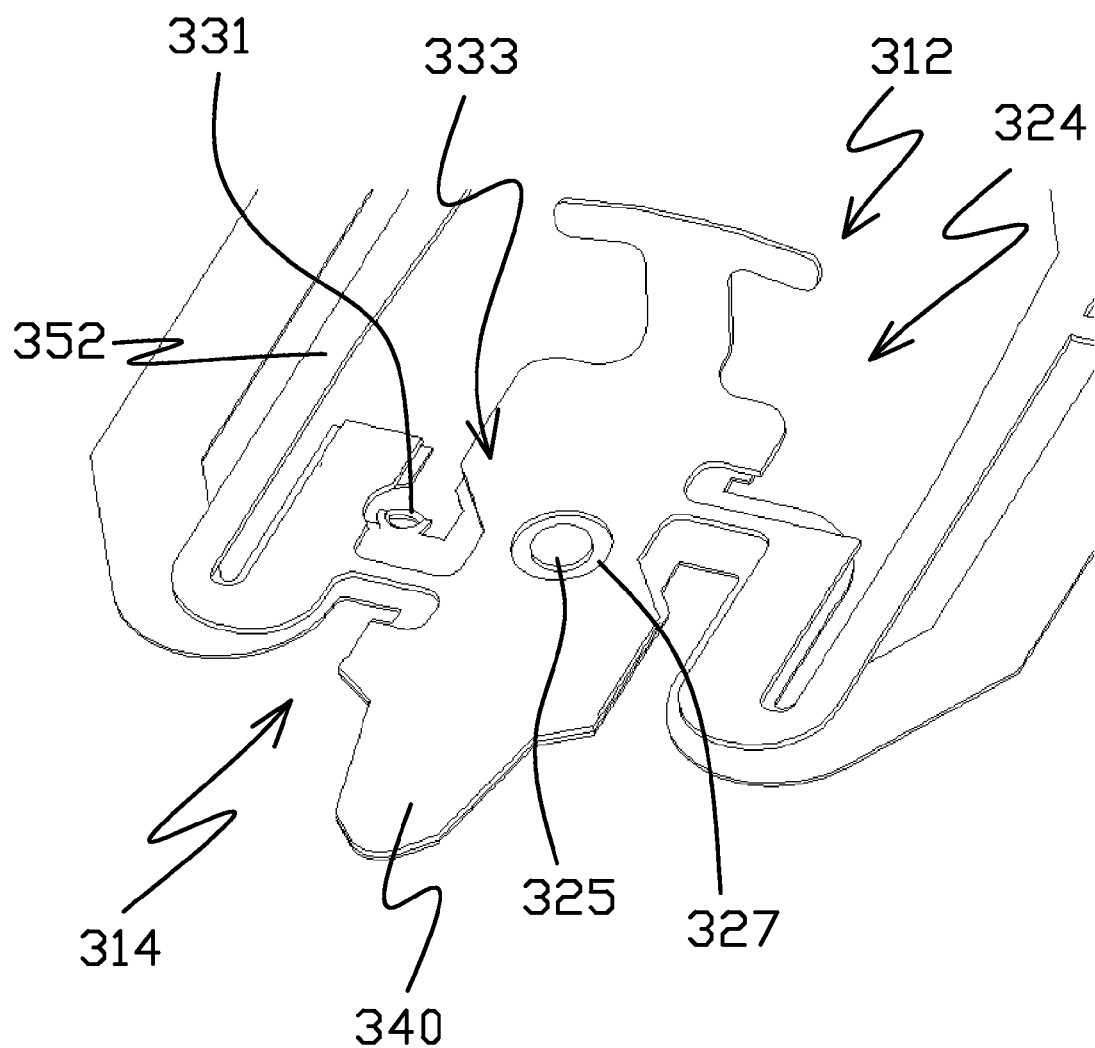

FIG. 18C shows the view of FIG. 18B but with damper and adhesive material removed.

Figure 19:
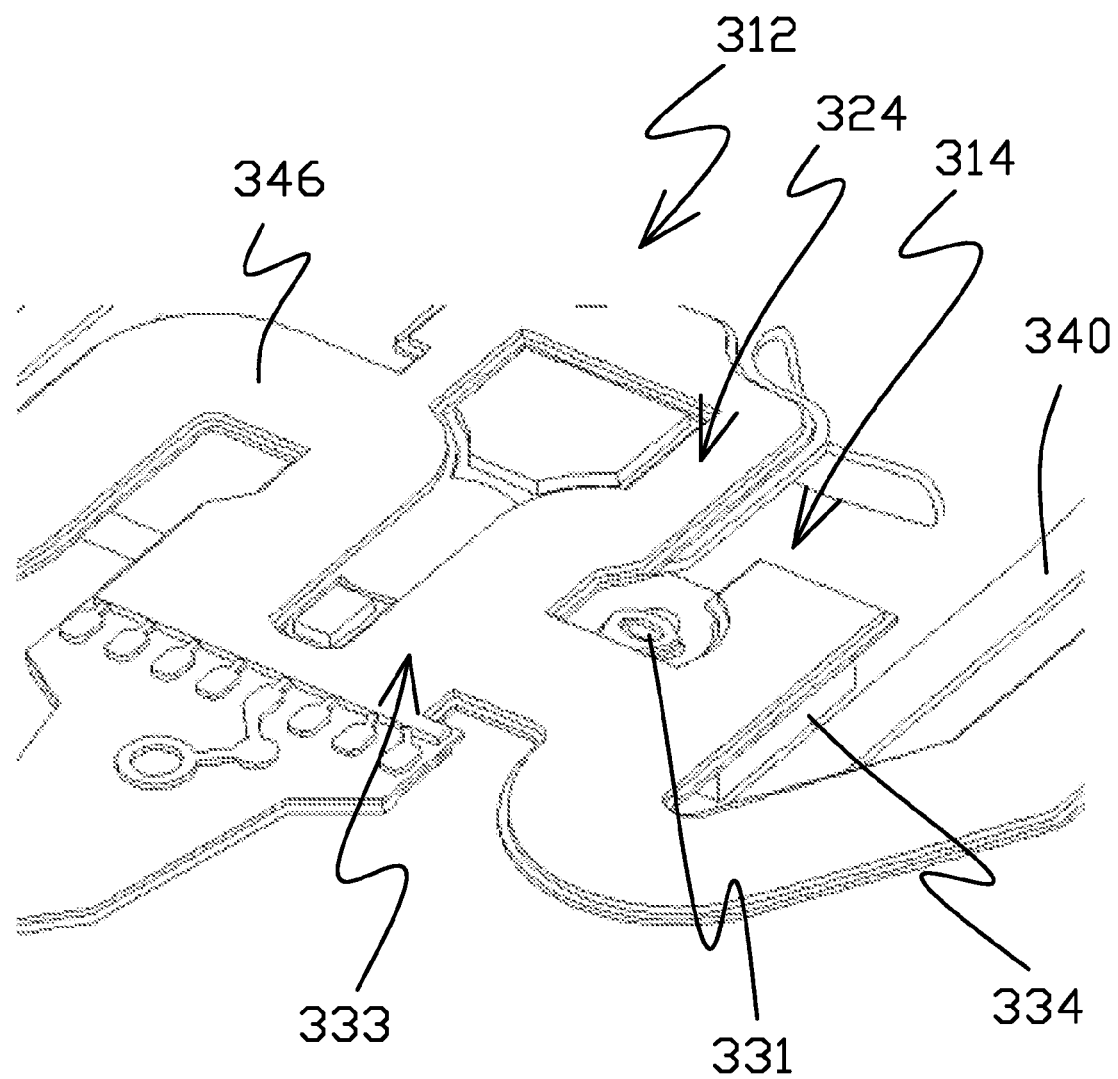

FIG. 19 is an isometric view of the trace side of the distal end of the flexure shown in FIG. 18A.

Figure 20:
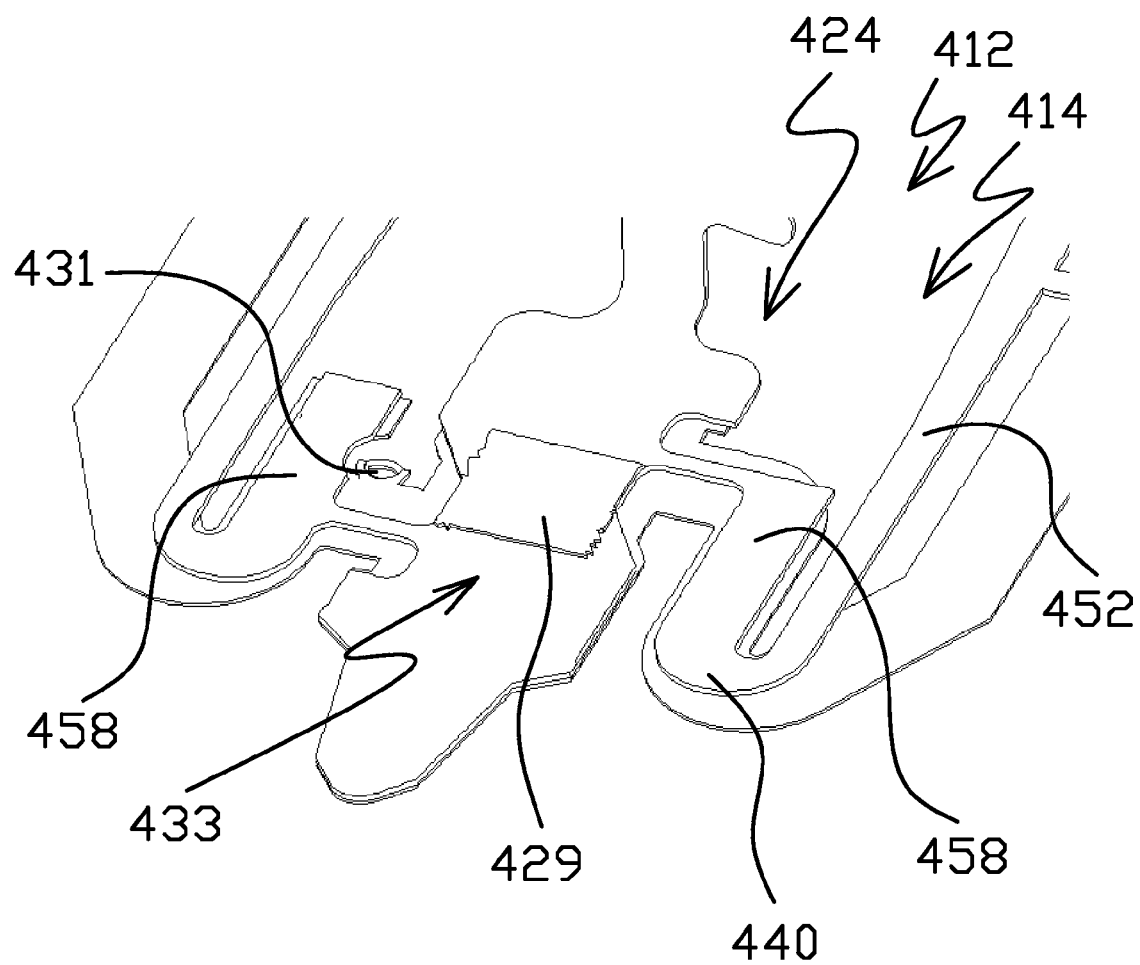

FIG. 20 is an isometric view of the stainless steel side of the distal end of a flexure in accordance with another embodiment.

Figure 21:
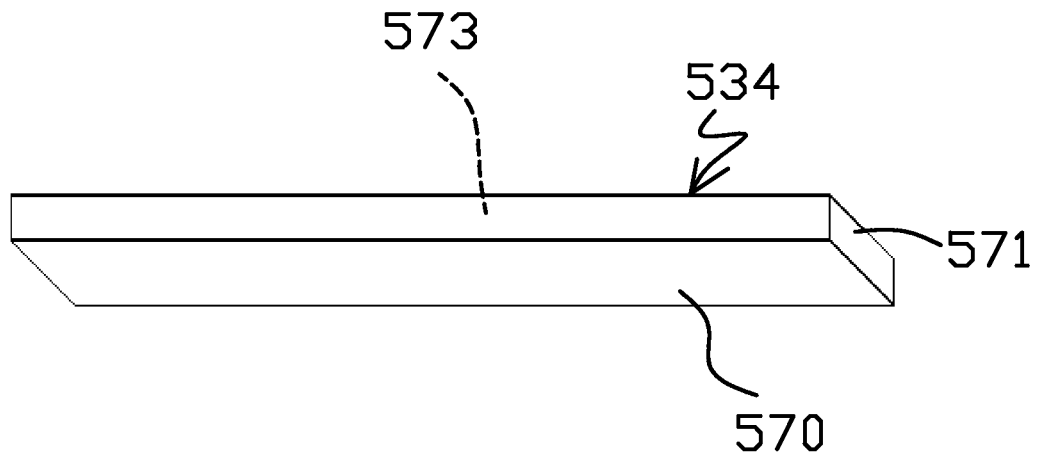

FIG. 21 is an isometric illustration of a motor.

Figure 22:
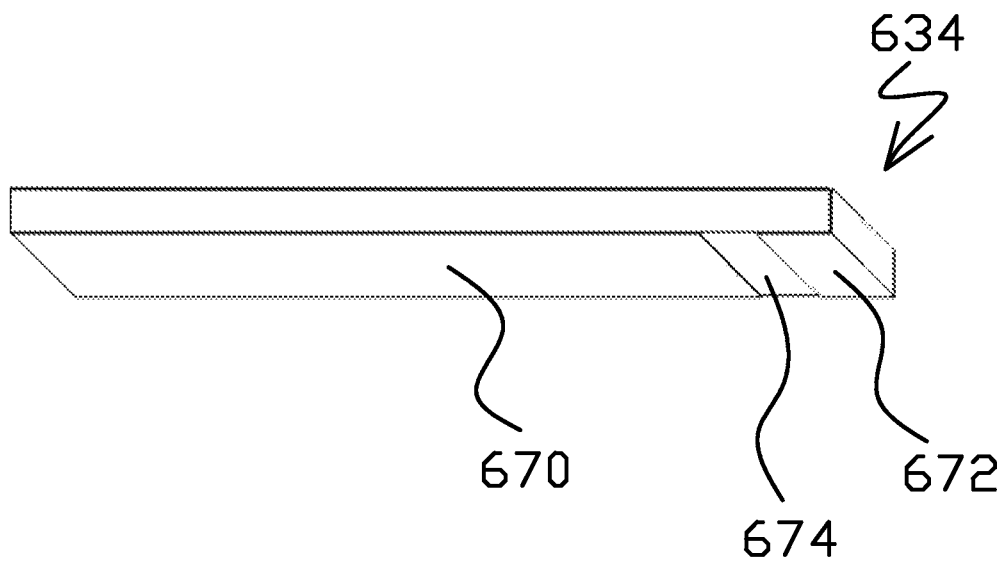

FIG. 22 is an isometric illustration of an alternative motor.

Figure 23:
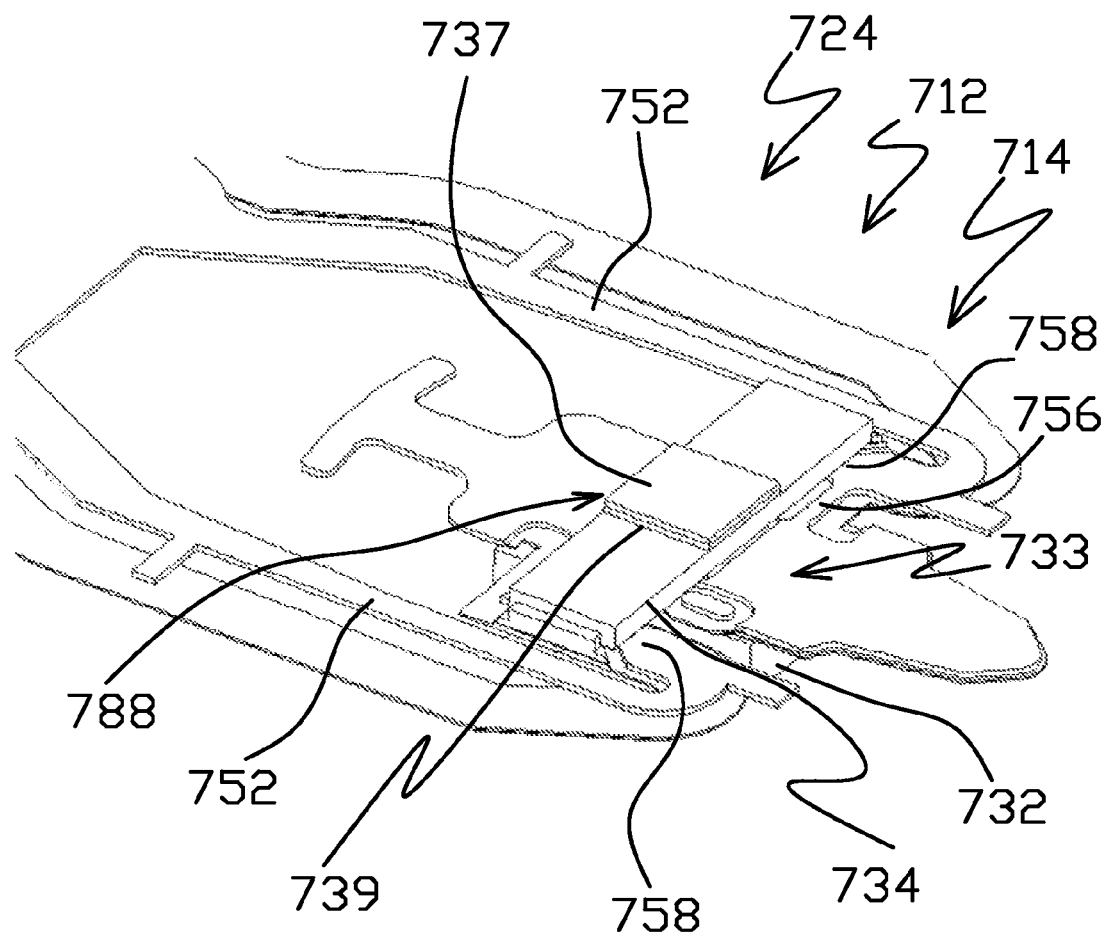

FIG. 23 is an isometric view of the stainless steel side of the distal end of a flexure and DSA structure in accordance with another embodiment.

Figure 24:
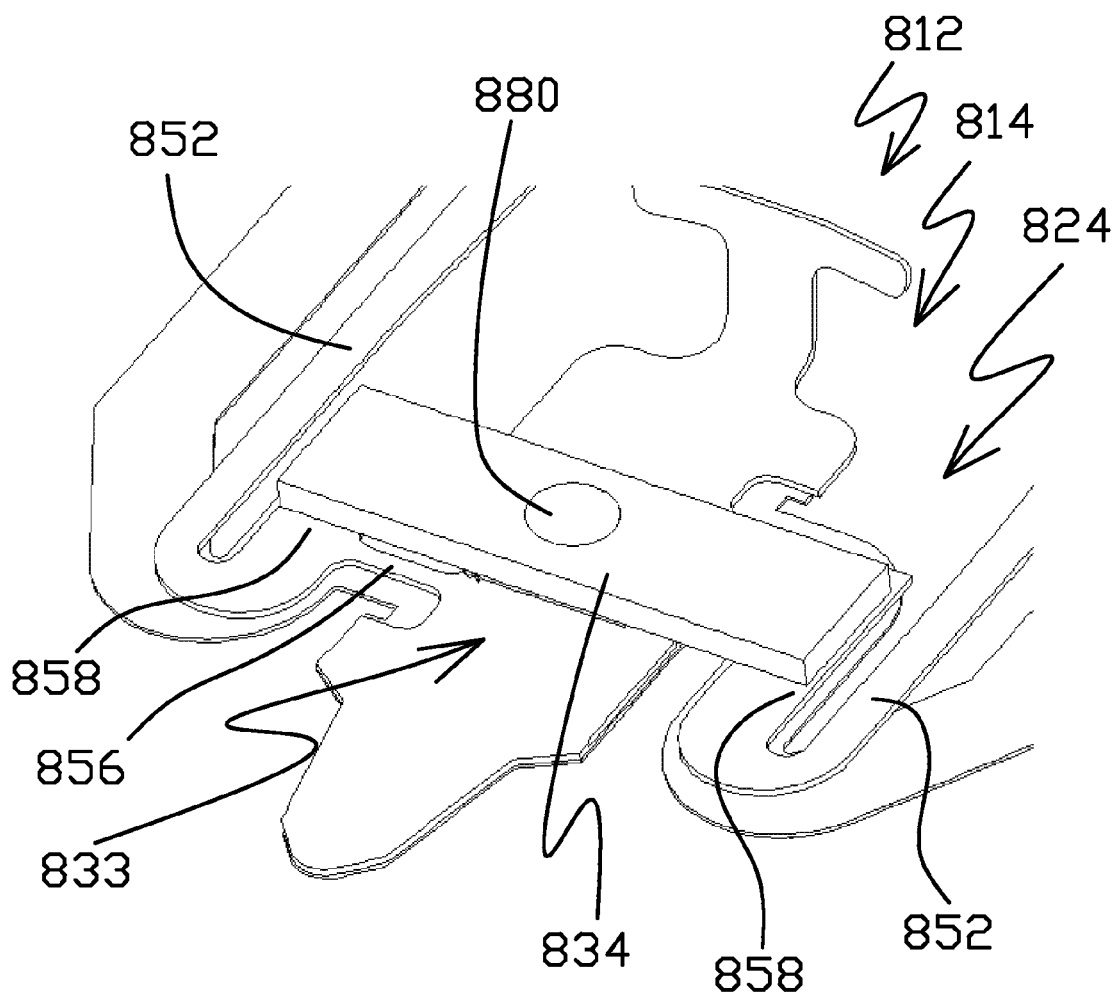

FIG. 24 is an isometric view of the stainless steel side of the distal end of a flexure and DSA structure in accordance with another embodiment.

Figure 25:
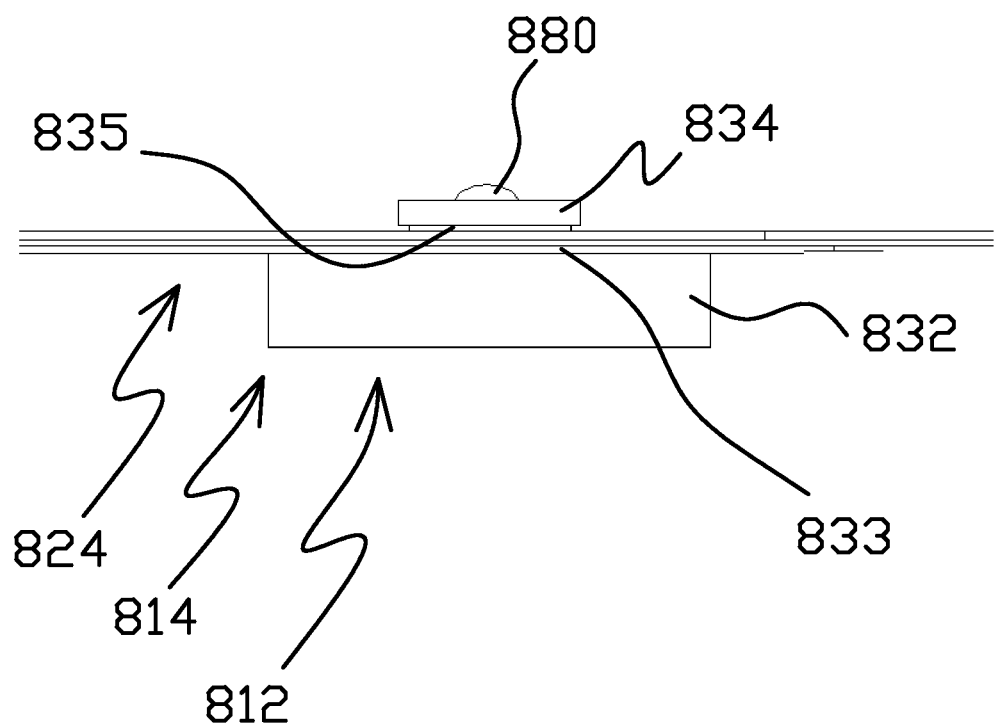

FIG. 25 is a side view of the flexure shown in FIG. 24.

Figure 26:
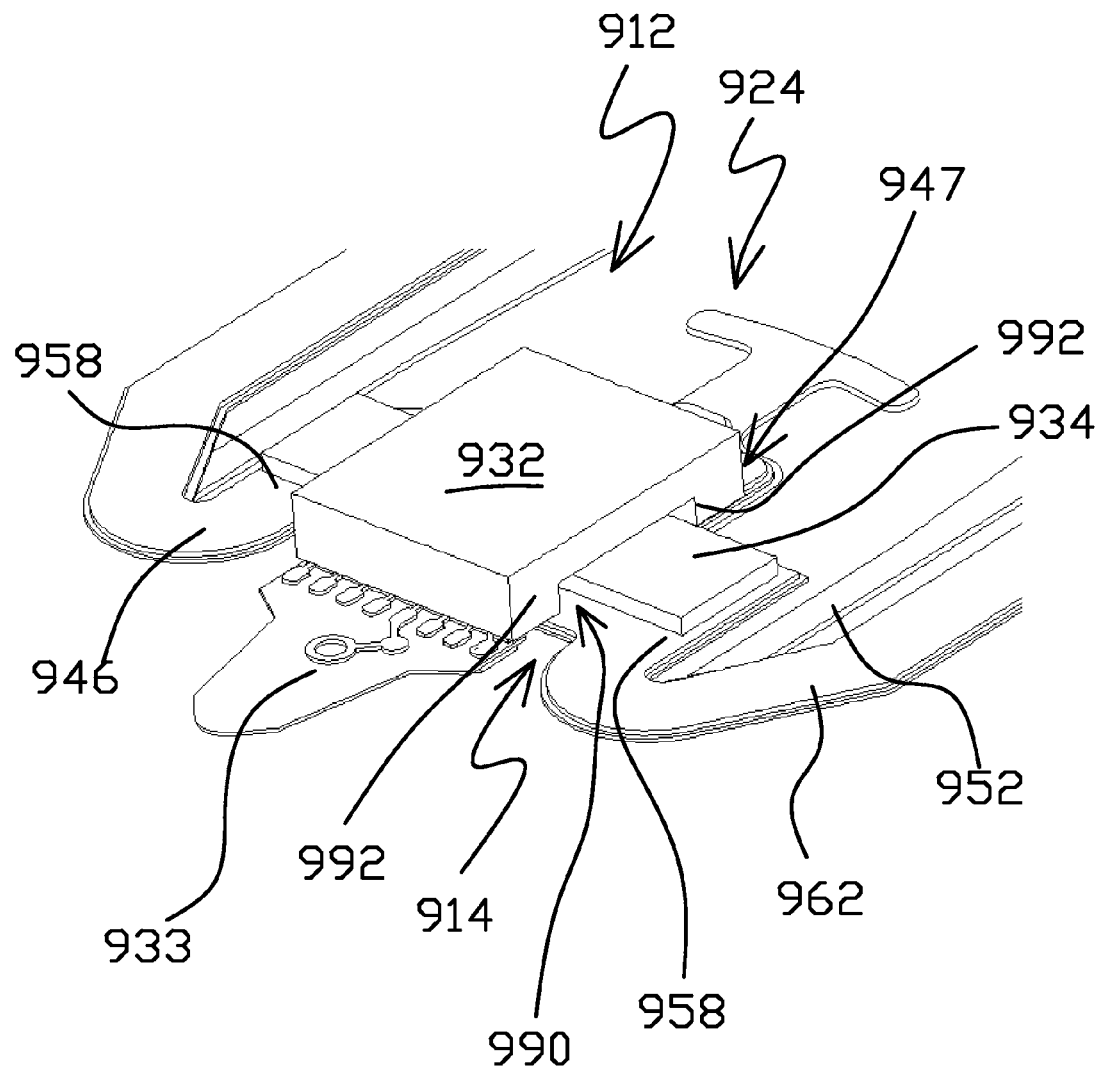

FIG. 26 is an isometric of the trace side of a flexure having a trace side DSA structure in accordance with another embodiment.

Figure 27:
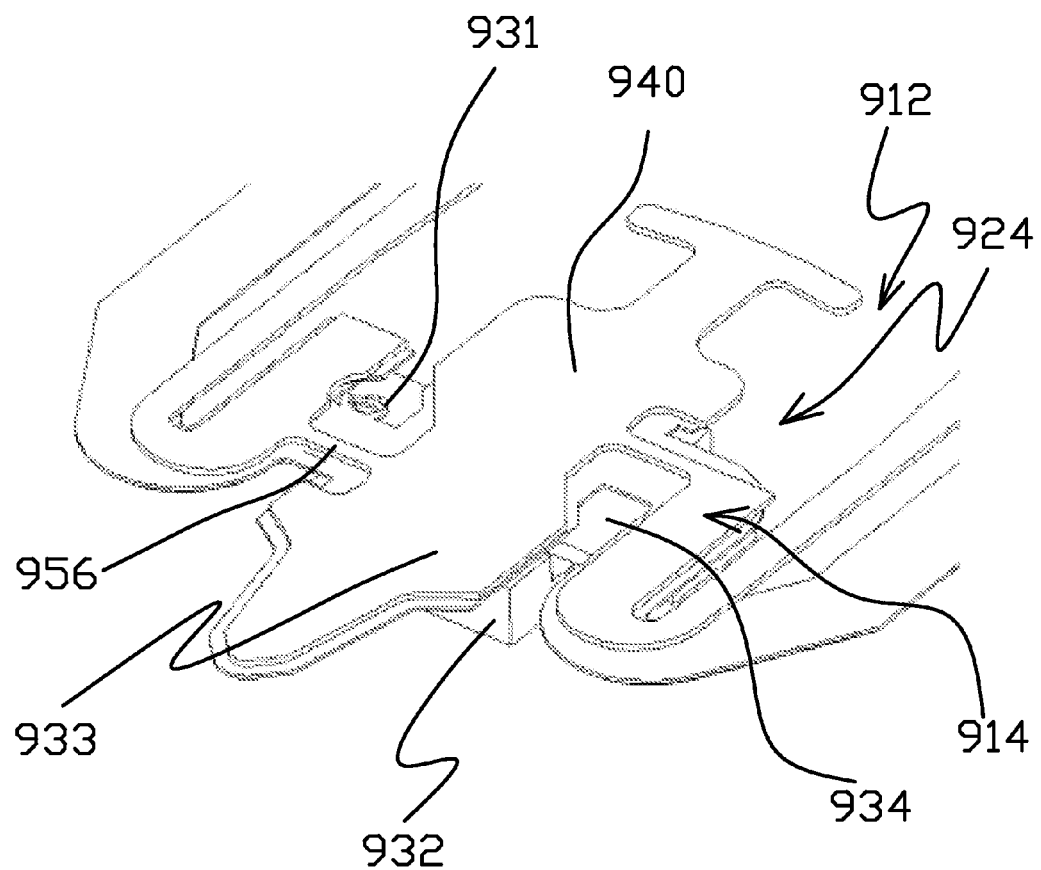

FIG. 27 is an isometric view of the stainless steel side of the flexure shown in FIG. 26.

Figure 28:
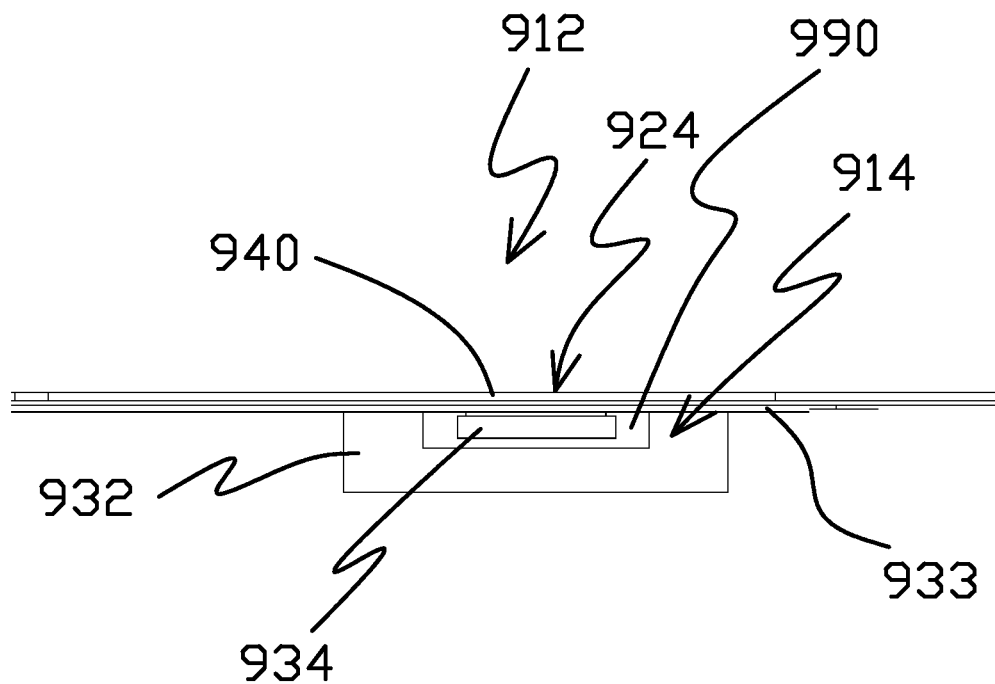

FIG. 28 is a side view of the flexure shown in FIGS. 26 and 27.

Figure 29:
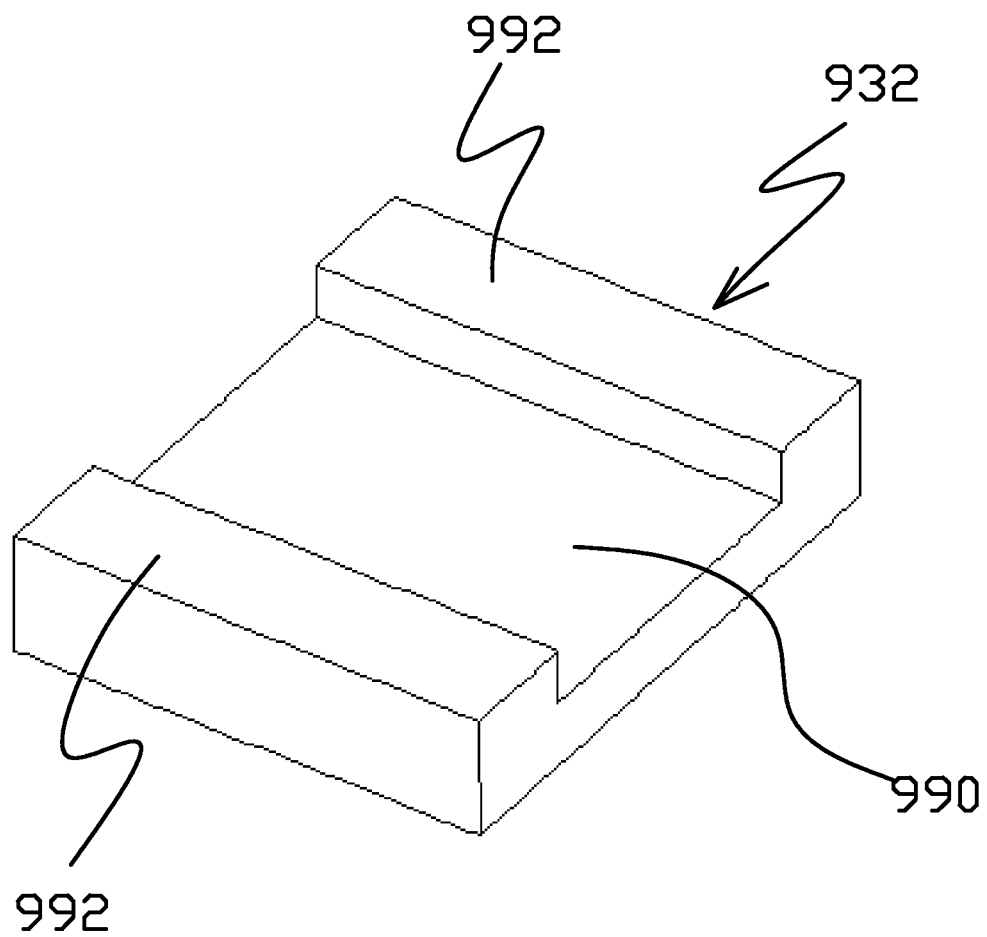

FIG. 29 is an isometric view of the head slider shown in FIGS. 25-28.

Figure 30:
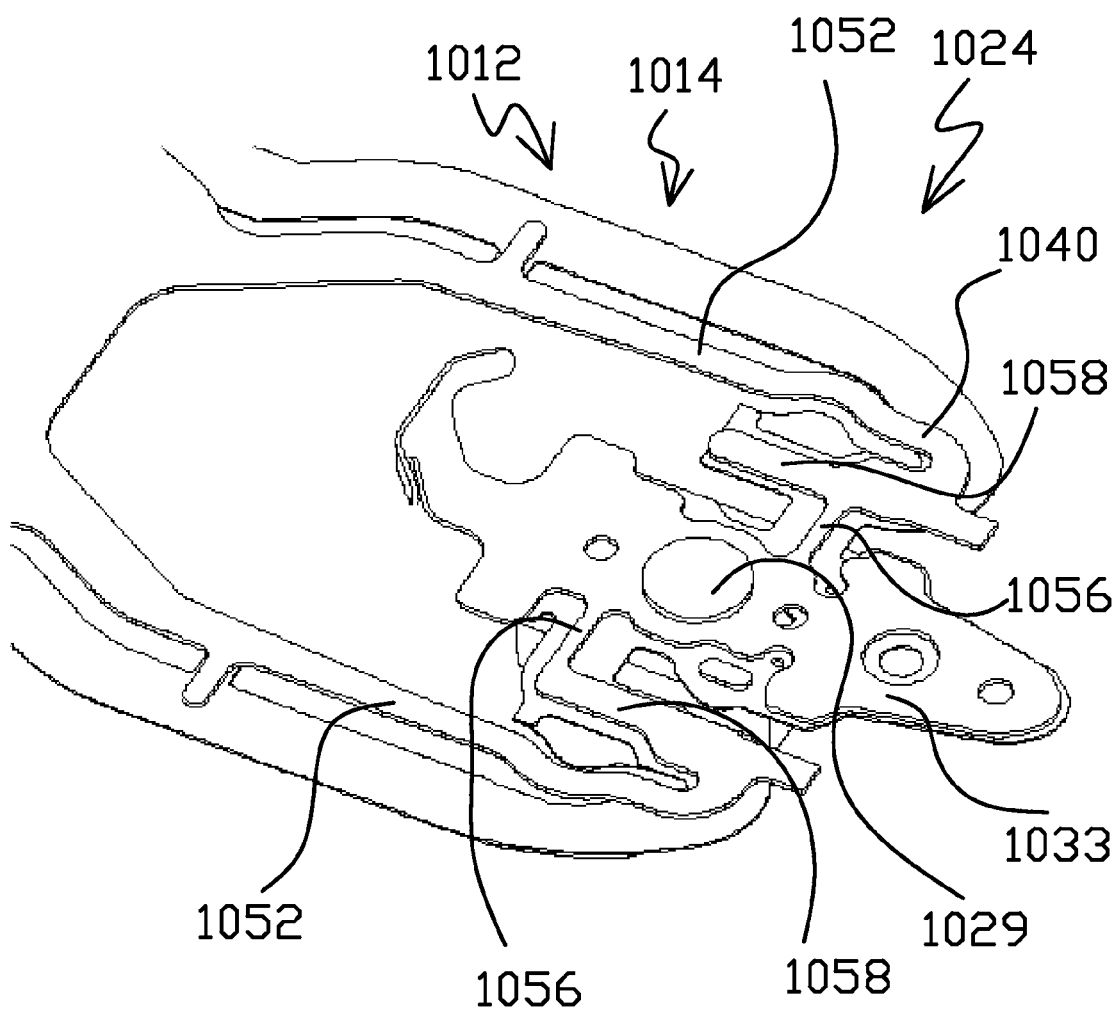

FIG. 30 is an isometric view of the stainless steel side of the distal end of a flexure in accordance with another embodiment.

DESCRIPTION OF THE INVENTION

Figure 1:
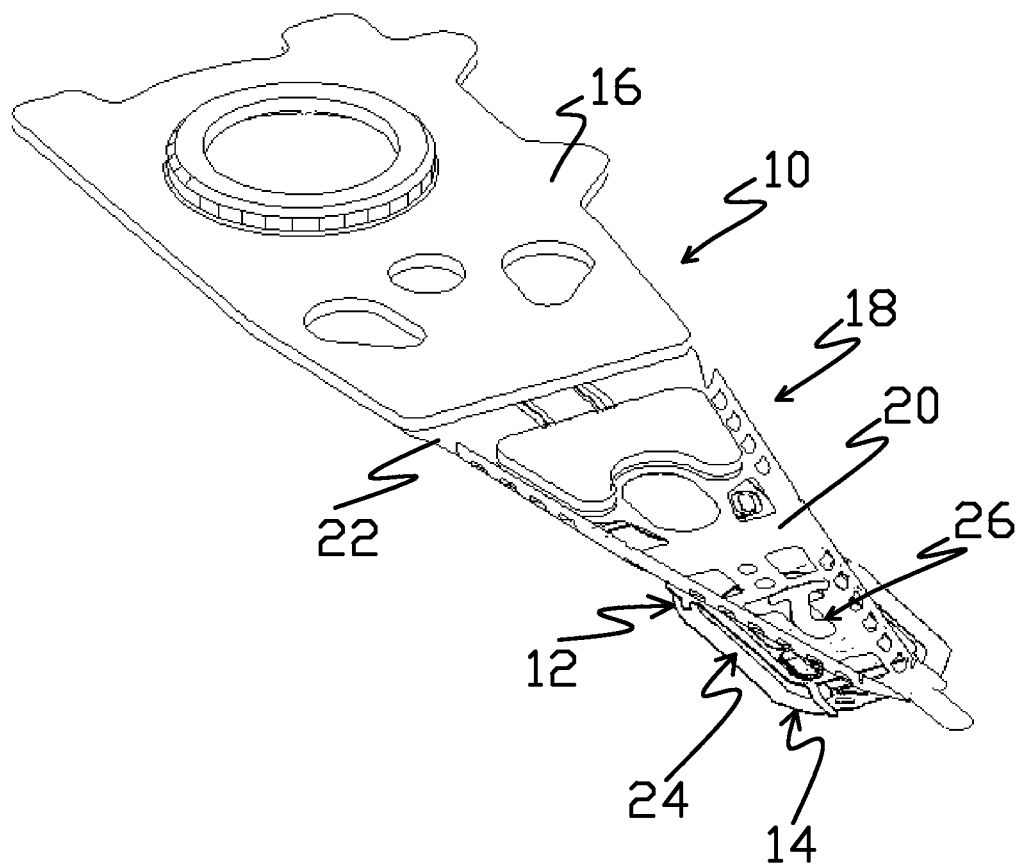
FIG. 1 is an isometric view of the loadbeam side of a suspension having a flexure with a dual stage actuation (DSA) structure.
Figure 2:
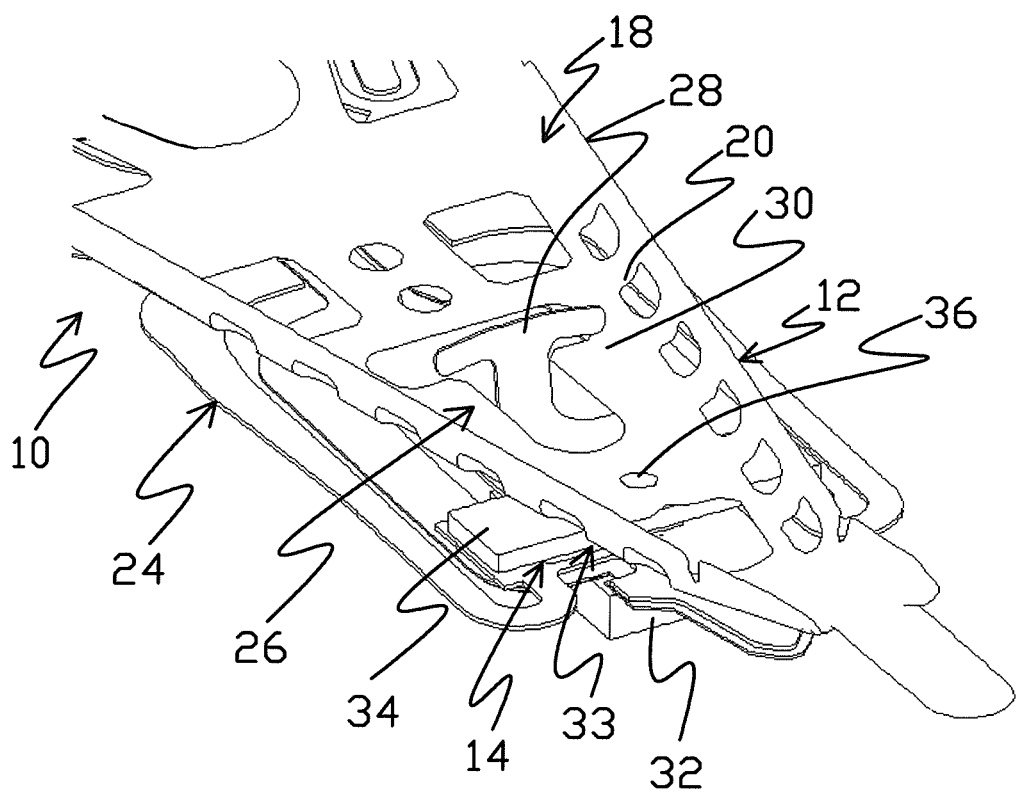
FIG. 2 is an isometric view of the loadbeam side of the distal end of the suspension shown in FIG. 1.
Figure 3:
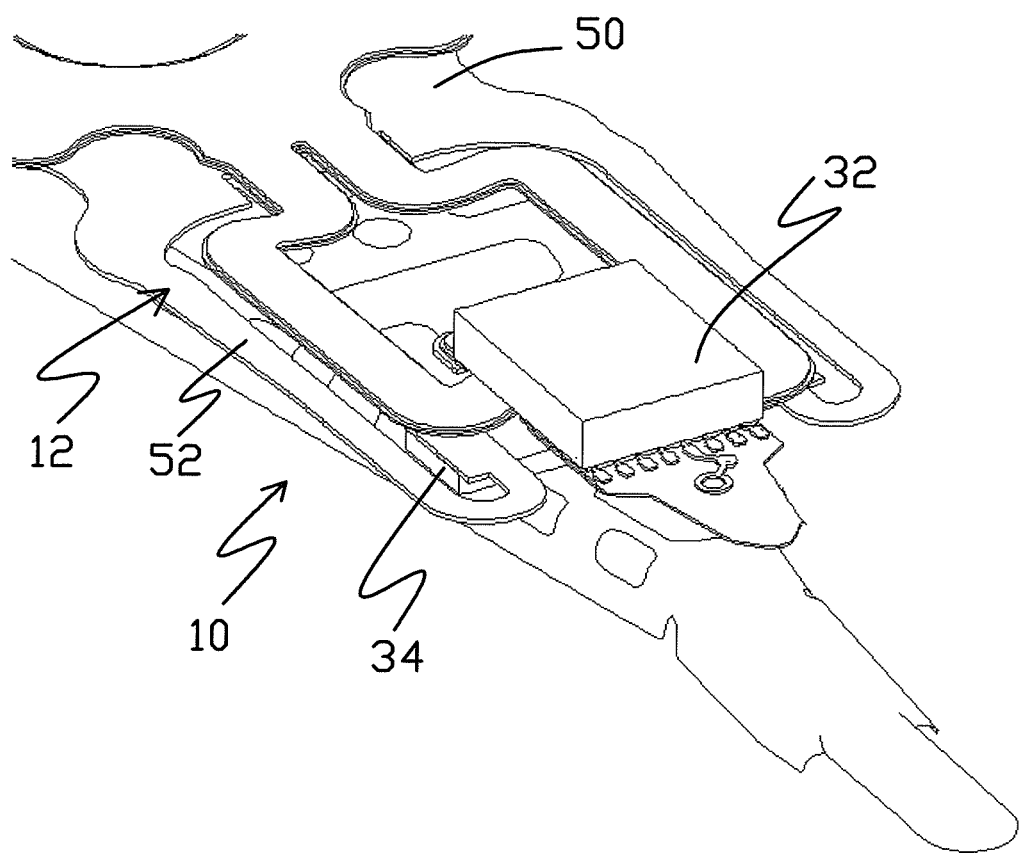
FIG. 3 is an isometric view of the flexure side (i.e., the side opposite that shown in FIG. 2) of the distal end of the suspension shown in FIG. 1.

FIG. 1 is an isometric view of the loadbeam side of a suspension 10 having a flexure 12 with a co-located or gimbal-based dual stage actuation (DSA) structure 14 in accordance with a first embodiment of this disclosure (i.e., a stainless steel side version). FIG. 2 is a detailed isometric view of the distal end of the suspension 10. FIG. 3 is a detailed isometric view of the flexure side of the distal end of the suspension 10, which shows the side opposite that shown in FIG. 2. As shown in FIG. 1, the suspension 10 includes a baseplate 16 as a proximal mounting structure. As further shown in FIG. 1, the suspension 10 includes a loadbeam 18 having a rigid or beam region 20 coupled to the baseplate 16 along a spring or hinge region 22. The loadbeam 18 can be formed from stainless steel.

Flexure 12 includes a gimbal 24 at the distal end of the flexure 12. A DSA structure 14 is located on the gimbal 24, adjacent the distal end of the loadbeam 18. As best shown in FIG. 2, the suspension 10 includes a gimbal limiter 26 comprising a tab 28 configured to engage a stop portion 30 of the loadbeam 18. A head slider 32 is mounted to a head slider mounting or tongue 33 of the gimbal 24, on the side of the suspension 10 that is opposite the loadbeam 18. DSA structure 14 includes a motor 34, which is a PZT or other piezoelectric actuator in the illustrated embodiment, mounted to the gimbal 24 of the flexure 12 between the loadbeam 18 and the head slider 32. The motor 34 can be a single layer or multi-layer piezoelectric structure. In a multi-layered embodiment, anode and cathode layers can alternate through the total thickness of the motor 34. As described in greater detail below, in response to electrical drive signals applied to the motor 34, the motor drives portions of the gimbal 24, including the tongue 33 and head slider 32, about a generally transverse tracking axis. Proximal and distal, as used herein, refers to the relative direction along the longitudinal axis of the suspension while lateral refers to the left and/or right directions orthogonal to the longitudinal axis of the suspension. For example, the baseplate 16 is proximal of the loadbeam 18 while opposite ends of the motor 34 extend laterally.

Figure 4A:
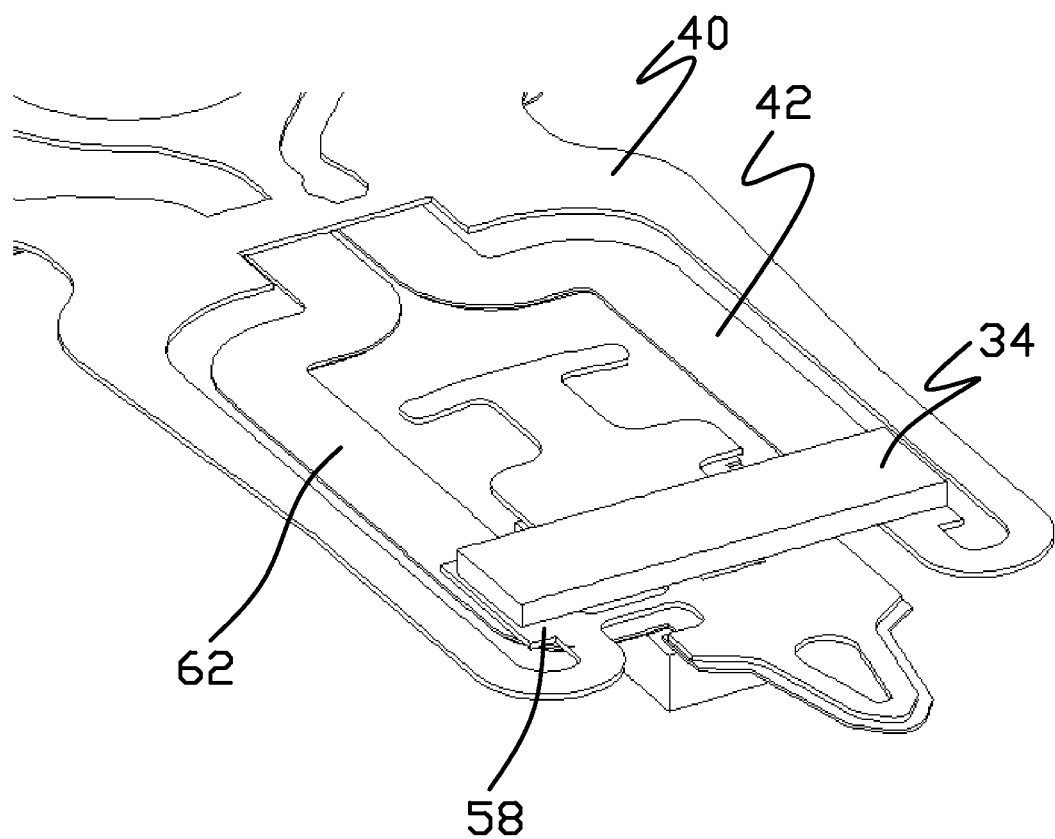
FIG. 4A is an isometric view of the stainless steel side of the flexure shown in FIG. 1.
Figure 4B:
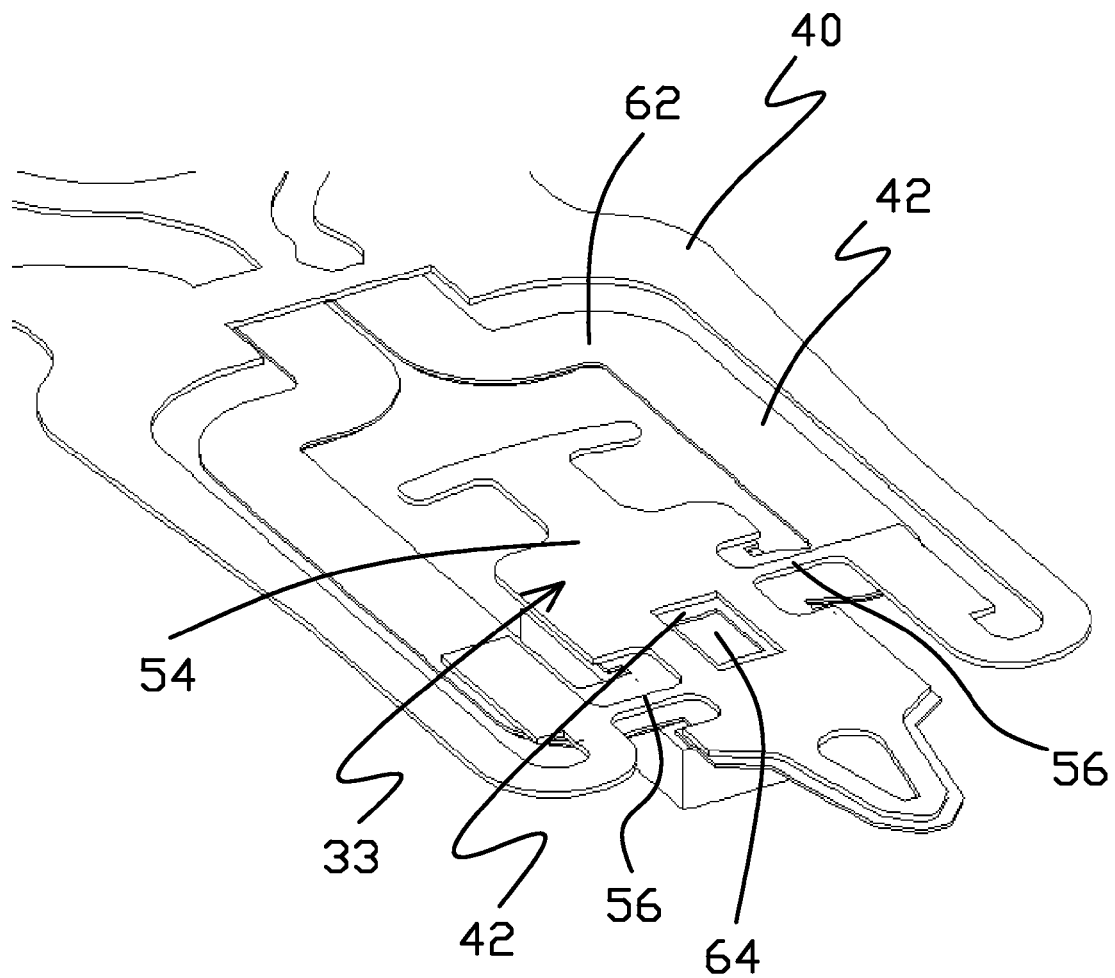
FIG. 4B is the view of FIG. 4A but with the piezoelectric motor removed.

FIGS. 4A and 4B are isometric views of the stainless steel side of the flexure 12 and DSA structure 14 shown in FIG. 1. The motor 34 is not shown in FIG. 4B to show further details of the tongue 33. FIGS. 5A-5F are isometric views of the trace side (i.e., the side opposite that shown in FIGS. 4A and 4B) of the flexure 12 and DSA structure 14. Specifically, FIGS. 5A-5F show the various layers that comprise the flexure 12 and DSA structure 14. FIG. 5B is the drawing of FIG. 5A but with the head slider 32 removed to further show details of the tongue 33. FIG. 5C is the drawing of FIG. 5B but with a polyimide coverlay 46 removed to reveal a conductive material layer 44 including traces 60 and other structures formed in the conductive material layer that is otherwise underneath the polyimide coverlay 46. FIG. 5D is the drawing of FIG. 5C but with the conductive material layer 44 removed to more fully reveal the dielectric layer 42 that is otherwise underneath the conductive material layer 44. FIG. 5E is the drawing of FIG.

5D but with the dielectric layer 42 removed to show only the stainless steel layer 40 and the motor 34. FIG. 5F is the drawing of FIG. 5E but with the motor 34 removed to illustrate only the stainless steel layer 40 of the flexure 12. It will be understood that the stainless steel layer 40 could alternatively be formed from another metal or rigid material.

Figure 8A:
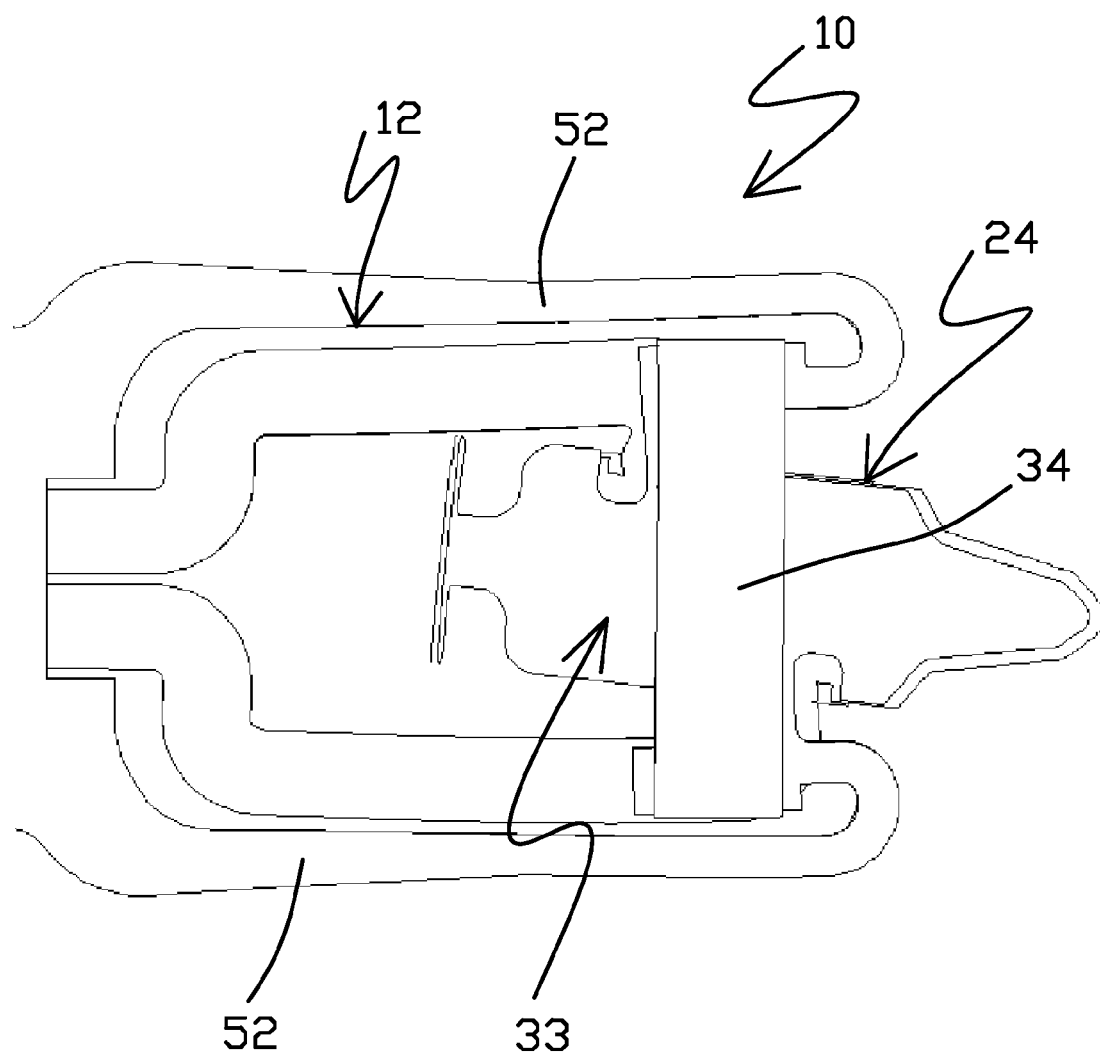
FIGS. 8A-8C are plan views of the stainless steel side of the flexure shown in FIG. 1, illustrating the operation of the DSA structure.
Figure 8B:
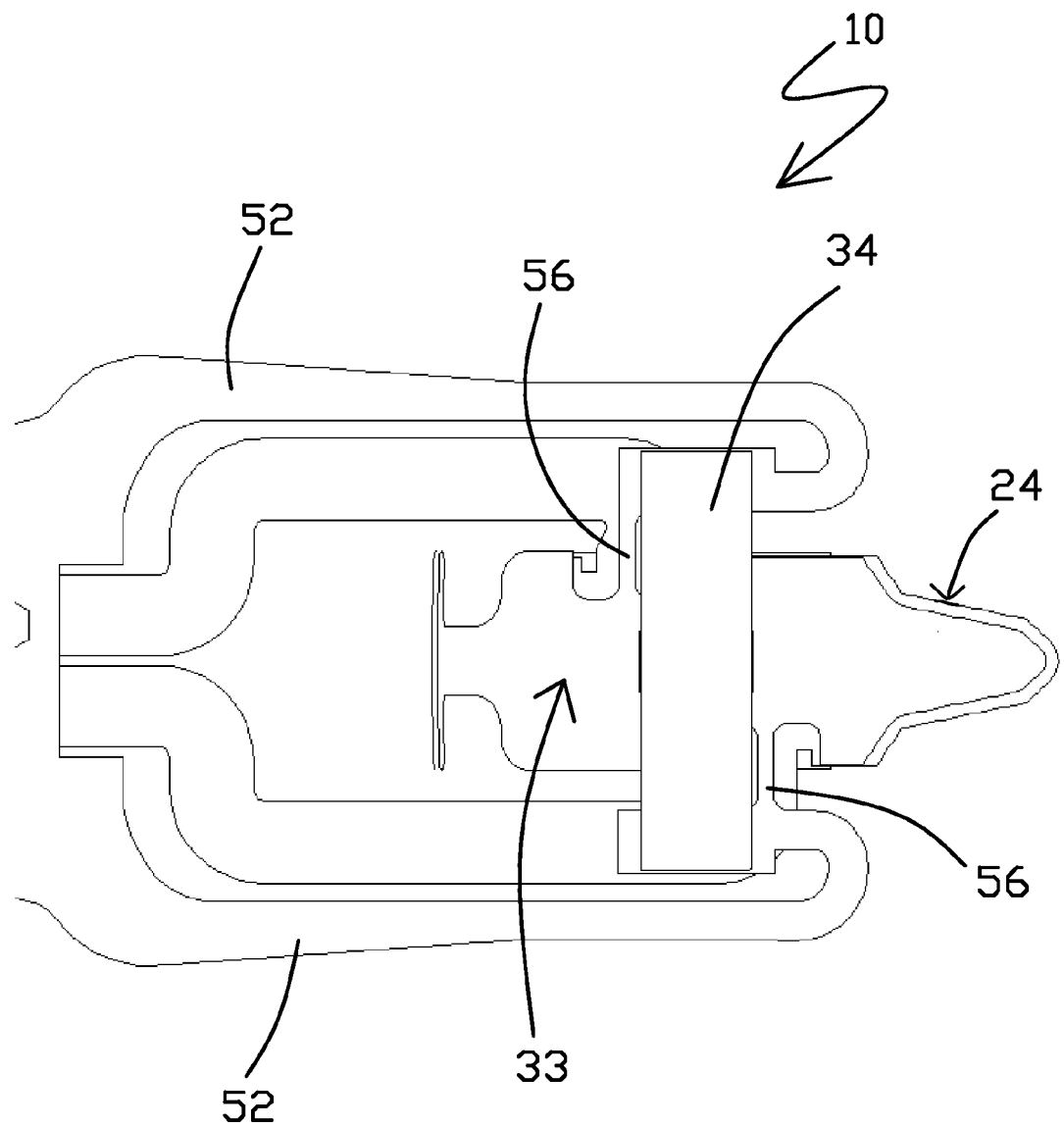

As shown in FIGS. 5A-5F, the flexure 12 is formed from overlaying spring metal such as stainless steel layer 40, polyimide or other dielectric layer 42, copper or other conductive material layer 44 and polyimide coverlay 46. The dielectric layer 42 generally electrically isolates structures formed in the conductive material layer 44 from adjacent portions of the stainless steel layer 40. Coverlay 46 generally covers and protects the structures formed in the conductive material layer 44. The gimbal 24 includes the spring arms 52 and the tongue 33. The spring arms 52 extend from the base portion 50. The mounting portion 54, which is part of the tongue 33, is supported between the spring arms 52 by a pair of struts 56 that extend from support regions 58 on the distal end portions of the spring arms 52. In some embodiments, the pair of struts 56 is the only part of the stainless steel layer 40 that connects or otherwise supports the tongue 33 between the spring arms 52. Specifically, the struts 56 can be the only structural linkage between the spring arms 52 and the tongue 33. Also, the struts 56, in connecting with the tongue 33, can be the only part of the stainless steel layer 40 that connects between the spring arms 52 distal of the base portion 50. As shown, the struts 56 are offset from one another with respect to the longitudinal axis of the flexure 12 or otherwise configured so as to provide for rotational movement of the mounting portion 54 about the tracking axis with respect to the spring arms 52. As best shown in FIG. 8B (further discussed herein), one strut 56 of the pair of struts 56 is located proximally of the motor 34 while the other strut 56 of the pair of struts 56 is located distally of the motor 34 such that the motor 34 is between the pair of struts 56. Each strut 56 has a longitudinal axis that extends generally perpendicular with respect to the longitudinal axis of the suspension 10. The longitudinal axes of the struts 56 extend parallel but do not intersect or otherwise overlap with each other when the struts 56 are not stressed (e.g., not bent). As shown in FIG. 5F, the struts 56 can each be the narrowest part of the stainless steel layer 40 in an X-Y plane (as viewed from the overhead perspective of FIG. 8B) while the thickness of the stainless steel layer 40 can be consistent along the flexure 12.

As perhaps best shown in FIGS. 4A and 5E, the opposite ends of the motor 34 are attached (e.g., by structural adhesive such as epoxy) to the support regions 58 of the spring arms 52. In this way, the support regions 58 can serve as motor mounting pads. Portions of the dielectric layer 42 extend underneath the struts 56 in FIG. 4B. As shown in FIG. 5C, a plurality of traces 60 formed in the conductive material layer 44 extend between the base portion 50 and the tongue 33 over supporting portions 62 formed in the dielectric layer 42. A number of the traces 60 terminate at locations on a distal region on the tongue 33 and are configured to be electrically attached to terminals of the read/write head (not shown) on the head slider 32. Other traces 60 terminate at a contact such as copper pad 64 on the tongue 33, below the motor 34. In the illustrated embodiment, the copper pad 64 is located generally centrally between the spring arms 52. As perhaps best shown in FIG. 4B, the dielectric layer 42 has an opening over the pad 64. A structural and electrical connection, e.g., using conductive adhesive, is made between the copper pad 64 and an electrical terminal on the motor 34. Another electrical connection to a terminal on the motor 34 (e.g., a ground terminal) is made through the dimple 36 (i.e., the dimple 36 is in electrical contact with the terminal on the motor 34). In other embodiments, the electrical connections to the motor 34 can be made by other approaches and structures, such as traces along the flexure 12.

Figure 5A:
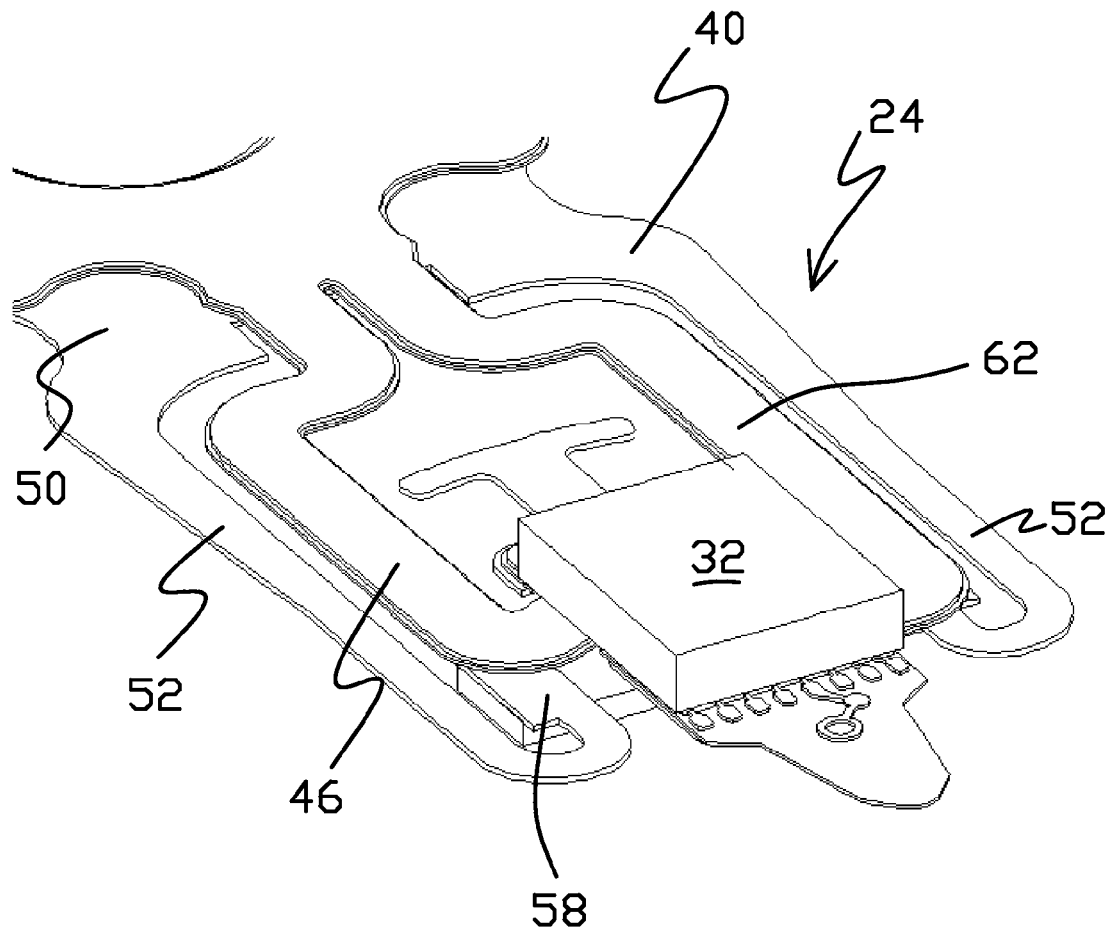
FIG. 5A is an isometric view of the trace side (i.e., the side opposite that shown in FIG. 4A) of the flexure shown in FIG. 1.
Figure 5B:
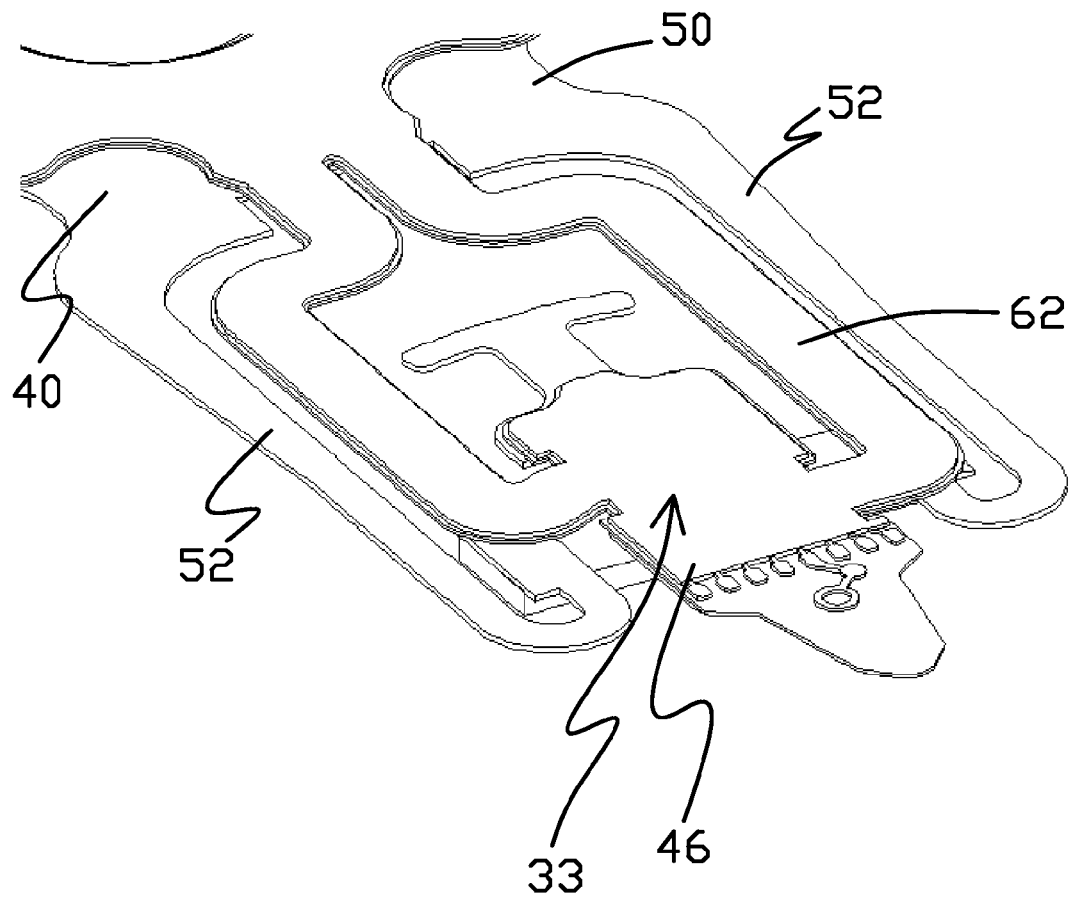
FIG. 5B is the view of FIG. 5A but with the head slider removed.
Figure 5C:
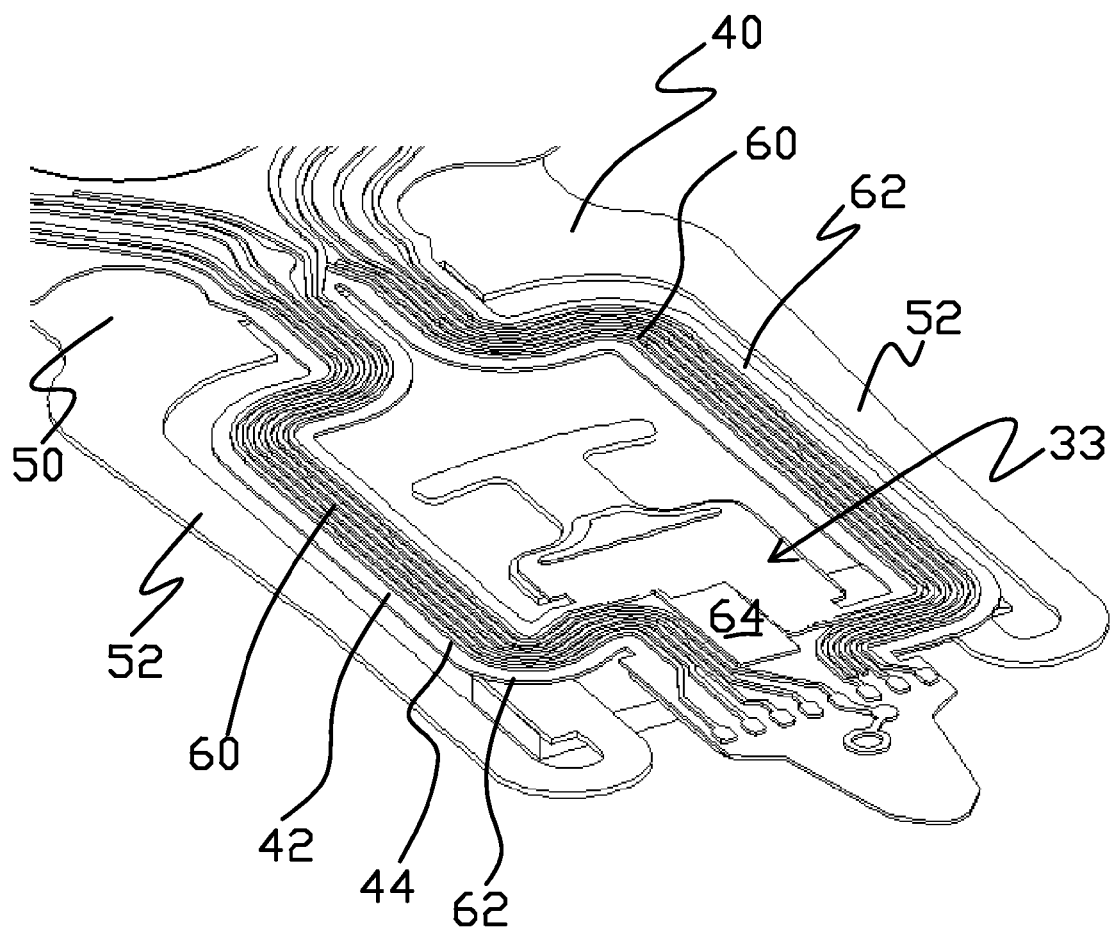
FIG. 5C is the view of FIG. 5B but with the polyimide coverlay removed.
Figure 5D:
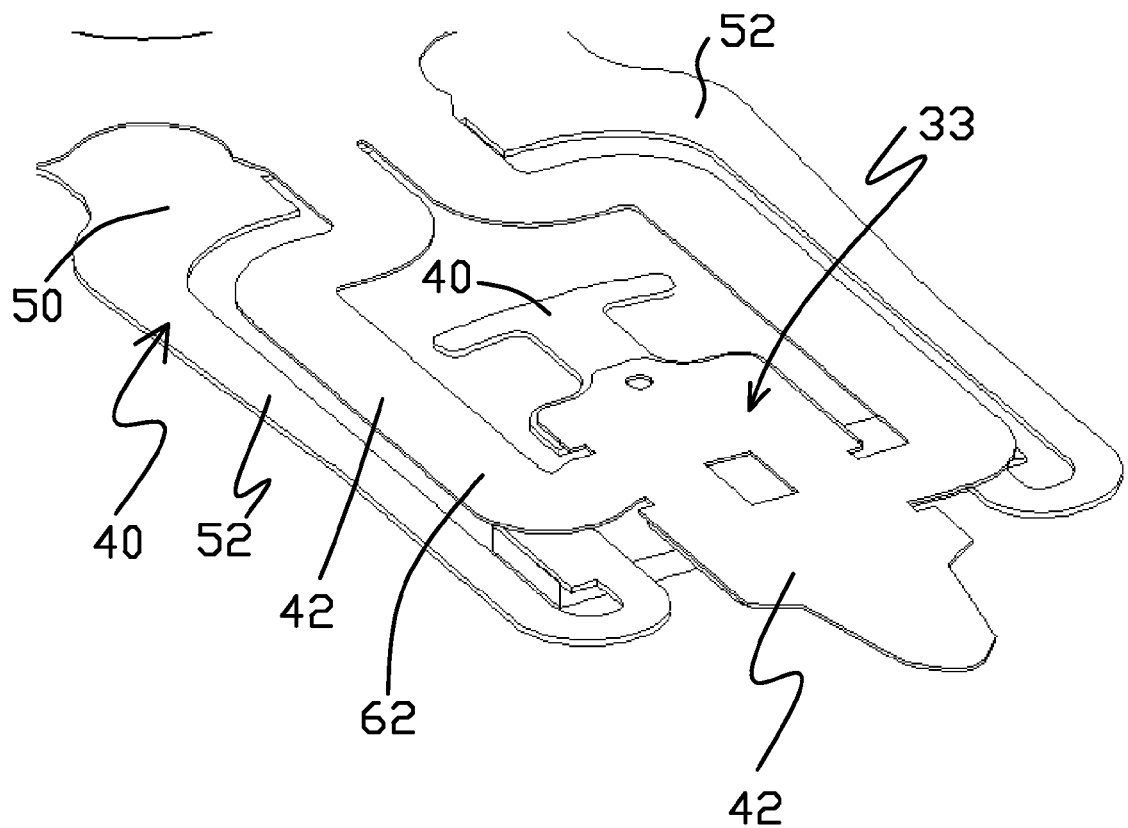
FIG. 5D is the view of FIG. 5C but with the conductive material layer removed.
Figure 5E:
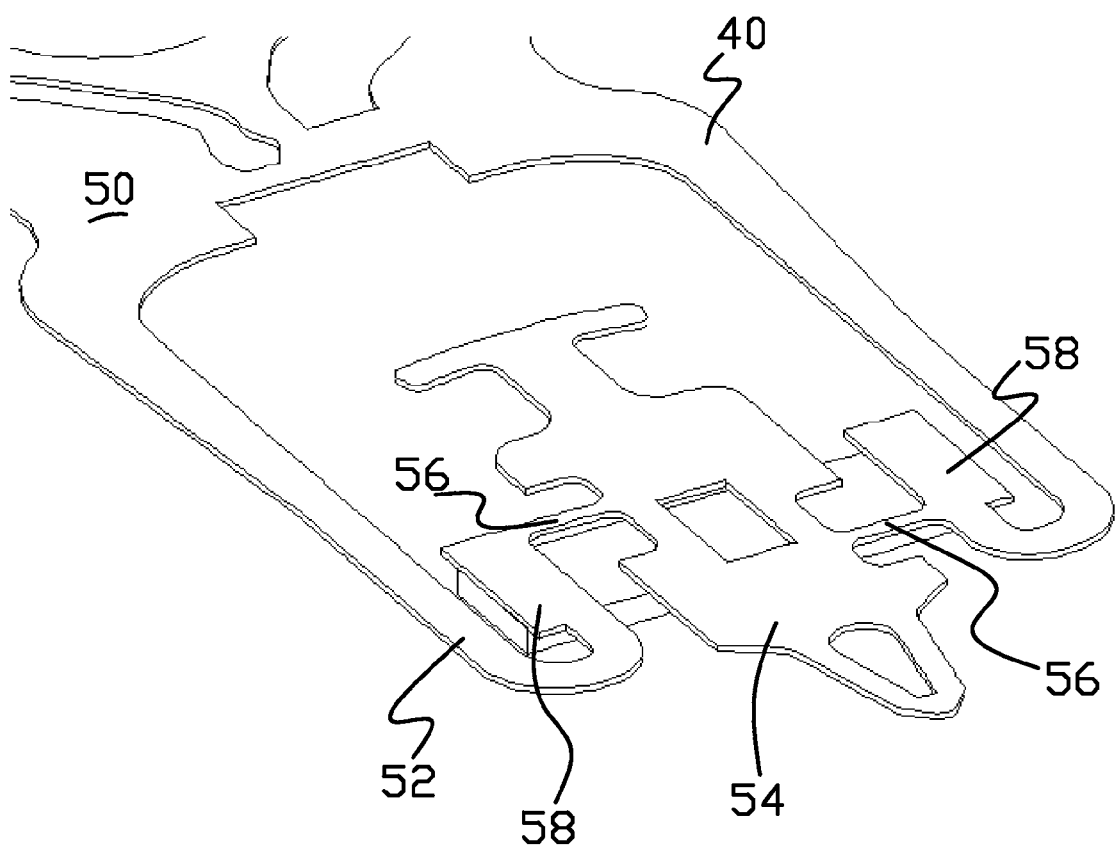
FIG. 5E is the view of FIG. 5D but with the dielectric material layer removed.
Figure 5F:
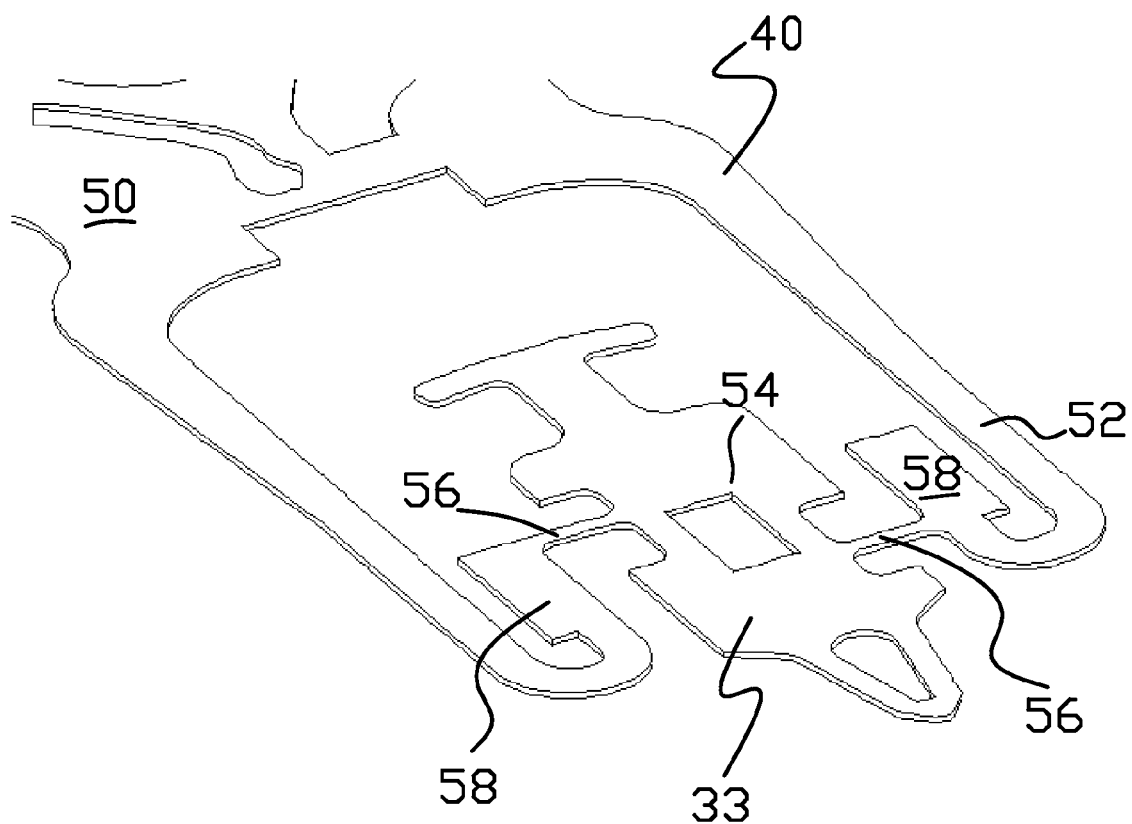
FIG. 5F is the view of FIG. 5E but with the piezoelectric motor removed.

As shown in FIGS. 5A and 5B, the head slider 32 sits on the coverlay 46 of the tongue 33. Coverlay 46 provides protection for the traces 60. As shown in FIGS. 5A-5C, which show that the supporting portions 62 are offset with respect to the longitudinal direction of the flexure 12, portions of the traces 60 on the opposite sides of the flexure 12 are offset from each other in a manner similar to that of the struts 56 (e.g., portions of the traces overlay the struts in the illustrated embodiment). Offset traces of this type can increase the stroke performance of the DSA structure 14. Various other embodiments (not shown) do not have offset traces. It is noted that, in some embodiments, the supporting portions 62 may provide negligible mechanical support to the tongue 33 relative to the struts 56.

Figure 6:
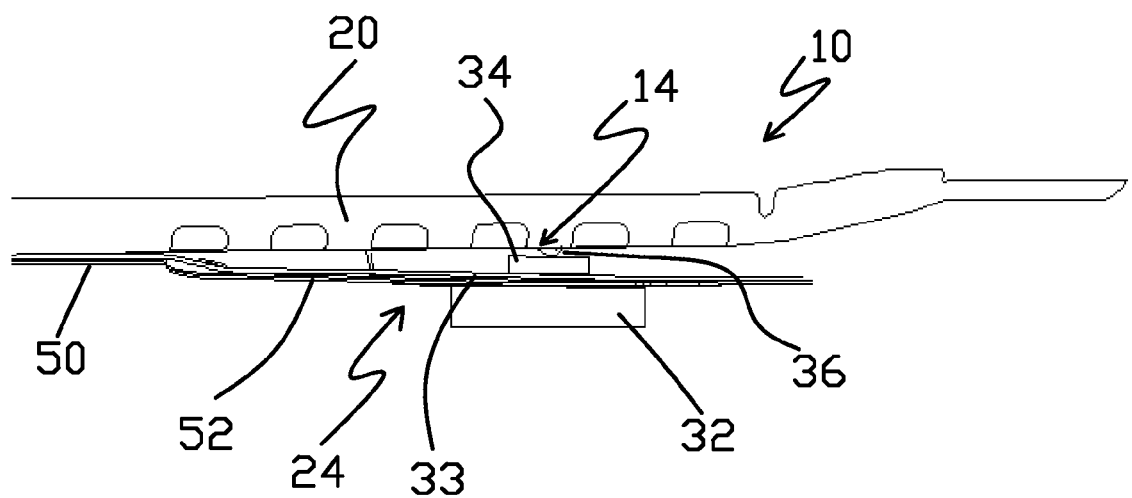
FIG. 6 is a side view of the distal end of the suspension shown in FIG. 1.
Figure 7:
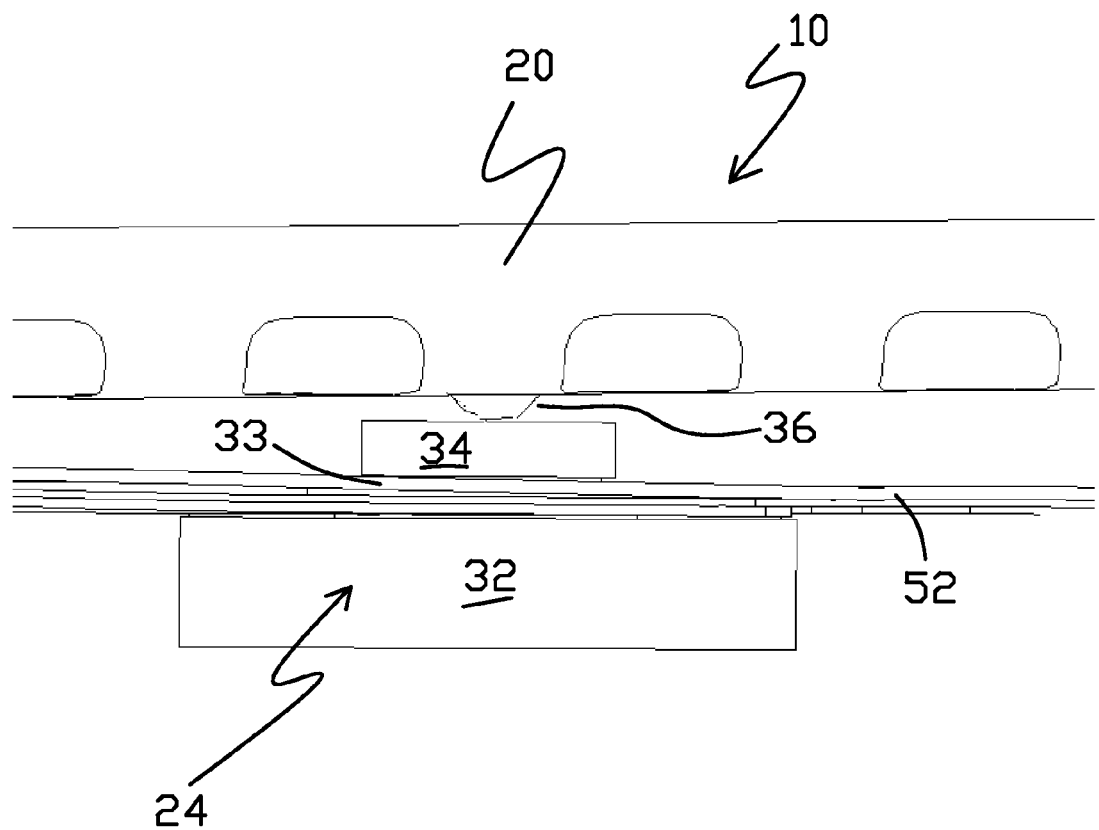
FIG. 7 is a closer view of the portion of FIG. 6 showing the dimple, motor, and head slider.

FIGS. 6 and 7 are side views of the suspension 10, illustrating the gimbal 24 and DSA structure 14. As shown, the dimple 36, which is a structure formed in the stainless steel material that forms the loadbeam 18, and which extends from the loadbeam 18, engages the motor 34 and functions as a load point by urging the portion of the gimbal 24 to which the motor 34 is connected out of plane with respect to the base portion 50 of the flexure 12. A bend or transition in the flexure 12 can occur at any desired location along the spring arms 52 due to the urging of the gimbal 24 by the dimple 36. The dimple 36 can also provide an electrical contact to a terminal (not visible) on the portion of the motor 34 engaged by the dimple. For example, if the stainless steel loadbeam 18 is electrically grounded or otherwise part of an electrical circuit, the dimple 36 can provide an electrical ground potential or electrical connection to the terminal on the motor 34. Various other embodiments (not shown) include other dimple structures such as plated structures that provide these functions. The dimple 36 can be plated with conductive material such as gold to enhance the electrical connection to the terminal of the motor 34 which can also be plated with conductive material such as gold. Still other embodiments (not shown) use structures other than the dimple 36 to provide a grounding or other electrical connection to the motor 34. In one such embodiment, for example, there is another copper pad on the end of one of the support regions 58, and an electrical connection (e.g., a ground connection) can be made by a structure such as conductive adhesive between a terminal on the motor 34 and the conductive material pad on the support region of the flexure 12. In some embodiments, the motor 34 is structurally attached to the tongue 33 at a location between the opposite lateral end portions of the tongue 33. In such embodiments, the motor 34 is attached to the tongue 33 of the gimbal 24 in addition to the motor 34 being attached to the support regions 58 of the spring arms 52.

The operation of DSA structure 14 can be described with reference to FIGS. 8A-8C that are plan views of the stainless steel side of the gimbal 24 of the flexure 12. As shown in FIG. 8B, the DSA structure 14 and tongue 33 are in a neutral, undriven state with the tongue 33 generally centrally located between the spring arms 52 when no tracking drive signal is applied to the motor 34. As shown in FIG. 8A, when a first potential (e.g., positive) tracking drive signal is applied to the motor 34, the shape of the motor changes and its length generally expands. This change in shape increases the distance between the support regions 58 as shown in FIG. 8A, which in connection with the mechanical action of the linking struts 56, causes the tongue 33 to move or rotate in a first direction with respect to the spring arms 52 about the tracking axis. As shown, the lengthening of the motor 34 stretches the gimbal 24 laterally and causes the struts 56 to bend (e.g., bow inward). Because of the offset arrangement of the struts 56, the struts 56 bend such that the tongue 33 rotates in the first direction.

Figure 8C:
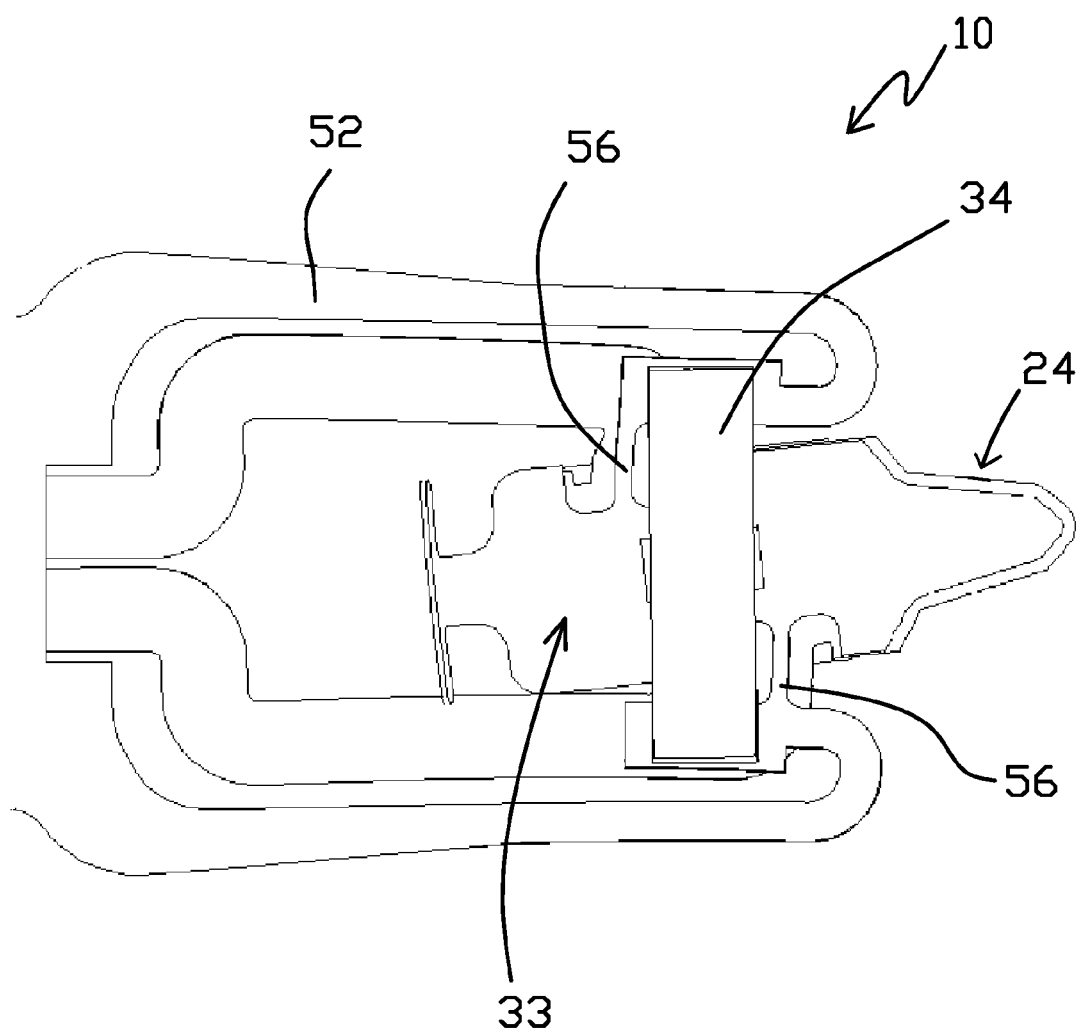

As shown in FIG. 8C, when a second potential (e.g., negative) tracking drive signal is applied to the motor 34, the shape of the motor changes and its length generally contracts. This change in shape decreases the distance between the support regions 58 as shown in FIG. 8C, which in connection with the mechanical action of the linking struts 56, causes the tongue 33 to move or rotate in a second direction with respect to the spring arms 52 about the tracking axis. The second direction is opposite the first direction. As shown, the shortening of the motor 34 compresses the gimbal 24 laterally and causes the struts 56 to bend (e.g., bow outward). Because of the offset arrangement of the struts 56, the struts 56 bend such that the tongue 33 rotates in the second direction. Some, although relatively little, out-of-plane motion of other portions of the gimbal 24 is produced during the tracking action of DSA structure 14 as described above. With this embodiment of this disclosure, head slider mounting on the tongue 33 generally rotates with respect to the spring arms 52 as the spring arms 52 stay stationary or experience little movement.

Figure 10:
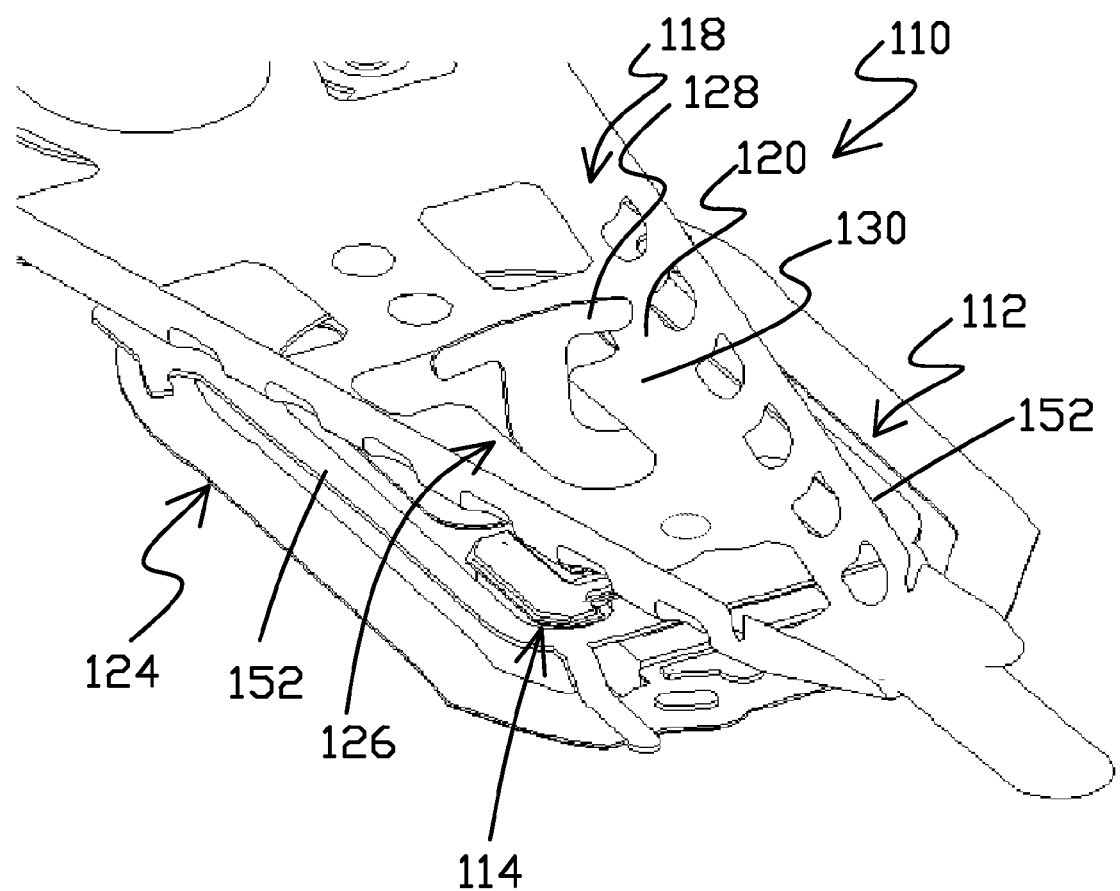
FIG. 10 is an isometric view of the loadbeam side of the distal end of the suspension shown in FIG. 9.
Figure 11:
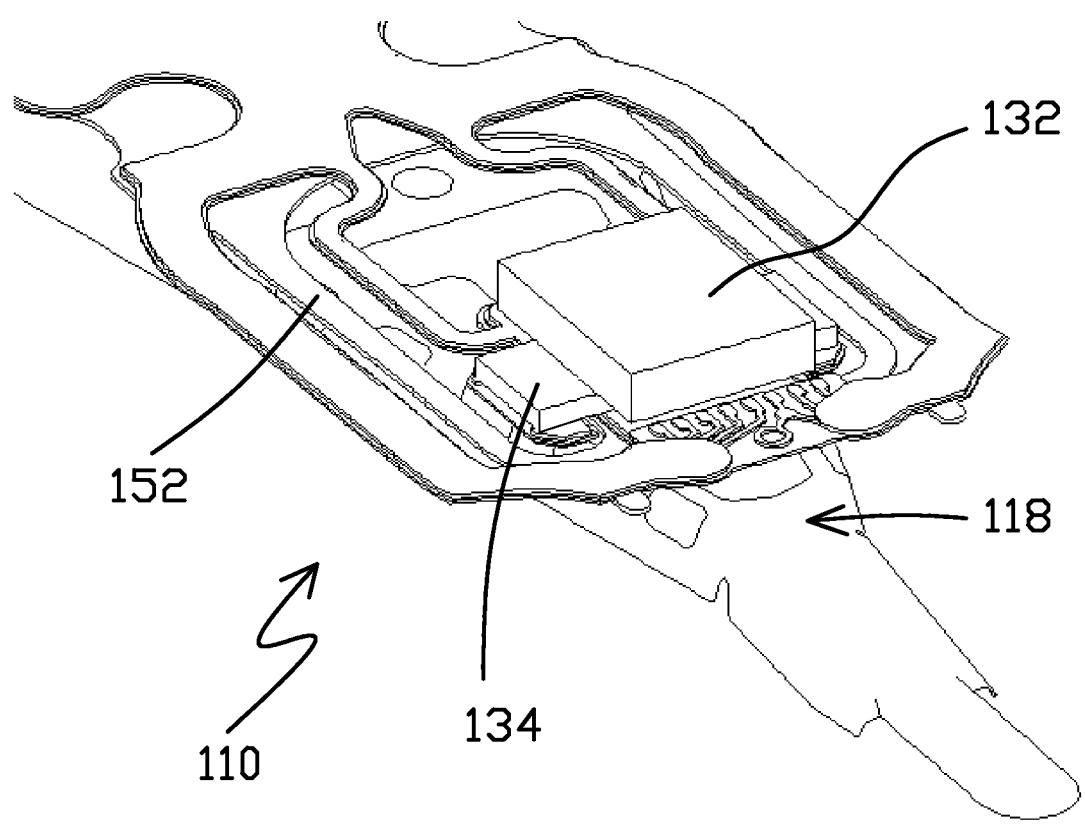
FIG. 11 is an isometric view of the flexure side (i.e., the side opposite that shown in FIG. 10) of the distal end of the suspension shown in FIG. 9.

FIG. 9 is an isometric view of the loadbeam-side of a suspension 110 having a flexure 112 with a co-located or gimbal-based dual stage actuation (DSA) structure 114 in accordance with a second embodiment of this disclosure (i.e., a trace side version). The components of the suspension 110 can be configured similarly to the previously discussed suspension 10 unless otherwise described or illustrated. FIG. 10 is an isometric view of the distal end of the suspension 110. FIG. 11 is an isometric view of the flexure-side of the distal end of the suspension 110, showing the side opposite that shown in FIG. 10. As shown in FIG. 10, the suspension 110 includes a baseplate 116 as a proximal mounting structure. As further shown in FIG. 11, the suspension 110 includes a loadbeam 118 having a rigid or beam region 20 coupled to the baseplate 116 along a spring or hinge region 122. The loadbeam 18 can be formed from stainless steel. Flexure 112 includes a gimbal 124 at its distal end. A DSA structure 114 is located on the gimbal 124, adjacent the distal end of the loadbeam 118. The illustrated embodiment of the suspension 110 also includes a gimbal limiter 126 comprising a tab 128 configured to engage a stop portion 130 of the loadbeam 118. The DSA structure 114 includes a motor 134, which is a PZT actuator in the illustrated embodiment, mounted to a motor mounting region of the tongue 133, on the side of the flexure 112 opposite the loadbeam 118. A head slider 132 is mounted to the side of the motor 134 opposite the flexure 112. As described in greater detail below, in response to electrical drive signals applied to the motor 134, the motor drives portions of the gimbal 124, including portions of the tongue 133, motor 134 and head slider 132, about a generally transverse tracking axis.

Figure 12:
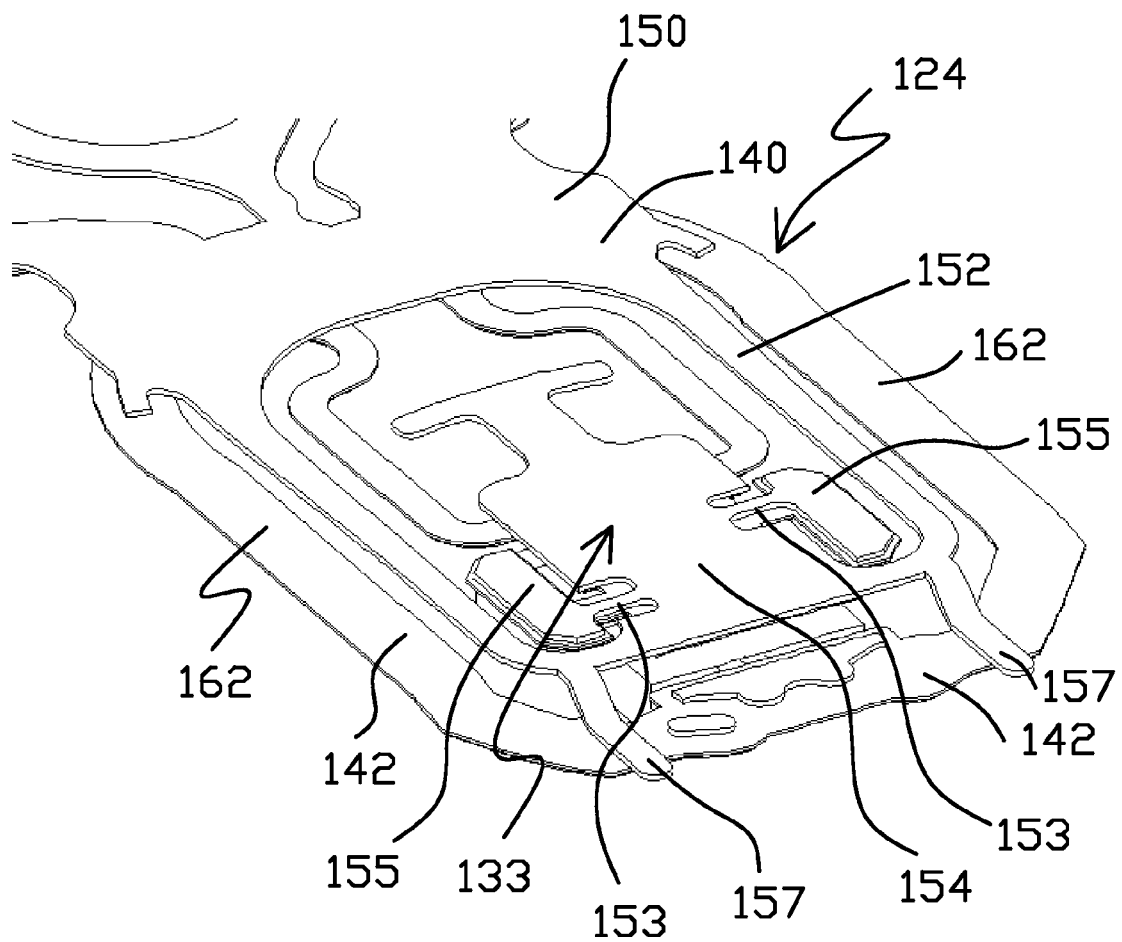
FIG. 12 is an isometric view of the stainless steel side of the flexure shown in FIG. 9.
Figure 13A:
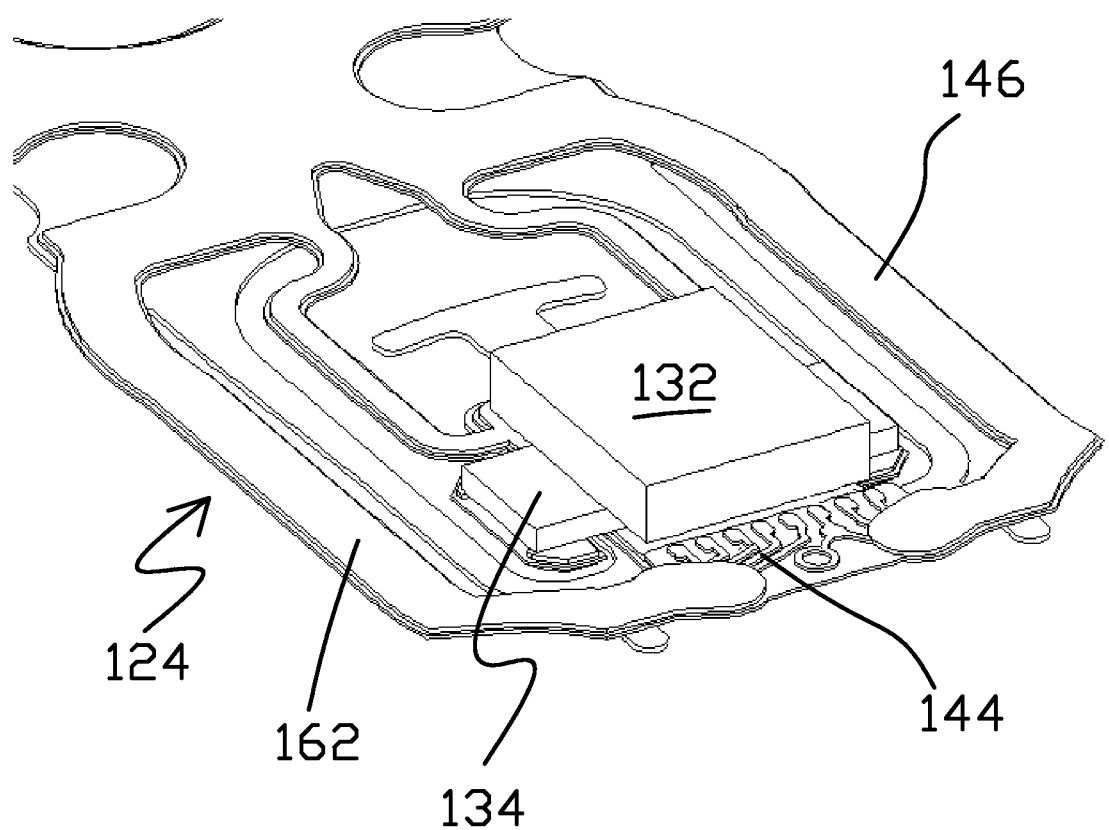
FIG. 13A is an isometric view of the trace side (i.e., the side opposite that shown in FIG. 12) of the flexure shown in FIG. 9.
Figure 13B:
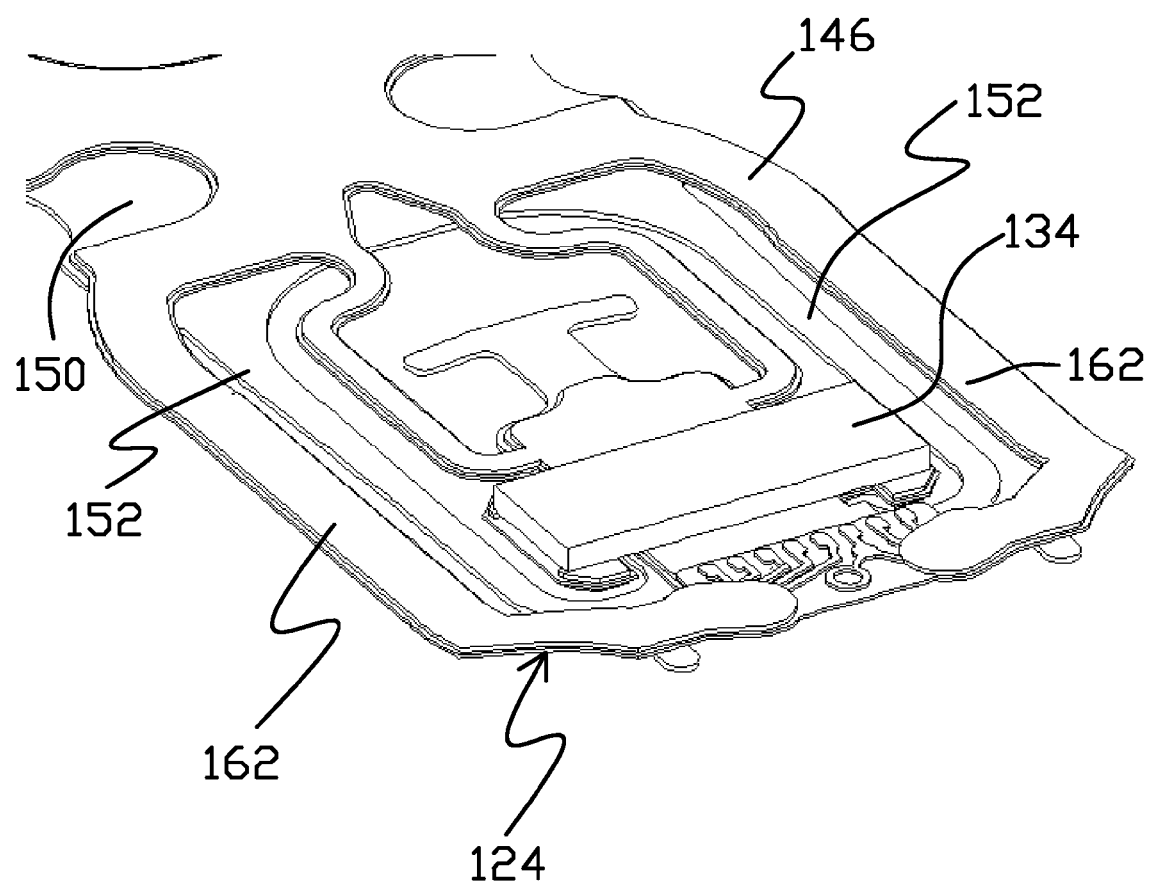
FIG. 13B is the view of FIG. 13A but with the head slider removed.
Figure 13C:
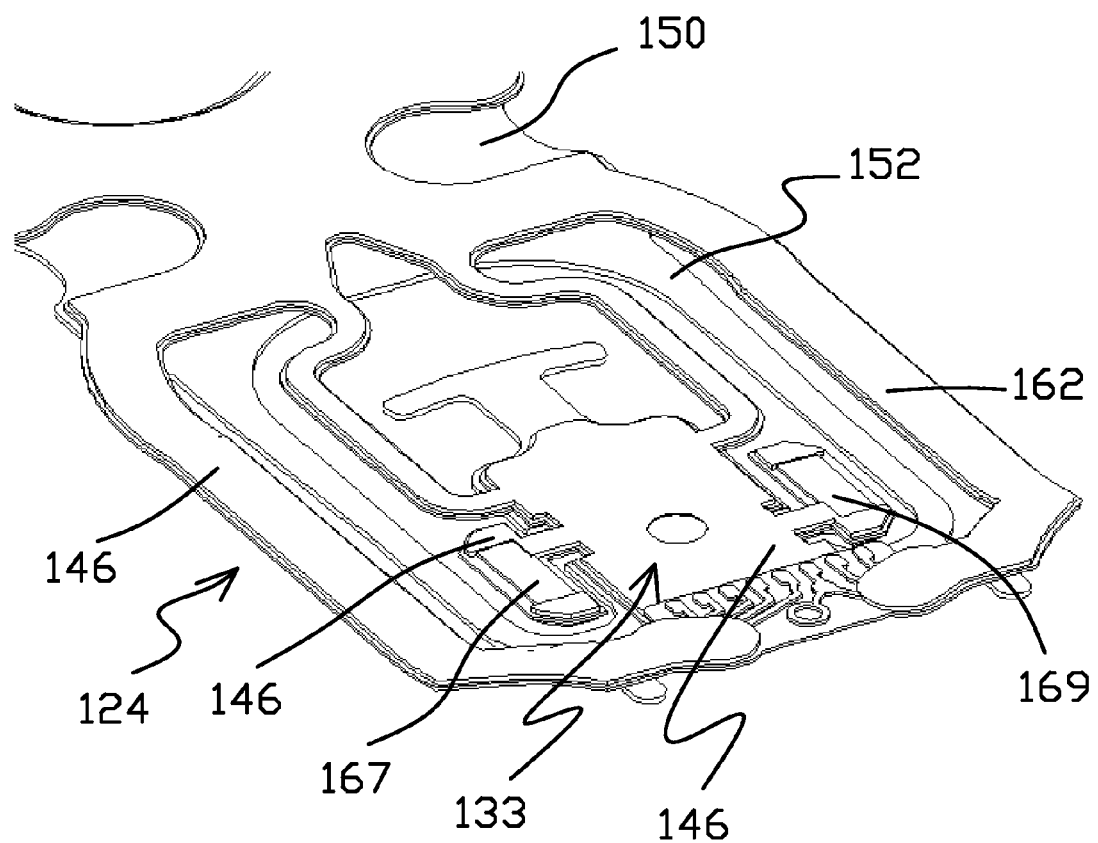
FIG. 13C is the view of FIG. 13B but with the motor removed.
Figure 13D:
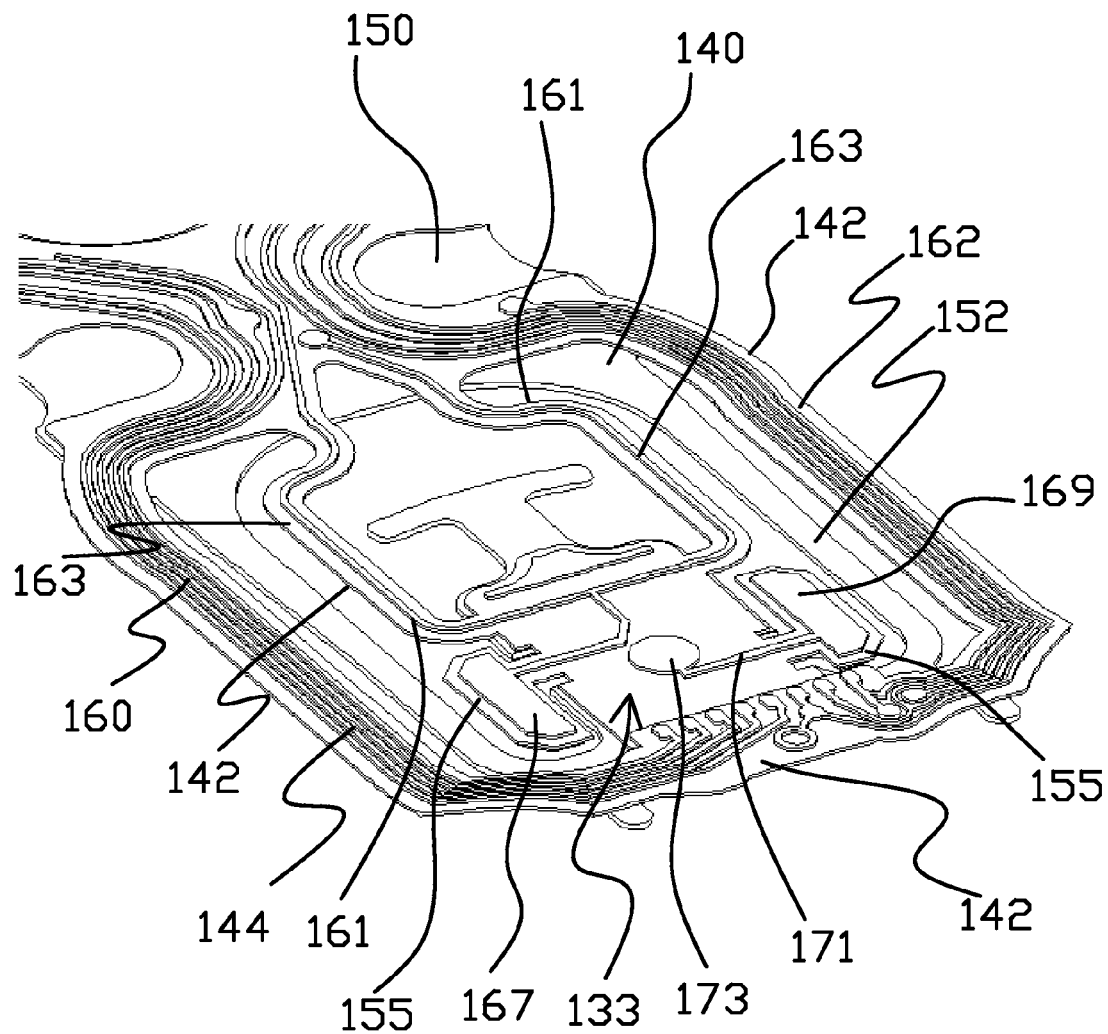
FIG. 13D is the view g of FIG. 13C but with the coverlay removed.
Figure 13E:
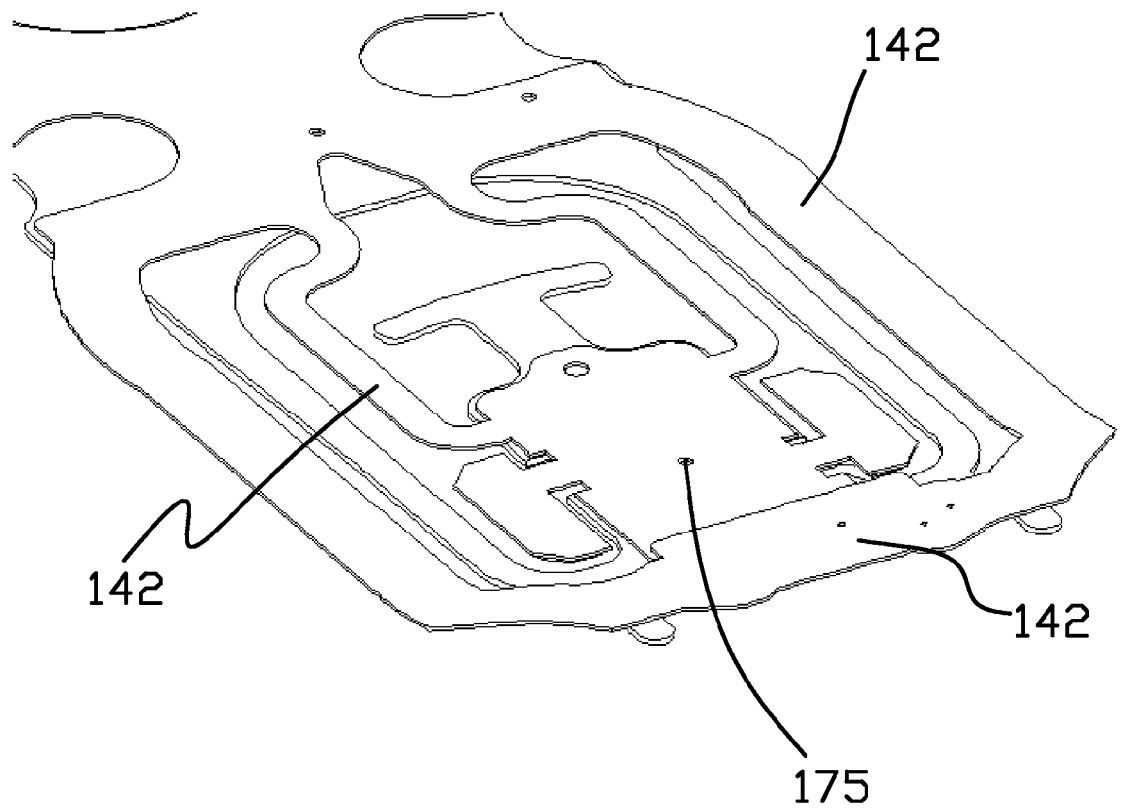
FIG. 13E is the view of FIG. 13D but with the conductive material layer removed.
Figure 13F:
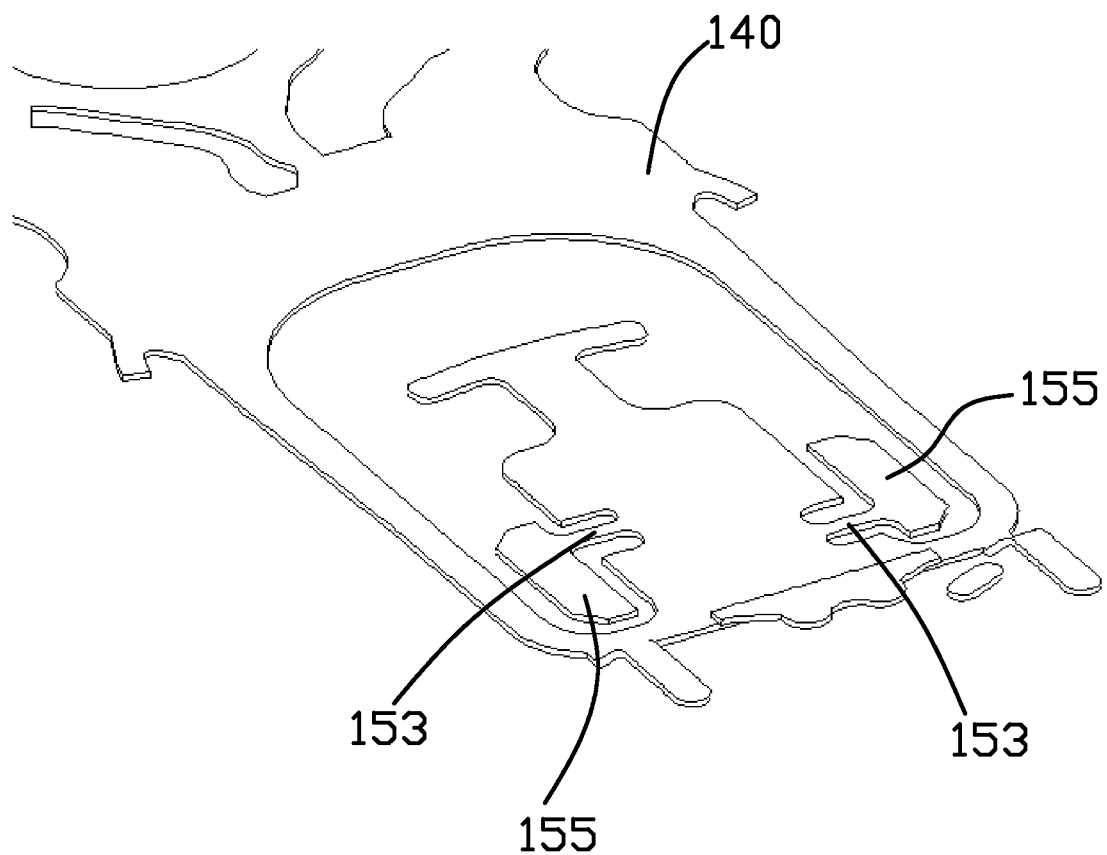
FIG. 13F is the view of FIG. 13E but with the dielectric material layer removed.

FIG. 12 is a detailed isometric view of the stainless steel-side of the flexure 112 and DSA structure 14 shown in FIG. 9. FIGS. 13A-13F are isometric views of the flexure 112 and DSA structure 114 showing the side opposite that shown in FIG. 12. Specifically, FIGS. 13A-13F show the various layers that comprise the flexure 112 and DSA structure 114. FIG. 13B is the drawing of FIG. 13A but with the head slider 132 removed to further show details of the motor 134 on the tongue 133. FIG. 13C is the drawing of FIG. 13B but with the motor 134 removed to reveal details of the tongue 133. FIG. 13D is the drawing of FIG. 13C but with the coverlay 146 removed to reveal a conductive material layer 144 including traces 160 and other structures formed in the conductive material layer 144. FIG. 13E is the drawing of FIG. 13D but with the conductive material layer 144 removed to further reveal the dielectric layer 142. FIG. 13F is the drawing of FIG. 13E but with the dielectric layer 142 removed to show only the stainless steel layer 140 of the flexure 112. It will be understood that the stainless steel layer 140 could alternatively be formed from another metal or rigid material. As shown, the flexure 112 is formed from overlaying spring metal such as stainless steel layer 140, polyimide or other dielectric layer 142, copper or other conductive material layer 144, and coverlay 146. The dielectric layer 142 generally electrically isolates structures formed in the conductive material layer 144 from adjacent portions of the stainless steel layer 140. Coverlay 146 generally covers and protects the structures formed in the conductive material layer 144.

The gimbal 124 includes spring arms 152 and the tongue 133. The base portion 150, the spring arms 152, and the center region 154 are each formed from the stainless steel layer 140. The spring arms 152 extend from the base portion 150. The center region 154, which is a center part of the tongue 133, is connected to the distal ends of the spring arms 152 and is supported between the spring arms 152. Also formed in the stainless steel layer 140 is a pair of struts 153. Each of the struts 153 extends from one of the opposite lateral sides of the center region 154 and has a motor mounting flag or pad 155 on its outer end. As shown, the struts 153 are offset from one another with respect to the longitudinal axis of the flexure 112 or otherwise configured so as to provide for rotational movement of the motor 134 and the head slider 132 mounted thereto about the tracking axis with respect to the center region 154. Each strut 153 comprises a longitudinal axis that extends generally perpendicular with respect to the longitudinal axis of the suspension 110. The longitudinal axes of the struts 153 extend parallel but do not intersect or otherwise overlap with each other when the struts 153 are not stressed (e.g., not bent). The struts 153 can be the only structural linkage between the center region 154 and the pads 155 (e.g., the only part of the stainless steel layer 140 connecting the center region 154 with the pads 155 is the struts 153, a single strut 153 for each pad 155). As shown in FIG. 13F, the struts 153 can each be the narrowest part of the stainless steel layer 140 in an X-Y plane (as viewed from the overhead perspective of FIG. $16B_1$) while the thickness of the stainless steel layer 140 can be consistent along the flexure 112.

As shown in FIG. 13D, a plurality of traces 160 are formed in the conductive material layer 144 and extend between the base portion 150 and tongue 133 along paths generally laterally outside the spring arms 152 and over supporting portions 162 formed in the dielectric layer 142. A number of the traces 160 terminate at locations adjacent the distal region of the tongue 133 and are configured to be electrically attached to read/write head terminals (not shown) on the head slider 132. A pair of power traces 161 for powering the motor 134 are also formed in the conductive material layer 144, and extend between the base portion 150 and a proximal portion of the tongue 133 along paths generally inside the spring arms 152 and over supporting portions 163 formed in the dielectric layer 142. The motor power traces 161 terminate at a first motor terminal pad 167 on one of the motor mounting pads 155. A second motor terminal pad 169 is formed in the conductive material layer 144 on the other motor mounting pad 155, and is coupled by a trace 171 to a conductive via 173 that is shown on the tongue 133 at a location between the motor mounting pads 155. As best viewed in FIG. 13D, via 173 extends through an opening 175 in the dielectric layer 142 (shown in FIG. 13E) to electrically contact the stainless steel layer 140 of the flexure 112. The motor terminal pad 169 can be electrically connected to a ground potential at the stainless steel layer 140 by the trace 171 and the via 173. As shown in FIG. 12, structures such as tabs 157 in the stainless steel layer 140 are formed out of the plane of the stainless steel layer and engage the distal portion of the trace supporting portions 162 to push the terminal ends of the traces 161 down so the terminals on the head slider 132 can be correctly electrically attached (e.g., by solder bonds) to the traces while accommodating the thickness of the motor 134. FIG. 13E also illustrates other holes in the dielectric layer that can be used in connection with conductive vias to electrically connect (e.g., ground) traces and other structures in the conductive material layer 144 to the stainless steel layer 140. In other embodiments, other approaches and structures can be used to couple the tracking drive signals to the terminals on the motor 134.

The electrical terminals on the motor 134 may be on the same side (e.g., top or bottom) but opposite longitudinal ends of the motor 134. As shown in FIGS. 13B and 13C, the motor 134 can be attached to the gimbal 124 by bonding the electrical terminals of the motor 134 to the motor terminal pads 167 and 169 using conductive adhesive. By this approach, the motor 134 is both structurally and electrically connected to the gimbal 124. As shown in FIG. 13C, the motor terminal pads 167 and 169 are exposed through openings in the coverlay 146 to provide access for the conductive adhesive.

Figure 14:
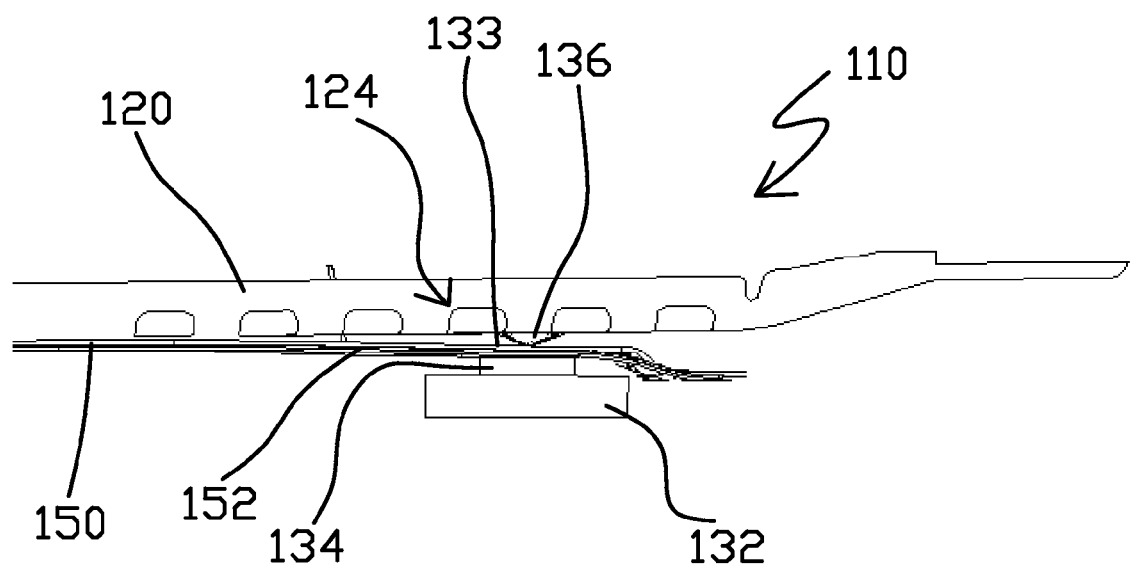
FIG. 14 is a side view of the distal end of the suspension shown in FIG. 9.
Figure 15:
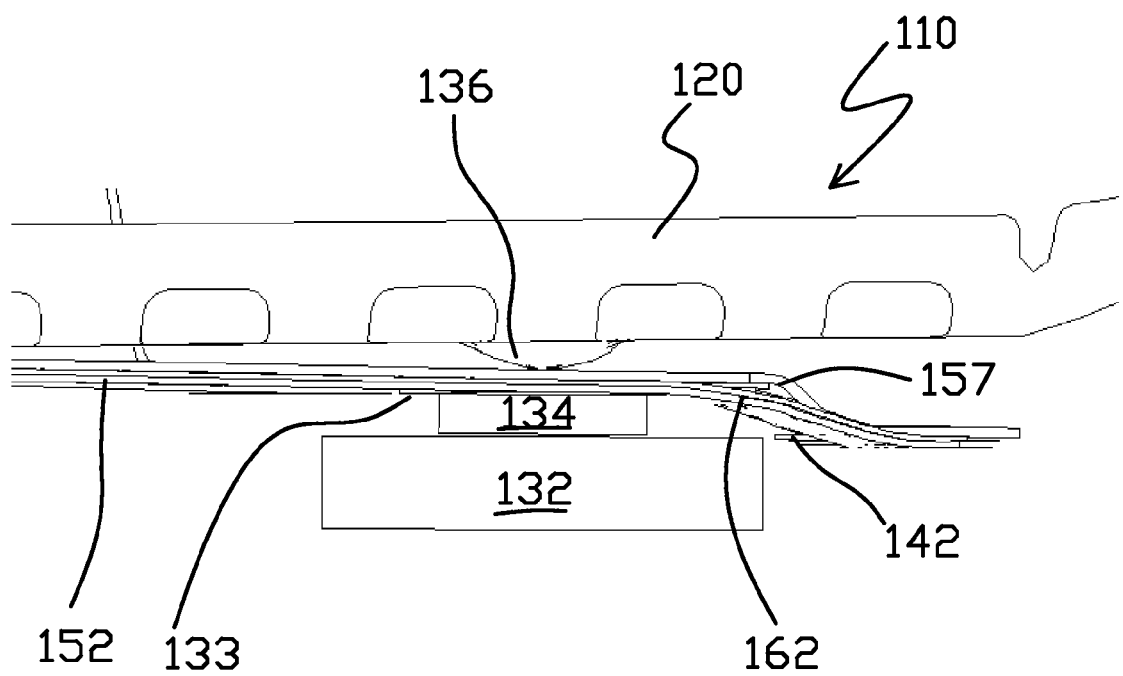
FIG. 15 is a closer view of the portion of FIG. 14 showing the dimple, motor, and head slider.

FIGS. 14 and 15 are side views of the suspension 110, illustrating the gimbal 124 and DSA structure 114. As shown, the dimple 136, which is a structure formed in the stainless steel of the loadbeam 118 and which projects from the loadbeam 118, engages the center region 154 of stainless steel layer 140 on the side of the tongue 133 opposite the motor 134. Dimple 136 functions as a load point by urging the portion of the gimbal 124 to which the motor 134 is connected out of plane with respect to the base portion 150 of the flexure 112. In the illustrated embodiment, the motor 134 is located between the tongue 133 and the head slider 132 (e.g., the motor 134 is sandwiched in a vertical axis). As shown in FIGS. 14 and 15, the head slider 132 is structurally supported by the motor 134 such that the only structural linkage between the flexure 112 and the head slider 132 runs through or otherwise includes the motor 134. The manner by which the stainless steel tabs 157 locate the portion of dielectric layer 142 with the terminal ends of the traces 160 at the correct z-height and adjacent to the portion of the head slider 132 that includes the read/write head terminals is shown in FIG. 15.

The operation of DSA structure 114 can be described with reference to FIGS. $16A_1$, $16A_2$, $16B_1$, $16B_2$, $16C_1$ and $16C_2$ that are plan views of the gimbal 124 of the flexure 112. FIGS. $16A_1$, $16B_1$ and $16C_1$ illustrate the stainless steel side of the flexure 112, and FIGS. $16A_2$, $16B_2$ and $16C_2$ illustrate the trace side of the flexure 112, with the motor 134 and head slider 132 shown. As shown in FIGS. $16B_1$ and $16B_2$, the DSA structure 114 and tongue 133, as well as the motor 134 on the linkage formed by the motor mounting pads 155 and struts 153, are in a neutral, undriven state with the head slider positioned generally parallel to the longitudinal axis of the flexure 112 when no tracking drive signal is applied to the motor 134. The struts 153 are not bent or otherwise stressed in this state. As shown in FIGS. $16A_1$ and $16A_2$, when a first potential (e.g., positive) tracking drive signal is applied to the motor 134, the shape of the motor changes and its length generally expands. This change in shape increases the distance between the motor mounting pads 155, which in connection with the mechanical action of the linking struts 153, causes the motor 134, and therefore the head slider 132 mounted thereto, to move or rotate in a first direction with respect to the longitudinal axis of the flexure 112 about the tracking axis. As shown, the lengthening of the motor 134 stretches the struts 153 laterally and causes the struts 153 to bend (e.g., bow inward). Because of the offset arrangement of the struts 153, the struts 153 bend such that the motor 134 and the head slider 132 rotate in the first direction.

As shown in FIGS. $16C_1$ and $16C_2$, when a second potential (e.g., negative) tracking drive signal is applied to the motor 134, the shape of the motor changes and its length generally contracts. This change in shape decreases the distance between the motor mounting pads 155, which in connection with the mechanical action of the linkage including struts 153, causes the motor 134, and therefore the head slider 132 mounted thereto, to move or rotate in a second direction with respect to the longitudinal axis of the flexure 112 about the tracking axis. The second direction is opposite the first direction. As shown, the shortening of the motor 134 compresses the struts 153 laterally and causes the struts 153 to bend (e.g., bow outward). Because of the offset arrangement of the struts 153, the struts 153 bend such that the motor 134 and the head slider 132 rotate in the second direction.

Some, although relatively little, out-of-plane motion of other portions of the gimbal 124 may be produced during the tracking action of DSA structure 114. The linkage provided by the struts 153 accommodates the motion of the motor 134 so the remaining portions of the tongue 133 remain generally aligned with respect to the longitudinal axis of the flexure 112 during this tracking action. For example, the motor 134 and head slider 132 rotate, but the center region 154 (or more broadly the tongue 133) does not rotate or rotates only an insignificant or trivial amount.

FIG. 17 is an illustration of a suspension 210 in accordance with another embodiment of this disclosure. As shown, the suspension 210 includes a co-located or gimbal-based DSA structure 214 and a loadbeam or baseplate-type DSA structure 290. In this way, the suspension 210 is a tri-stage actuated suspension. In one embodiment, the DSA structure 214 is substantially the same as the DSA structure 114 described above (e.g., is configured with any aspect described or shown in connection with FIGS. 9-$16C_2$) except as otherwise specified or shown. In another embodiment, the DSA structure 214 is substantially the same as the DSA structure 14 described above (e.g., is configured with any aspect described or shown in connection with FIGS. 1-8C) except as otherwise specified or shown. Other embodiments of suspension 210 include other gimbal-based DSA structures. The DSA structure 290 can be any known or conventional DSA structure such as any of those described above in the background section.

Incorporating a DSA structure as part of the gimbal of a suspension, which may require incorporating components that are configured to move with respect to one another as described above, may leave the components of the DSA structure more susceptible to unintended relative movement. Such movement could be out-of-plane movement of components that are not rigidly attached to one another in a co-located DSA embodiment, but may otherwise be rigidly attached to one another in a conventional non-co-located DSA embodiment. Such movement may be vibration of the components. Various embodiments, including those referenced above, can benefit from providing a dampening layer along a tongue, motor, and/or other components of a DSA structure, as further discussed herein in connection with FIGS. 18A-29.

FIG. 18A is an isometric view of a stainless steel side of a flexure 312 having a gimbal 324 with a DSA structure 314. FIG. 18B is an isometric view of the flexure 312 of FIG. 18A but with the motor 334 removed to show additional detail. FIG. 18C is an isometric view of the flexure 312 of FIGS.

18A-B but with dampener 329, island 325, and adhesive 335 structures further removed to show additional detail. FIG. 19 shows an isometric view of the trace side of the flexure 312 (i.e., the side opposite that shown in FIGS. 18A-C). As shown, coverlay 346 extends over the trace side of the flexure 312 to insulate traces. The flexure 312, DSA structure 314, or other component can be similar to that of the flexure 12, 112, 212, the DSA structure 14, 114, 214, or other component described above or elsewhere referenced herein except where noted. Features that are the same or similar to those of other embodiments are indicated by similar reference numbers.

FIG. 18A shows a motor 334 mounted on the flexure 312. The lateral ends of the motor 334 can be attached to the support regions 358 of the spring arms 352. As shown in FIG. 18B, layers of adhesive 335 can be positioned on the support regions 358 of the spring arms 352. The motor 334 extends over the tongue 333. The layers of adhesive 335 can be non-conductive epoxy, for example. The motor 334 can be electrically activated to bend the struts 356 and move the tongue 333, and move a head slider attached thereto (not illustrated), about a tracking axis, as discussed herein. A head slider can be mounted in any manner referenced herein in connection with any other embodiment.

As shown in FIG. 18B, a damper 329 is located on the tongue 333 below the motor 334 (having been removed for this view). The damper 329 is a layer of material on a surface of the tongue 333 and between the stainless steel layer 340 and the motor 334. In the illustrated embodiment, the damper 329 is located on the tongue 333 directly underneath the motor 334. The damper 329 does not extend out from underneath the motor 334 (i.e. the damper 329 is entirely located directly between the tongue 333 and the motor 334). In some other embodiments, however, the damper 329 may extend out from underneath the motor 334 to cover one or more areas of the tongue 333 that are not also overlapped by the motor 334. As described in greater detail below, the damper 329 enhances the performance of the DSA structure 314.

The damper 329 can be formed from elastic or visco-elastic material. Visco-elastic materials can provide enhanced damping benefits. Examples of suitable materials include 3M™ 242 and JDC MP65 materials. These materials typically have a relatively low elastic modulus and therefore have low stiffness. The damper 329 can be formed by various techniques such as jetting or pin contacting the material in liquid form onto the stainless steel layer 340 or other surface of the tongue 333, or by applying a previously formed film of the material onto the stainless steel layer 340 or other surface of the tongue 333. The material of the damper 329 may be adhesive and therefore can adhere to the tongue 333 (e.g., to the stainless steel layer 340) and/or the motor 334 (e.g., to the bottom side of the motor 334). In any case, the material of the damper 329 can contact both the tongue 333 (e.g., the stainless steel layer 340) and the motor 334 (e.g., the bottom side of the motor 334).

Relative motion occurs between the motor 334 and the tongue 333 during activation of the motor 334. The damper 329 can be placed at the center of motion between the tongue 333 and the motor 334. For example, in some embodiments the damper 329 can extend over a center of rotational motion (e.g., a tracking axis) of the tongue 333. The damper 329 can reduce unintended motion (e.g., motion that is not rotation) between the tongue 333 and the motor 334. The damper 329 is placed into shear by the relative movement between the tongue 333 and the motor 334. The damper 329 material changes the shear motion into heat energy, therefore reducing or dampening unintended motion.

The damper 329 can help to keep the motor 334 in a generally parallel planar relationship with the tongue 333 during operation of the DSA structure 314. For example, a first plane aligned with the flat orientation of the motor 334 can remain parallel, or generally parallel, with a second plane aligned with the flat orientation of the tongue 333 during operation of the DSA structure 314 due to the damper 329. The motor 334 and/or the flexure 312 may otherwise be prone to bending out of the planar parallel relationship when the motor 334 is activated and the DSA structure 314 articulates. The damper 329 can stabilize the movement of the motor 334 with respect to the flexure 312 during activation of the motor 334 without rigidly fixing the motor 334 to the flexure 312, such that the motor 334 is allowed some movement with respect to the tongue 333, as needed for articulation of the DSA structure 314, but out of plane movement is reduced or eliminated. Stabilizing the motor 334 with respect to the flexure 312, and thereby reducing out of plane motion, increases the linear stroke of the motor 334 which increases the tracking efficiency of the DSA structure 314. The damper 329 can reduce or eliminate out-of-plane motion of the tongue 333 during high frequency resonance modes, thereby providing lower gain and higher servo bandwidth capabilities for a disk drive into which the flexure 312 is incorporated. Flexure mode bending gains can also be improved. The higher servo bandwidths provided by the DSA structure 314 also allow tracks on the disk surface (not shown) to be placed closer together and thereby provide for higher capacity disk drives. In general, the greater the area directly between the motor 334 and the stainless steel layer 340 that is covered by damper 329, the greater the benefits and advantages such as those described above that can be achieved. Dampers such as that described herein can also be incorporated into other DSA structures in a similar configuration, such as between the flexure and motors in the DSA structures of FIGS. 1-17 or others referenced elsewhere herein.

FIG. 18B also shows an island 325. The island 325 can be formed from an electrically conductive material, such as copper or other metal or a conductive adhesive, for example. The island 325 provides an electrical connection between a trace contact (not visible) of the flexure 312 and a terminal on the bottom side of the motor 334 (i.e. a side of the motor 334 facing the flexure 312. These terminals are not shown in FIG. 18B but are further discussed herein. The island 325 can be connected to the terminal on the motor 334 by conductive epoxy, solder, or by any other means referenced herein or known for making an electrical connection. The island 325 is surrounded (e.g., in a X-Y plane co-planar with the top surface of the tongue 333) by a void 327. As shown in FIG. 18C, the void 327 extends through the stainless steel layer 340 and the damper 329. The void 327 can be considered a moat because the void 327 entirely surrounds the sides of the island 325 and isolates the island 325 from the stainless steel layer 340 and/or the damper 329. The void 327 can electrically isolate the island 325 from the stainless steel layer 340 or various other conductive materials. As discussed further herein, conductive adhesive, solder, or other material can be used to electrically connect the island 325 to a terminal on the bottom side of the motor 334. The void 327 can stop or minimize undesirable wicking of the conductive adhesive or other material thereby effectively defining the size of the connection. Isolation of the island 325 provided by the void 327 can prevent conductive adhesive, solder, or other material from unintentionally creating an electrical short between the island 325 and the stainless steel layer 340 during application.

The void 327 can be formed by known methods such as etching. For example, the stainless steel layer 340 can be etched to define the void 327.

In the embodiment shown in FIGS. 18B, 18C, and 19, a bond pad 331 is located directly under the motor 334 in an area between the struts 356 (e.g., the struts 356 being respectively proximal and distal of the bond pad 331) and between the support regions 358 laterally (e.g., the support regions 358 being respectively left and right of the bond pad 331). A trace of the flexure 312 can terminate at the bond pad 331. The bond pad 331 could alternatively be any type of terminal. Conductive epoxy or solder (not shown) can be used to make the electrical connection between the bond pad 331 and a terminal of the motor 334. For example, a solder ball or screen printed solder can be placed on the bond pad 331 and be made to flow onto the terminal of the motor 334. Various embodiments of a motor 334 that can be used with this embodiment of the flexure 312 are described in greater detail below. For example, respective electrical connections can be made through the bond pad 331 and the island 325 to two electrical contacts on the bottom side of the motor 334 (such a motor configuration is further discussed herein). In other embodiments, an electrical contact between the bond pad 331 and the terminal of the motor 334 can be made using other structures and approaches. For example, another electrical connection to a terminal (not shown) on the motor 334 can be through a dimple of a loadbeam as described above. Alternatively, while one bond pad 331 is shown in the embodiment of FIGS. 18A-C, another bond pad can be provided along the flexure 312 in the same configuration as the bond pad 331 but on the left side of the flexure 312 to electrically connect with a second terminal of the motor 334.

FIG. 20 is an illustration of the stainless steel side of a flexure 412 having a gimbal 424 with a DSA structure 414 in accordance with another embodiment. The flexure 412, DSA structure 414, and/or other component can be similar to that of the flexure 12, 112, 212, 312, DSA structure 14, 114, 214, 314, or other component described above or elsewhere referenced herein except where noted. Features that are the same or similar to those of other embodiments are indicated by similar reference numbers. A tongue 433 is supported by spring arms 452. A motor is not shown in FIG. 20 to allow more detail to be shown in areas which would otherwise be obscured by the motor. However, a motor can be mounted on the flexure 412 or other component in the manner of any other embodiment referenced herein, such as that shown in FIG. 18A. For example, the lateral ends of a motor can be attached to the support regions 458 of the spring arms 452. A damper 429 is located on the flexure 412 in an area that would be directly below the motor. The damper 429 covers substantially the entire area of the tongue 433 below where the motor would be located (i.e. the area of overlap between the tongue 433 and the motor). As shown, the damper 429 is a layer on the stainless steel layer 440. The damper 429 can be formed from materials that are the similar to or the same as that of damper 329 described above, for example. In the illustrated embodiment, the DSA structure 414 includes a trace along the flexure 412 and a bond pad 431 for making an electrical contact to a terminal of the motor. The bond pad 431 can be configured, and can connect to a terminal of a motor, in any manner described above in connection with the bond pad 331 of FIGS. 18B-C, for example. Other structures and approaches such as those described above can be used to make additional or other electrical contacts to the motor.

FIG. 21 is an illustration of an embodiment of a motor 534 that can be used with DSA structures of the present disclosure. Motor 534 has a first electrical contact 570 on a first surface of the motor 534 (e.g., the bottom surface of the motor which faces flexure) and a second electrical contact 573 on a second surface of the motor 534 (e.g., the top surface of the motor 534 opposite the bottom surface). The piezoelectric material 571 of the motor 534 is located between the first electrical contact 570 and the second electrical contact 573. The motor 534 can be used, for example, in embodiments in which electrical connections are made with the motor 534 from opposite sides of the motor 534, such as connecting a bond pad 331, 431 or island 325 to the first electrical contact 570 on the first surface of the motor 534 and electrically connecting another terminal (e.g., a dimple of a loadbeam as a grounding contact) to the second electrical contact 573 on the second surface of the motor 534.

FIG. 22 is an illustration of another embodiment of a motor 634 that can be used with DSA structures of the present disclosure. As shown, the motor 634 has a first electrical contact 670 and a second electrical contact 672. Both of the first electrical contact 670 and the second electrical contact 672 extend along a first side (e.g., the bottom) of the motor 634. The second electrical contact 672, which is located at one end of the first side of the motor 634, is formed by an electrical terminal wrapping from a second side (e.g., the top) of the motor 634 opposite the first side, around an end side, and to the first side of the motor 634. The first electrical contact 670, which is located at the opposite end of the first side of the motor 634 with respect to the second electrical contact 672, can be limited to the first side of the motor 634 or can extend to one or more other sides of the motor 634. The first electrical contact 670 and the second electrical contact 672, or any electrical contact referenced herein, can be formed by plating the piezoelectric material of the motor 634 with conductive material. As shown, the first electrical contact 670 and the second electrical contact 672 are electrically isolated on the first side of the motor 634 by a gap 674. The gap 674 can be a non-conductive surface of the first side of the motor 634. The motor 634 of FIG. 22 can be used in DSA structures where both electrical connections to the motor 634 (e.g., anode and cathode) are made on the same side of the motor 634. Such embodiments can include those where two different and electrically separate traces of flexure respectively connect to the bottom side of the motor 634. For example, the island 325 and the bond pad 331 can electrically connect with the first electrical contact 670 and the second electrical contact 672, respectively. Alternatively, two separate bond pads could be provided, each of the bond pads electrically connected to different, and electrically separate, traces of flexure. The island 325 and the bond pad 331, or two bond pads, can be positioned directly below the first electrical contact 670 and the second electrical contact 672, respectively, when the motor 634 is mounted on the flexure. For example, a first bond pad can be positioned in the manner of bond pad 331, 431 on a right side of the flexure while the second bond pad can be positioned in a mirrored manner with respect to the first bond pad on the left side of the flexure. The first and second bond pads can be positioned between the support regions 358, 458 and the lateral sides of the tongue 333, 433 (e.g., the left and right edges of the tongue 333, 433), respectively. Respective electrical connections can be made to the two bond pads and the first electrical contact 670 and the second electrical contact 672, such as with solder or conductive epoxy. Being that two separate electrical connections are made to the bottom side of the motor 634, a dimple of a loadbeam does not need to provide an electrical connection to the motor 634.

In various embodiments, a dimple of a loadbeam that engages a motor or an element mounted on the motor can be electrically isolated from the terminals of the motor using elastic or visco-elastic materials such as those described above. For example, one or more materials can be provided on the motor to electrically insulate and mechanically protect the motor. Such aspects are further discussed in connection with FIG. 23.

FIG. 23 is an isometric view of the stainless steel side of a flexure 712 having a gimbal 724 with a DSA structure 714 in accordance with another embodiment. The flexure 712, the DSA structure 714, and/or other component can be similar to that of the flexure 12, 112, 212, 312, 414, DSA structure 14, 114, 214, 314, 414, and/or other component described above or other structure referenced herein except where noted. Features that are the same or similar to those of other embodiments are indicated by similar reference numbers. FIG. 23 shows a motor 734. The lateral ends of the motor 734 can be attached to the support regions 758 of the spring arms 752. As demonstrated in FIG. 18B, layers of adhesive can be positioned on the support regions 758 of the spring arms 752. The motor 734 extends over the tongue 733. The motor 734 can be electrically activated to bend the struts 756 and move the tongue 733, and a head slider 732 attached thereto, about a tracking axis, as discussed herein.

As shown, the top side of the motor 734, opposite the bottom side of the motor 734 which faces the tongue 733, includes an impingement element 788. The impingement element 788 comprises multiple layers. A top layer 737 of the impingement element 788 can comprise a layer of metal (e.g., stainless steel), plastic, or other material that is relatively hard to robustly engage a dimple of a loadbeam which impinges on the top layer 737 of the impingement element 788, thereby mechanically protecting the motor 734 from wear from the impinging dimple. The impingement element 788 includes a second layer 739 below the top layer 737. The second layer 739 can be adhered to the top layer 737 and the top side of the motor 734. The second layer 739 can comprise elastic or visco-elastic material. Characteristics and examples of elastic or visco-elastic materials are discussed herein. The second layer 739 can electrically insulate a terminal on the top side of the motor 734 from the top layer 737. Alternatively, the impingement element 788 can be a single layer of one of the materials discussed herein (e.g., metal, plastic, elastic, visco-elastic). It is noted that the top side of the motor 734 can comprise an electrical contact, such as in the case of motor 634. The impingement element 788 can be located on the electrical contact. The impingement element 788 can then provide a layer of insulating material (e.g., the second layer 739) disposed on the electrical contact to insulate the electrical contact from the dimple. An electrical connection can be made to the electrical contact on the top side of the motor 734 by the electrical contact extending from the top side of the motor 734 to another side of the motor (e.g., the bottom side) and an electrical connection being made to the electrical contact on the another side of the motor (e.g., via a bond pad connecting to an electrical contact extending to the bottom side of the motor 734, as discussed herein). In this or other embodiments, a differential motor drive signal can be applied to the motor 734 (e.g., a positive voltage applied to a first terminal of the motor and a negative voltage applied to a second terminal of the motor 734) to increase the stroke capability (e.g., due to the larger voltage difference across the piezoelectric material of the motor 734).

FIG. 24 is an illustration of the stainless steel side of a flexure 812 having a gimbal 824 with a DSA structure 814 in accordance with another embodiment. FIG. 25 is a side view of the gimbal 824 of FIG. 24. The flexure 812, DSA structure 814, or other component can be similar to that of the flexure 12, 112, 212, 312, 412, 712, the DSA structure 14, 114, 214, 314, 414, 714 or other component described above or elsewhere referenced herein except where noted. Features that are the same or similar to those of other embodiments are indicated by similar reference numbers. For example, while not shown in FIGS. 24-25, a damper as described herein can be provided on the DSA structure 814 between the tongue 833 and motor 834.

As shown in FIGS. 24-25, the motor 834 is mounted on the flexure 812 opposite the head slider 832. The lateral ends of the motor 834 can be attached to the support regions 858 of the spring arms 852 via adhesive 835. The motor 834 extends over the tongue 833. The motor 834 can be electrically activated to bend the struts 856 and move the tongue 833, and a head slider (not illustrated) attached thereto, about a tracking axis, as discussed herein. A load point feature 880 is located on the top side of the motor 834. The load point feature 880 is shown as a dimple having a generally spherical surface in the embodiment of FIGS. 24-25, however other shapes of the load point feature 880 are possible. The load point feature 880 can be formed from adhesive, epoxy, or polymer materials, for example. While a dimple of a loadbeam, such as that of FIG. 6, may impinge on a motor or other element of the DSA structure to allow gimballing of a head slider, the embodiment of FIGS. 24-25 locates the load point feature 880 on the motor 834 to impinge on a surface of a loadbeam and allow gimballing. The loadbeam therefore does not need a protruding load point feature, and as such a loadbeam may not have a dimple that engages with the flexure 812. The load point feature 880 can provide electrical isolation of the loadbeam from the top side of the motor 834 (and any electrical contact thereon) as well as distributing the stress of the preload force on the motor 834 to reduce stress. The load point feature 880 can also reduce wear at the load point feature 880-motor interface, as compared to a metal dimple of a loadbeam impinging on a motor, because the apex of the load point feature 880 will ride on the flat metal surface of the loadbeam (presuming the loadbeam does not have a dimple).

FIG. 26 is an isometric view of the trace side of a flexure 912 having a gimbal 924 with a DSA structure 914 in accordance with another embodiment. FIG. 27 is an isometric view of the stainless steel side of the flexure 912 of FIG. 26. FIG. 28 is a side view of the DSA structure 914 of FIG. 26. FIG. 29 is an isometric view of the head slider 632 of the DSA structure 614. The flexure 912, DSA structure 914, or other component can be similar to that of the flexure 12, 112, 212, 312, 412, 712, 812, the DSA structure 14, 114, 214, 314, 414, 714, 814, or other component described above or elsewhere referenced herein except where noted. Features that are the same or similar to those of other embodiments are indicated by similar reference numbers.

The motor 934 is mounted on the flexure 912. Specifically, the lateral ends of the motor 934 are attached to the coverlay 946 on the support regions 958 of the spring arms 952. As shown in FIG. 26, the coverlay 946 extends over supporting portions 962. A bond pad 931 is located on the flexure 912 directly under the motor 934. Although not visible, a damper of elastic or visco-elastic material can be located between the motor 934 and the tongue 933 in the manner of any embodiment discussed herein. For example, the damper can be attached to one or both of the motor 934 and the coverlay 946. The damper can be disposed directly beneath the motor 934. A load point (e.g., a dimple) of a loadbeam, such as that described in connection with FIGS. 1-17, can engage the tongue 933 opposite the motor 934. For example, the dimple can engage the stainless steel layer 940.

The head slider 932 includes a channel 990. The channel 990 can be a trough in a bottom or top side of the head slider 932 that extends from a first side of the head slider 932 to a second side of the head slider 932 opposite the first side. As shown, the motor 934 extends within the channel 990 while the motor 934 is not coupled to the head slider 932. The length of the motor 934 is greater than that of the head slider 932 such that the motor 934 extends beyond both opposite lateral ends of the head slider 932. The channel 990 can have a width greater than the width of the motor 934 to provide clearance for the motor 934. Specifically, the channel 990 provides clearance that enables the head slider 932 to move with the tongue 933 independently from movement of the motor 934 during actuation of the DSA structure 614. In this way, the motor 934 extends through the channel 990 and the motor 934 is free from fixed contact with the head slider 932. The clearance allows the motor 934 to move within the channel 990 during activation of the motor 934 and tracking of the DSA structure 914. As shown in the side view of FIG. 28, the motor 934 is entirely within the channel 990 along the length of the channel 990 such that the motor 934 does not protrude above (or below) the channel 990 but does extend from the lateral ends of the channel 990 at the lateral edges of the head slider 932.

The head slider 932 is mounted on the tongue 933. Specifically, the opposite ends 992 of the head slider 932, on opposite sides of the channel 990, are attached by adhesive to the head slider mountings 947 on the tongue 933. The head slider mountings 947 can be surfaces of the tongue 933, such as surfaces of the coverlay 946, to which the opposite ends 992 of the head slider 932 can be adhered. An advantage of the DSA structure 914 is that the overall height is reduced by incorporating the motor 934 into the channel 990 of the head slider 932. The motor 934 can be electrically activated to bend the struts 956 and move the head slider 932 about a tracking axis, as discussed herein.

FIG. 30 is an illustration of the stainless steel side of a flexure 1012 having a gimbal 1024 with a DSA structure 1014 in accordance with another embodiment. The flexure 1012, DSA structure 1014, or other component can be similar to that of the flexure 12, 112, 212, 312, 412, 712, 912, the DSA structure 14, 114, 214, 314, 414, 714, 914, or other component described above or elsewhere referenced herein except where noted. Features that are the same or similar to those of other embodiments are indicated by similar reference numbers. A motor (not shown) can be mounted on the flexure 1012. The lateral ends of the motor can be attached to the support regions 1058 of the spring arms 1052 via adhesive, as discussed herein. The motor 1034 can be electrically activated to bend the struts 1056 and move the tongue 1033, and also move a head slider (not illustrated) attached thereto, about a tracking axis, as discussed herein. The motor can extend over the tongue 1033. The motor can extend directly over the damper 1029. For example, the damper 1029 can be entirely underneath the motor such that the damper 1029 does not extend distally or proximally beyond the motor. The damper 1029 is a layer on the stainless steel layer 1040. The damper 1029 can be configured in any manner referenced herein. For example, the damper 1029 can be formed from an elastic or visco-elastic material that contacts, and further can be adhered to, the stainless steel layer 1040 and/or the motor. The damper 1029 has a circular outer profile. Specifically, the damper 1029 is in the shape of a circle. As shown, the damper 1029 does not include a void or a conductor extending through the damper 1029 (e.g., an island), however a void and/or a conductor as described herein can be provided within the damper 1029.

Embodiments of the present disclosure can offer important advantages. For example, servo bandwidth can be significantly increased (e.g., from about 3-4 kHz for baseplate or loadbeam based DSA structures to 8 kHz or more for gimbal based DSA structures).

Any of the embodiments presented herein can be modified in view of the features presented in commonly owned U.S. patent application Ser. No. 14/026,427, entitled CO-LOCATED GIMBAL-BASED DUAL STAGE ACTUATION DISK DRIVE SUSPENSIONS, filed Sep. 13, 2013, and U.S. patent application Ser. No. 14/044,238, entitled CO-LOCATED GIMBAL-BASED DUAL STAGE ACTUATION DISK DRIVE SUSPENSIONS WITH MOTOR STIFFENERS, filed Oct. 2, 2013, each of which is incorporated herein by reference in its entirety. Likewise, any of the embodiments presented in such applications can be modified with any of the features of the present disclosure.

While the embodiments shown herein generally have one piezoelectric motor, it is noted that a suspension can include two or more motors. Such motors can be dampened and/or can include any feature as discussed herein. For example, a DSA structure can having two motors mounted on a gimbaled flexure, each motor dampened and/or including any other feature discussed herein. Various embodiments of suspensions having two motors are disclosed in commonly owned U.S. patent application Ser. No. 13/972,137, entitled CO-LOCATED GIMBAL-BASED DUAL STAGE ACTUATION DISK DRIVE SUSPENSIONS WITH OFFSET MOTORS, filed Aug. 21, 2013, which is incorporated herein by reference in its entirety.

Although the present invention has been described with reference to preferred embodiments, those skilled in the art will recognize that changes can be made in form and detail without departing from the spirit and scope of the invention. For example, although described in connection with certain co-located DSA structures, dampeners and associated features described herein can be used in connection with motors on other DSA structures, including other co-located DSA structures.

The following is claimed:

1. A suspension having a dual stage actuation structure, the suspension comprising:
a flexure comprising a gimbal, the gimbal comprising a top side and a bottom side opposite the top side;
a head slider mounting located on the bottom side of the gimbal;
a motor mounted on the top side of the gimbal, the motor comprising a top side and a bottom side opposite the top side, the bottom side of the motor facing the top side of the gimbal; and
a damper located between the motor and the flexure, the damper contacting the top side of the gimbal and the bottom side of the motor, the damper comprising one or both of elastic and visco-elastic material.

2. The suspension of claim 1, wherein the gimbal comprises a tongue and the damper contacts a top side of the tongue and the bottom side of the motor.

3. The suspension of claim 2, wherein the gimbal comprises a pair of spring arms and the tongue is located between the pair of spring arms.

4. The suspension of claim 3, wherein the motor is mounted on each of the pair of spring arms.

5. The suspension of claim 1, wherein:
the motor comprises at least one terminal,
the flexure comprises at least one electrical connection pad and an electrically conductive material in contact with each of the at least one electrical connection pad and the at least one terminal to electrically connect the at least one electrical connection pad to the at least one terminal, respectively, and the electrically conductive material is different from the damper.

6. The suspension of claim 1, wherein the damper reduces out-of-plane motion of the gimbal during high frequency resonance modes.

7. The suspension of claim 1, wherein the damper comprises a layer of elastic material.

8. The suspension of claim 1, wherein the damper comprises a layer of visco-elastic material.

9. The suspension of claim 1, wherein the damper comprises a layer of electrically insulative material.

10. The suspension of claim 1, wherein the damper is located only within an overlap between the motor and the gimbal.

11. The suspension of claim 1, wherein the damper is adhered to both of the top side of the gimbal and the bottom side of the motor.

12. The suspension of claim 1, wherein the damper is in contact with a stainless steel layer of the flexure.

13. The suspension of claim 1, wherein the damper is applied as a liquid or a film.

14. The suspension of claim 1, wherein the damper comprises a void.

15. The suspension of claim 1, further comprising a head slider, the head slider attached to the gimbal at the head slider mounting.

16. The suspension of claim 1, wherein:
the gimbal comprises a pair of struts, a pair of spring arms, and a tongue located between the pair of spring arms and connected to the pair of spring arms by the pair of struts,
the motor is mounted on the pair of spring arms,
the head slider mounting is located on the tongue, and
electrical activation of the motor bends the pair of struts to move the head slider mounting about a tracking axis.

17. A suspension comprising:
a flexure comprising a tongue having a top side and a bottom side opposite the top side;
a head slider mounting located on the bottom side of the tongue;
a motor mounted on the flexure, the motor comprising a top side and a bottom side opposite the top side, the bottom side of the motor facing the top side of the tongue; and
a damper located between the bottom side of the motor and the top side of the tongue, the damper comprising one or both of elastic and visco-elastic material.

18. The suspension of claim 17, wherein:
the flexure comprises a pair of struts and a pair of spring arms,
the tongue is located between the pair of spring arms,
the tongue is connected to the pair of spring arms by the pair of struts,
the motor is mounted on the pair of spring arms, and
electrical activation of the motor bends the pair of struts to move the tongue about a tracking axis.

19. A suspension comprising:
a flexure comprising a pair of spring arms, a pair of struts, and a tongue having a top side and a bottom side opposite the top side, the tongue located between the pair of spring arms and connected to the pair of spring arms by the pair of struts;
a motor mounted on the pair of spring arms, the motor comprising a top side and a bottom side opposite the top side, the bottom side of the motor facing the top side of the tongue; and
a damper located between the bottom side of the motor and the top side of the tongue, the damper comprising one or both of elastic and visco-elastic material.

20. The suspension of claim 19, further comprising a head slider mounting located on the bottom side of the tongue.

* * * * *